(12) United States Patent
Hiroki

(10) Patent No.: US 10,981,525 B2
(45) Date of Patent: Apr. 20, 2021

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventor: Kenji Hiroki, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 16/484,754

(22) PCT Filed: Feb. 9, 2018

(86) PCT No.: PCT/JP2018/004733
§ 371 (c)(1),
(2) Date: Aug. 8, 2019

(87) PCT Pub. No.: WO2018/147448
PCT Pub. Date: Aug. 16, 2018

(65) Prior Publication Data
US 2020/0001805 A1    Jan. 2, 2020

(30) Foreign Application Priority Data

Feb. 10, 2017 (JP) .............................. JP2017-023584
Feb. 10, 2017 (JP) .............................. JP2017-023600

(51) Int. Cl.
*B60R 16/027* (2006.01)
*H01R 35/04* (2006.01)
*B62D 1/02* (2006.01)

(52) U.S. Cl.
CPC ........... *B60R 16/027* (2013.01); *H01R 35/04* (2013.01); *B62D 1/02* (2013.01)

(58) Field of Classification Search
CPC .......... B60R 16/027; B62D 1/02; H01R 35/04
(Continued)

(56) References Cited

U.S. PATENT DOCUMENTS

| 6,042,405 A | 3/2000 | Masuda et al. |
| 7,104,821 B2 * | 9/2006 | Araki .................... B60R 16/027 439/164 |

(Continued)

FOREIGN PATENT DOCUMENTS

| CN | 103262364 A | 8/2013 |
| JP | 8-138818 A | 5/1996 |

(Continued)

OTHER PUBLICATIONS

Combined Chinese Office Action and Search Report dated Apr. 14, 2020, in Patent Application No. 201880011108.7 (with English translation), 11 pages.

*Primary Examiner* — Harshad C Patel
(74) *Attorney, Agent, or Firm* — Oblon, McClelland, Maier & Neustadt, L.L.P.

(57) ABSTRACT

A rotary connector device capable of reducing the number of components and enhancing assembly workability provided with: a stationary member; a rotary member to be attached to the stationary member to be capable of relative rotation with respect to the stationary member, the rotary member including a steering wheel insertion hole into which an insertion convex portion of a steering wheel is to be inserted; and an intermediate stationary member provided to be movable between a locked position and a lock released position with respect to the rotary member, wherein the intermediate stationary member is provided with a regulating portion, the regulating portion being configured to, at the (Continued)

locked position, regulate relative rotation of the rotary member when the regulating portion is engaged with the stationary member.

22 Claims, 38 Drawing Sheets

(58) Field of Classification Search
USPC .................................. 439/15, 13, 14, 164
See application file for complete search history.

(56) References Cited

U.S. PATENT DOCUMENTS

| | | | |
|---|---|---|---|
| 8,986,026 B2* | 3/2015 | Utsunomiya | H01R 35/025 |
| | | | 439/164 |
| 10,554,003 B2* | 2/2020 | Saito | H01R 35/025 |
| 2002/0025705 A1* | 2/2002 | Araki | B60R 16/027 |
| | | | 439/164 |
| 2007/0004236 A1* | 1/2007 | Suenaga | H01R 35/04 |
| | | | 439/15 |
| 2012/0011959 A1* | 1/2012 | Park | B60R 16/027 |
| | | | 74/527 |
| 2012/0329314 A1* | 12/2012 | Adachi | B60R 16/027 |
| | | | 439/501 |
| 2013/0115785 A1* | 5/2013 | Kamiya | H01R 35/025 |
| | | | 439/15 |
| 2014/0212207 A1 | 7/2014 | Utsunomiya et al. | |
| 2015/0171582 A1 | 6/2015 | Utsunomiya et al. | |

FOREIGN PATENT DOCUMENTS

| | | |
|---|---|---|
| JP | 10-275668 A | 10/1998 |
| JP | 11-187557 A | 7/1999 |
| JP | 2010-129187 A | 6/2010 |
| JP | 2013-73926 A | 4/2013 |

* cited by examiner

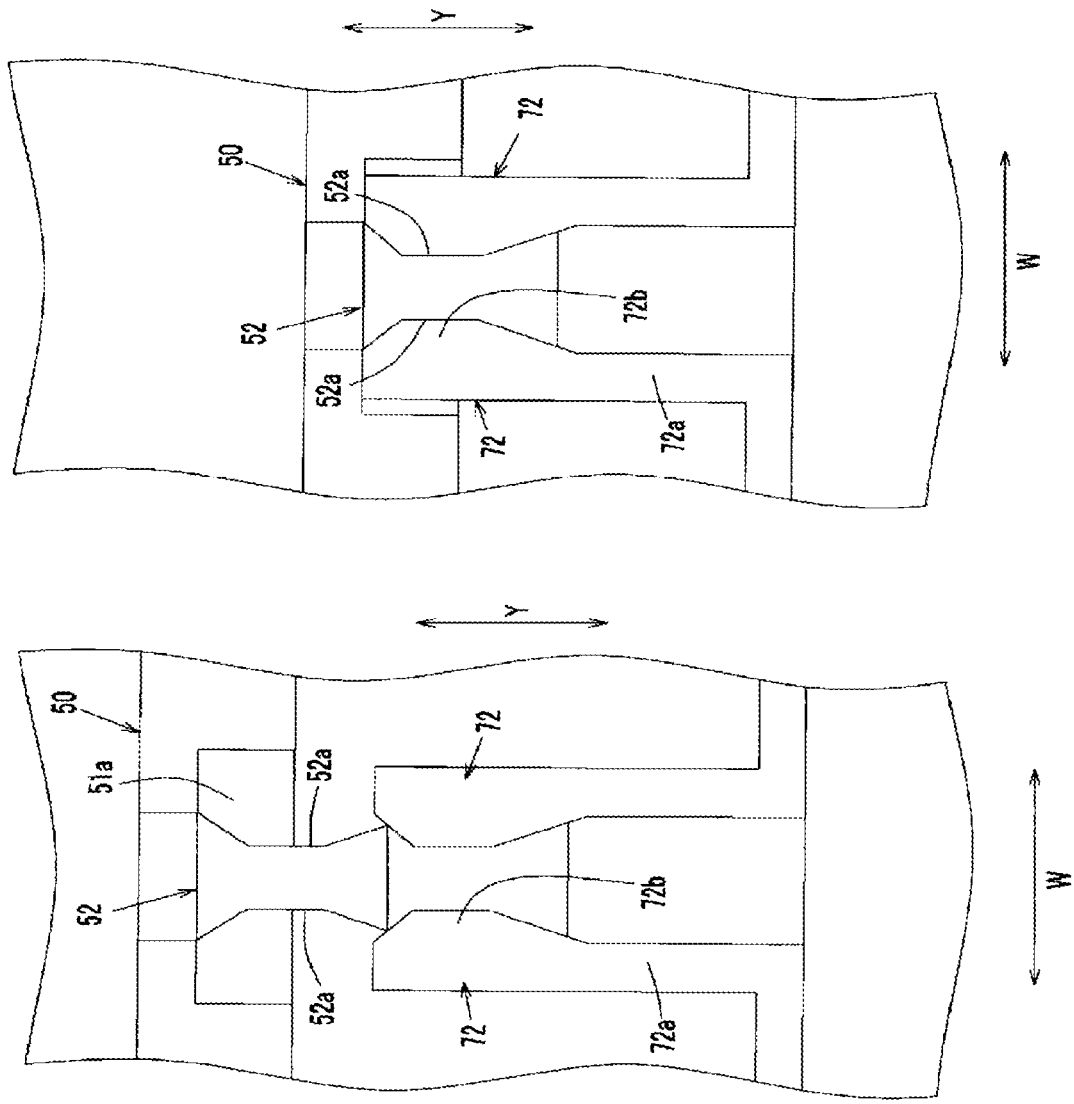

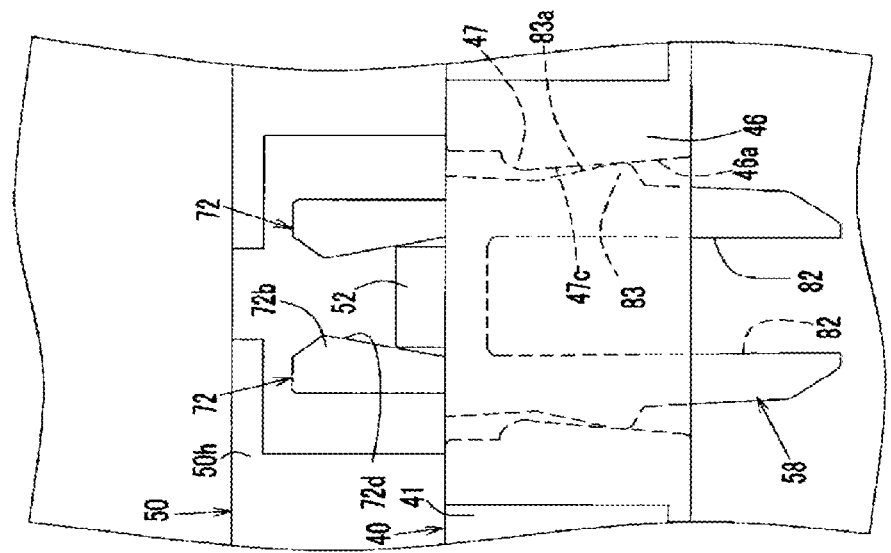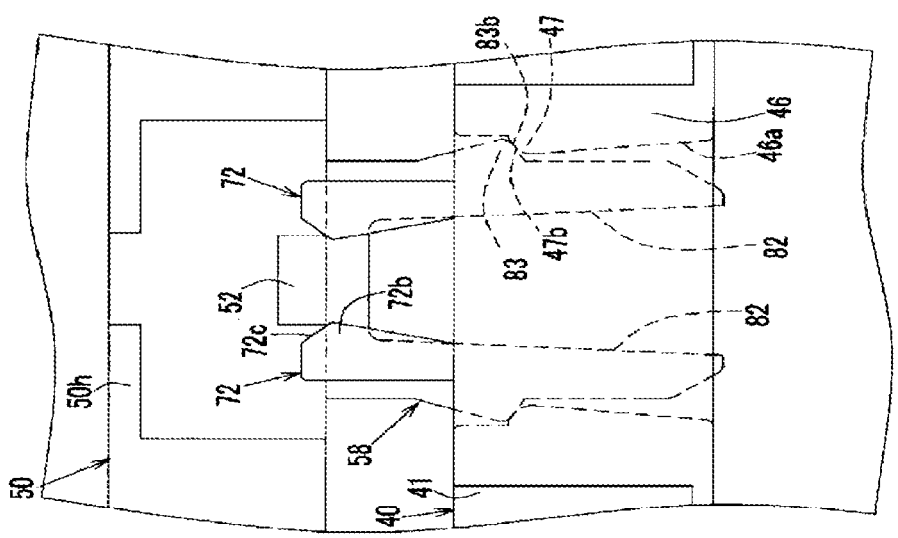

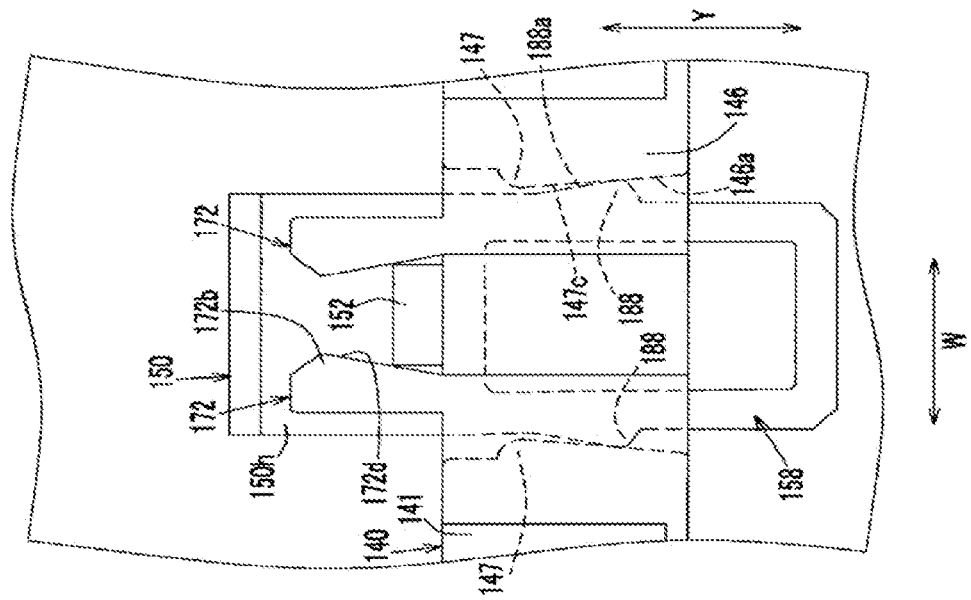
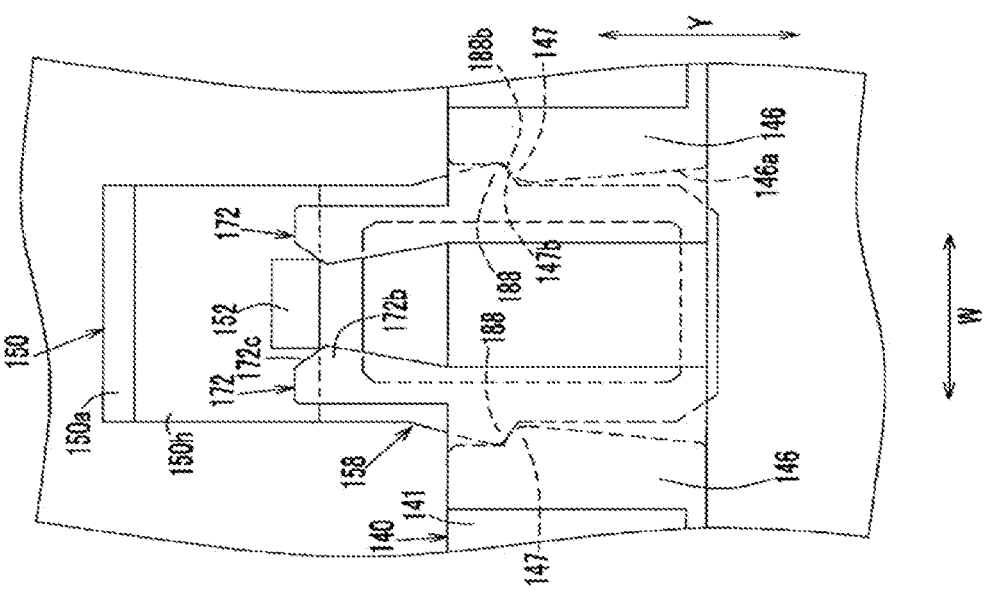

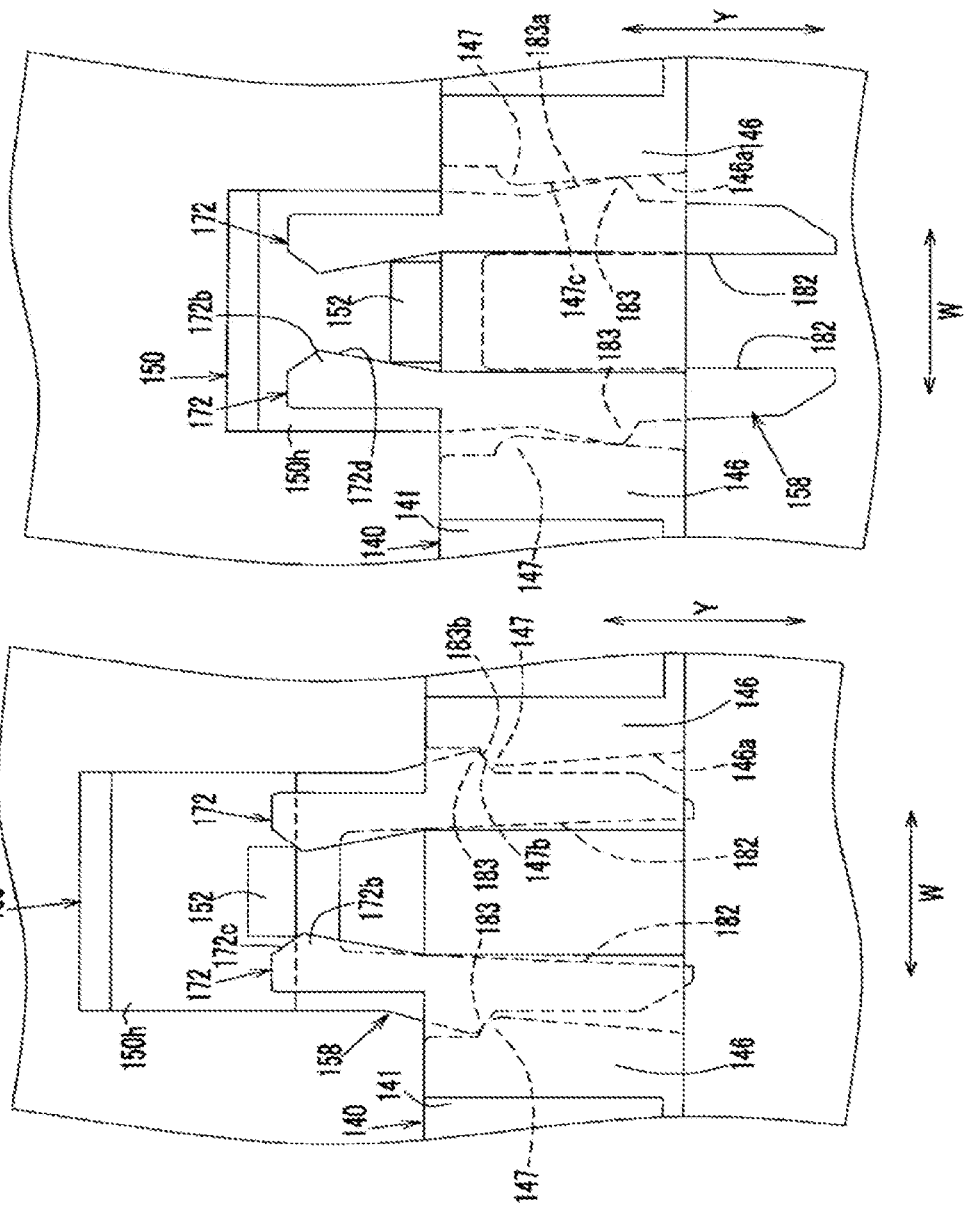

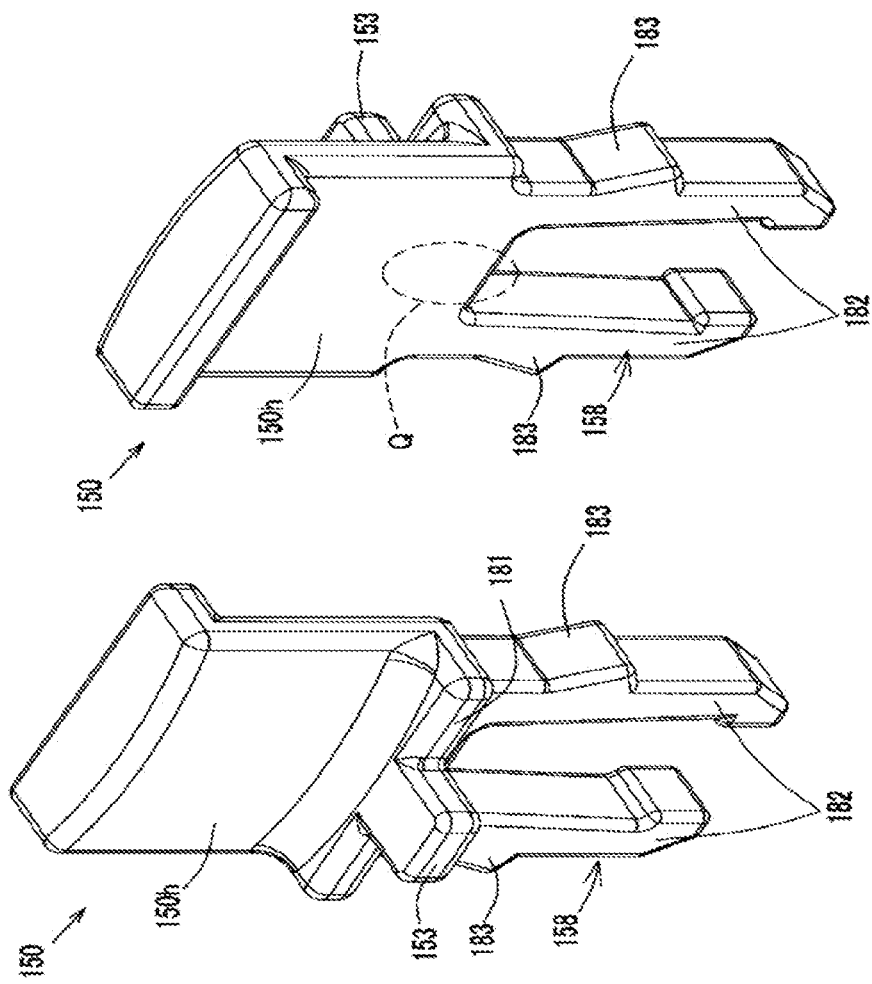

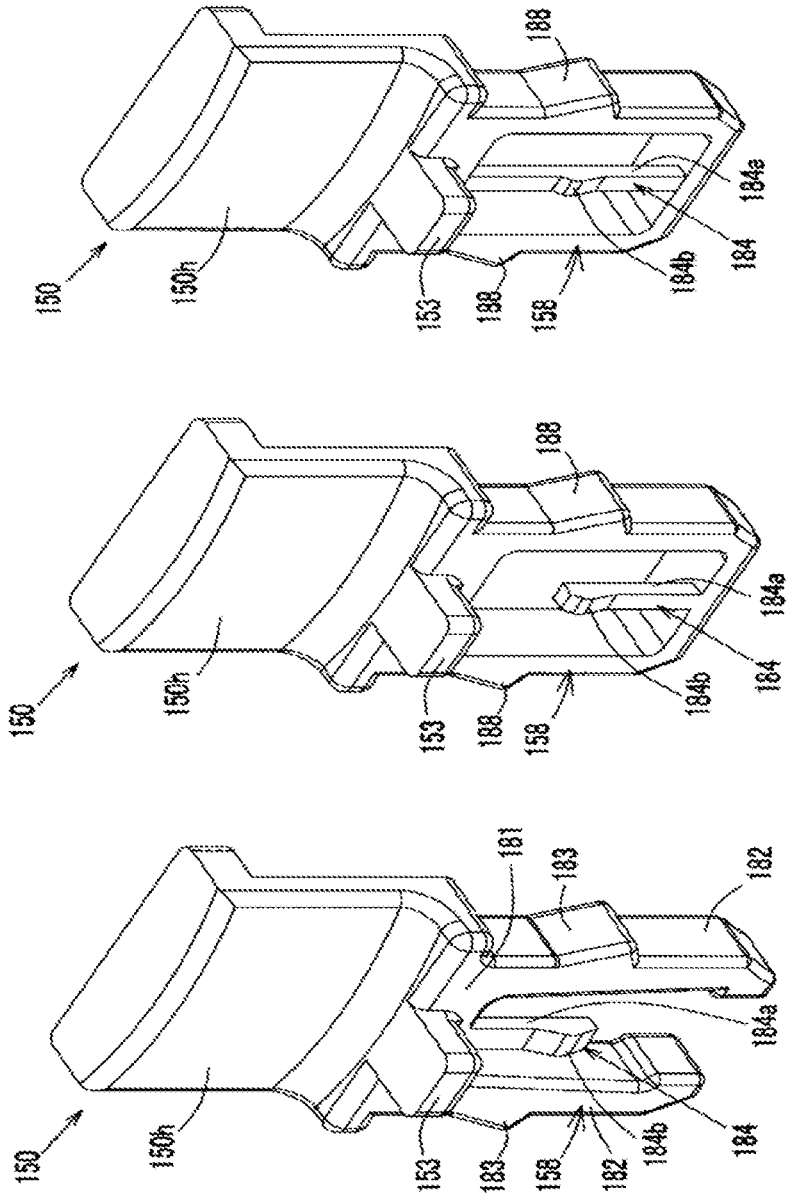

ROTARY CONNECTOR DEVICE

CROSS-REFERENCE TO RELATED APPLICATIONS

This application is a United States national stage application of International Application No. PCT/JP2018/004733, filed Feb. 9, 2018, which designates the United States, and claims priority to Japanese Patent Application No. 2017-023584, filed Feb. 10, 2017, and Japanese Patent Application No. 2017-023600, filed Feb. 10, 2017, and the entire contents of each of the above applications are hereby incorporated herein by reference in entirety.

TECHNICAL FIELD

The disclosure relates to a rotary connector device that electrically connects wiring on a steering wheel side and wiring on a vehicle body side of an automobile or the like.

BACKGROUND ART

A rotary connector device in the related art includes a stationary member which is attached to a vehicle body side, a rotary member which is attached to the stationary member to be capable of relative rotation with respect to the stationary member and to which a steering wheel is to be attached, and an intermediate stationary mechanism which temporarily fixes a rotation position of the rotary member at an intermediate position (Patent Literature 1).

The intermediate stationary mechanism includes an intermediate stationary member movable between a locked position and a lock released position, and a spiral spring that biases the intermediate stationary member toward the locked position. At the locked position, the intermediate stationary member locks (namely, temporarily fixes) relative rotation of the rotary member. At the lock released position, the intermediate stationary member unlocks the lock.

In this intermediate stationary mechanism, when the intermediate stationary member is biased toward the locked position by the spiral spring, the rotation position of the rotary member is temporarily fixed at the intermediate position. Then, when an insertion convex portion of a steering wheel is inserted into an insertion hole of the rotary member, the intermediate stationary member is moved from the locked position to the lock released position. As a result, the rotary member transitions from a state of being locked (namely, temporarily fixed) at a rotation intermediate position to a state capable of relative rotation.

CITATION LIST

Patent Literature

Patent Literature 1: JP 2010-129187 A

SUMMARY

Technical Problem

However, since a spiral spring is used to temporarily fix the intermediate stationary member at the locked position in the rotary connector device in the related art, there has been a problem in that the number of components and assembly man-hours are increased and assembly workability is reduced.

In view of the above, the disclosure has an object to provide a rotary connector device capable of reducing the number of components and enhancing assembly workability.

Solution to Problem

The disclosure is directed to a rotary connector device including a stationary member, a rotary member, and an intermediate stationary member. The rotary member is to be attached to the stationary member to be capable of relative rotation with respect to the stationary member. The rotary member includes a steering wheel insertion hole into which an insertion convex portion of a steering wheel is to be inserted. The intermediate stationary member is provided to be movable between a locked position and a lock released position with respect to the rotary member. The intermediate stationary member is provided with a regulating portion. The regulating portion is configured to, at the locked position, regulate relative rotation of the rotary member when the regulating portion is engaged with the stationary member. The regulating portion is configured to, at the lock released position, release regulation between the rotary member and the stationary member. When the intermediate stationary member is pressed by the insertion convex portion inserted into the steering wheel insertion hole, the intermediate stationary member is moved from the locked position to the lock released position. One of the intermediate stationary member and the rotary member is provided with an engagement portion. The other one of the intermediate stationary member and the rotary member is provided with an engaged portion. When one of the engagement portion and the engaged portion is engaged with the other one of the engagement portion and the engaged portion from a direction orthogonal to an axial direction of the rotary member, the intermediate stationary member is temporarily fixed at the locked position.

Note that the above "axial direction of the rotary member" refers to a direction that is in parallel with an insertion direction in which the insertion convex portion of a steering wheel is inserted into the steering wheel insertion hole. The "direction orthogonal to an axial direction of the rotary member" refers to one of a circumferential direction and a radial direction of the rotary member, for example.

According to the disclosure, one of the intermediate stationary member and the rotary member is provided with an engagement portion. The other one of the intermediate stationary member and the rotary member is provided with an engaged portion. When one of the engagement portion and the engaged portion is engaged with the other one of the engagement portion and the engaged portion from a direction orthogonal to the axial direction of the rotary member, the intermediate stationary member is temporarily fixed at the locked position. Therefore, a spiral spring for biasing the intermediate stationary member toward a locked position side to temporarily fix the intermediate stationary member at the locked position can be omitted. As a result, the number of components can be reduced, and assembly workability can be enhanced.

Particularly, one of the engagement portion and the engaged portion is engaged with the other one of the engagement portion and the engaged portion from a direction orthogonal to the axial direction of the rotary member. Therefore, when the insertion convex portion of a steering wheel is inserted into the steering wheel insertion hole of the rotary member, inhibition of movement of the intermediate stationary member from the locked position to the lock released position due to obstruction of the engagement portion and the engaged portion can be prevented. Further, a backlash of the intermediate stationary member in a direction orthogonal to the axial direction can be reduced.

Further, as one aspect of the disclosure, the intermediate stationary member may be formed to have an annular shape, and may be fitted into an inside of the steering wheel insertion hole of the rotary member to be movable in the axial direction of the rotary member.

According to the disclosure, with a simple structure, the intermediate stationary member can be disposed inside the steering wheel insertion hole of the rotary member to be movable in the axial direction of the rotary member.

Further, as one aspect of the disclosure, as the engagement portion, a first engagement portion projecting in a radial direction of the rotary member is provided. As the engaged portion, a first engaged portion to be engaged with the first engagement portion is provided. Therefore, the engagement portion can be provided with a simple structure.

Further, as one aspect of the disclosure, the one of the intermediate stationary member and the rotary member may be provided with a wall portion spaced apart from a locked position side of the first engagement portion. In a state where the intermediate stationary member is located at the lock released position, the first engaged portion may be fitted between the first engagement portion and the wall portion.

In this manner, in a state where the intermediate stationary member is located at the lock released position, a backlash of the intermediate stationary member in the axial direction can be reduced.

Further, as one aspect of the disclosure, the engaged portion may be engaged from both sides of the engagement portion.

According to the disclosure, a backlash of the intermediate stationary member in a direction orthogonal to the axial direction can be reduced even more.

Further, as one aspect of the disclosure, a flange portion protruded toward an inside in a radial direction may be provided on an inner peripheral surface of the steering wheel insertion hole of the rotary member. The first engaged portion may be provided upright at the flange portion in the axial direction of the rotary member.

Note that the first engaged portion may include a pair of elastic pieces provided upright at the flange portion and disposed on both sides of the first engagement portion. A convex portion to be engaged with the first engagement portion may be provided on a facing surface of each of the elastic pieces.

According to the disclosure, with a simple structure, the first engaged portion can be provided upright toward the axial direction of the rotary member.

Further, as one aspect of the disclosure, the rotary member may include a cylindrically shaped inner peripheral surface. As the engaged portion, a convex portion may be provided on an inner peripheral surface of the rotary member. As the engagement portion, a second engagement portion projecting opposite a projecting direction of the convex portion may be provided in the intermediate stationary member.

According to the disclosure, the second engagement portion as the engagement portion and the convex portion as the engaged portion are disposed side by side in the radial direction of the rotary member. Therefore, the engagement portion and the engaged portion can be disposed compactly with regard to the circumferential direction of the rotary member. Further, the second engagement portion as the engagement portion is disposed on a front surface of an inner peripheral surface of the rotary member through the convex portion as the engaged portion. Therefore, an engaging force from the engagement portion toward the engaged portion can be received at the inner peripheral surface of the rotary member, and thus the engaging force can be securely caused to act on the engaged portion. As a result, the engagement portion and the engaged portion can be securely engaged with each other.

Further, as one aspect of the disclosure, the intermediate stationary member may be provided with the regulating portion projecting toward the stationary member side and spaced apart from a locked position side of the second engagement portion. In a state where the intermediate stationary member is located at the locked position, relative rotation of the rotary member may be regulated when the regulating portion is engaged with the stationary member, and in a state where the intermediate stationary member is located at the lock released position, the intermediate stationary member may be fixed at the lock released position when the convex portion is fitted between the second engagement portion and the regulating portion.

According to the disclosure, with a simple structure of causing the convex portion to be fitted between the regulating portion and the engagement portion, the intermediate stationary member can be fixed at the lock released position. Further, the regulating portion is provided to be spaced apart from a locked position side of the engagement portion. Specifically, the regulating portion and the engagement portion are disposed side by side in the axial direction of the rotary member. Therefore, in a state where the intermediate stationary member is fixed at the lock released position, a backlash of the intermediate stationary member in the axial direction can be reduced.

Further, as one aspect of the disclosure, as the engaged portion, another convex portion may be provided to be spaced apart from a lock released position side of the convex portion. When the other engagement portion is fitted between the convex portion and the secondary convex portion, the intermediate stationary member may be temporarily fixed at the lock released position.

According to the disclosure, with a simple structure of causing the second engagement portion as the engagement portion to be fitted between the convex portion and the secondary convex portion, the intermediate stationary member can be temporarily fixed at the lock released position. Further, the secondary convex portion is provided to be spaced apart from a lock released position side of the convex portion. Specifically, the convex portion and the secondary convex portion are disposed side by side in the axial direction of the rotary member. Therefore, in a state where the intermediate stationary member is temporarily fixed at the lock released position, a backlash of the intermediate stationary member in the axial direction can be reduced.

Further, as one aspect of the disclosure, the rotary member may be provided with an exposure window connecting to an outside at a position adjacent to a lock released position side of the convex portion.

According to the disclosure, in a state where the intermediate stationary member is located at the lock released position, the convex portion of the engagement portion is engaged with a surface on a lock released position side of the convex portion.

According to the disclosure, engagement between the engagement portion and the convex portion can be released in the following manner. Specifically, in a state where the intermediate stationary member is located at the lock released position, a rod is inserted into the exposure window from the outside. Then, with the rod, the engagement portion is pressed toward the inside in the radial direction so that the engagement portion is moved further toward an inner side in the radial direction than the convex portion. In this released state, the intermediate stationary member is moved from the lock released position to the locked position. In this manner, the intermediate stationary member can be returned to the locked position.

Further, as one aspect of the disclosure, the intermediate stationary member may be provided with an insertion portion in a state of projecting in the axial direction. An attachment portion may be provided on an inner peripheral surface of the steering wheel insertion hole of the rotary member. The attachment portion may be provided with an intermediate stationary member insertion hole extending along the axial direction. The insertion portion may be inserted into the intermediate stationary member insertion hole to be movable in an insertion direction.

According to the disclosure, when the insertion portion is inserted into the intermediate stationary member insertion hole, the intermediate stationary member is attached to the rotary member. Therefore, a backlash of the intermediate stationary member can be reduced.

Further, as one aspect of the disclosure, the insertion portion may include a pair of elastic pieces disposed to face each other and to be spaced apart from each other in a front view. As the engagement portion, third engagement portions may be provided on respective outer surfaces of the pair of elastic pieces in a direction of mutual facing. As the engaged portion, third engaged portions may be provided on an inner peripheral surface of the intermediate stationary member insertion hole.

According to the disclosure, the third engagement portions as the engagement portion and the third engaged portions as the engaged portion are disposed by utilizing a gap between the insertion portion and the intermediate stationary member insertion hole. Therefore, there is no longer a necessity of separately securing a position for disposing the engagement portions and the engaged portions.

Further, the third engagement portions as the engagement portion are provided on respective outer surfaces of the pair of elastic pieces of the insertion portion in a direction of mutual facing. Therefore, the engagement portion and the engaged portion can be elastically engaged with each other, and a backlash between the intermediate stationary member and the rotary member (in particular, a backlash of the pair of elastic pieces in the direction of mutual facing) can be reduced.

Further, as one aspect of the disclosure, the insertion portion may be provided with a pressing portion between the third engagement portions on both sides. The pressing portion may press a part of an inner peripheral surface of the intermediate stationary member insertion hole, the part facing a front surface of the pressing portion.

According to the disclosure, a backlash of the pressing portion of the intermediate stationary member in a front direction (for example, a backlash of the intermediate stationary member in the radial direction) can be reduced.

Further, as one aspect of the disclosure, the intermediate stationary member may be provided with the regulating portion projecting from the engagement portion toward the stationary member side. In a state where the intermediate stationary member is temporarily fixed at the locked position, relative rotation of the rotary member may be regulated when the regulating portion is engaged with the stationary member.

According to the disclosure, the regulating portion and the engagement portion can be concentrated to be disposed at one position. Therefore, the structure of the intermediate stationary member can be simplified.

Further, as one aspect of the disclosure, the intermediate stationary member may be disposed inside the steering wheel insertion hole. One of a fitting convex portion and a fitting concave groove portion extending in the axial direction may be provided on an inner peripheral surface of the steering wheel insertion hole. The other one of the fitting convex portion and the fitting concave groove portion may be provided on an outer peripheral surface of the intermediate stationary member. In a state where the intermediate stationary member is located at the lock released position, the fitting convex portion may be fitted into the fitting concave groove portion.

According to the disclosure, in a state where the intermediate stationary member is located at the lock released position, the fitting convex portion is fitted into the fitting concave groove portion. Therefore, relative movement between the intermediate stationary member and the rotary member in the circumferential direction can be regulated. In this manner, a backlash of the intermediate stationary member in the circumferential direction (namely, a direction orthogonal to the axial direction) can be reduced.

Further, as one aspect of the disclosure, the intermediate stationary member may be formed to have a vertically oblong shape extending in the axial direction of the rotary member. A lower portion of the intermediate stationary member may constitute an insertion portion. The rotary member may be provided with an intermediate stationary member insertion hole extending in the axial direction of the rotary member. The insertion portion may be inserted into the intermediate stationary member insertion hole to be movable in the axial direction.

According to the disclosure, one of the intermediate stationary member and the rotary member is provided with an engagement portion. The other one of the intermediate stationary member and the rotary member is provided with an engaged portion. When one of the engagement portion and the engaged portion is engaged with the other one of the engagement portion and the engaged portion from a direction orthogonal to the axial direction of the rotary member, the intermediate stationary member is temporarily fixed at the locked position. Therefore, a spiral spring for biasing the intermediate stationary member toward a locked position side to temporarily fix the intermediate stationary member at the locked position can be omitted. As a result, the number of components can be reduced, and assembly workability can be enhanced.

Particularly, one of the engagement portion and the engaged portion is engaged with the other one of the engagement portion and the engaged portion from both sides in a direction orthogonal to the axial direction of the rotary member. Therefore, when the insertion convex portion of a steering wheel is inserted into the steering wheel insertion hole of the rotary member, inhibition of movement of the intermediate stationary member from the locked position to the lock released position due to obstruction of the engagement portion and the engaged portion can be prevented. Further, a backlash of the intermediate stationary member in a direction orthogonal to the axial direction can be reduced.

Further, the intermediate stationary member is formed to have a vertically oblong shape. A lower portion of the intermediate stationary member constitutes an insertion portion. The rotary member is provided with an intermediate stationary member insertion hole extending in the axial direction of the rotary member. The insertion portion is inserted into the intermediate stationary member insertion hole to be movable in the axial direction. In this manner, the intermediate stationary member is attached to the rotary member. Therefore, a backlash of the intermediate stationary member can be further reduced.

As one aspect of the disclosure, as the engagement portion, a fourth engagement portion projecting in a radial direction of the rotary member may be provided. As the engaged portion, a fourth engaged portion to be engaged with the fourth engagement portion may be provided. According to the disclosure, the engagement portion can be provided with a simple structure.

Further, as one aspect of the disclosure, a flange portion protruded toward an inside in a radial direction may be provided on an inner peripheral surface of the steering wheel insertion hole of the rotary member. The fourth engaged portion may be provided upright at the flange portion in the axial direction of the rotary member.

Note that the fourth engaged portion may include a pair of elastic pieces provided upright at the flange portion and disposed on both sides of the fourth engagement portion. A convex portion to be engaged with the fourth engagement portion may be provided on a facing surface of each of the elastic pieces.

According to the disclosure, with a simple structure, the fourth engaged portion can be provided upright toward the axial direction of the rotary member.

Further, as one aspect of the disclosure, the insertion portion may be formed to have an annular shape in a front view. As the engagement portion, fifth engagement portions may be provided on respective outer surfaces in a front view of parts on both sides of the insertion portion in a front view. As the engaged portion, fifth engaged portions to be engaged with the fifth engagement portions may be provided on an inner peripheral surface of the intermediate stationary member insertion hole.

According to the disclosure, the fifth engagement portions as the engagement portion and the fifth engaged portions as the engaged portion are disposed by utilizing a gap between the insertion portion and the intermediate stationary member insertion hole. Therefore, there is no longer a necessity of separately securing a position for disposing the engagement portions and the engaged portions.

Further, the insertion portion is formed to have an annular shape. Therefore, the insertion portion can elastically change its shape in a diameter direction. The fifth engagement portions as the engagement portion are provided on respective outer sides in a front view of parts on both sides of the annular insertion portion in a front view. Therefore, the engagement portions and the engaged portions can be elastically engaged with each other, and a backlash of the intermediate stationary member (in particular, a backlash of the insertion portion in a width direction in a front view) can be reduced.

Further, as one aspect of the disclosure, the insertion portion may include a pair of elastic pieces disposed to face each other and to be spaced apart from each other in a front view. As the engagement portion, sixth engagement portions may be provided on respective outer surfaces of the pair of elastic pieces in a direction of mutual facing. As the engaged portion, sixth engaged portions to be engaged with the sixth engagement portions may be provided on an inner peripheral surface of the intermediate stationary member insertion hole.

According to the disclosure, the sixth engagement portions as the engagement portion and the sixth engaged portions as the engaged portion are disposed by utilizing a gap between the insertion portion and the intermediate stationary member insertion hole. Therefore, there is no longer a necessity of separately securing a position for disposing the engagement portions and the engaged portions.

Further, the sixth engagement portions as the engagement portion are provided on respective outer surfaces of the pair of elastic pieces of the insertion portion in a direction of mutual facing. Therefore, the engagement portion and the engaged portion can be elastically engaged with each other, and a backlash between the intermediate stationary member and the rotary member (in particular, a backlash of the pair of elastic pieces in the facing direction) can be reduced.

Further, as one aspect of the disclosure, the insertion portion may be provided with a pressing portion between the engagement portions on both sides. The pressing portion may press a part of an inner peripheral surface of the intermediate stationary member insertion hole, the part facing a front surface of the pressing portion.

According to the disclosure, a backlash of the pressing portion of the intermediate stationary member in a front direction (for example, a backlash of the intermediate stationary member in the radial direction) can be reduced.

Further, as one aspect of the disclosure, the intermediate stationary member may be provided with the regulating portion projecting from the engagement portion toward the stationary member side. In a state where the intermediate stationary member is temporarily fixed at the locked position, relative rotation of the rotary member may be regulated when the regulating portion is engaged with the stationary member.

According to the disclosure, the regulating portion and the engagement portion can be concentrated to be disposed at one position. Therefore, the structure of the intermediate stationary member can be simplified.

Advantageous Effects of Invention

According to the disclosure, a rotary connector device capable of reducing the number of components and enhancing assembly workability can be provided.

BRIEF DESCRIPTION OF DRAWINGS

FIG. 13A and FIG. 13B are front views illustrating an engagement portion of the intermediate stationary member according to a first modified example; FIG. 13A is a diagram illustrating the rotary member in a locked state and FIG. 13B is a diagram illustrating the rotary member in a lock released state.

FIG. 14A is a diagram illustrating the rotary member in a locked state and FIG. 14B is a diagram illustrating the rotary member in a lock released state.

FIG. 15A is a diagram illustrating the rotary member in a locked state and FIG. 15B is a diagram illustrating the rotary member in a lock released state.

FIG. 20A is a partially enlarged view of the rotary connector device in a locked state. FIG. 20B is a partially enlarged view of the rotary connector device in a lock released state.

FIG. 32 is a front view illustrating an engagement portion and an engaged portion according to the seventh modified example.

FIG. 33 is a perspective view illustrating the intermediate stationary member according to an eighth modified example.

FIG. 34 is a front view illustrating the engagement portion and the engaged portion according to the eighth modified example; FIG. 34A is a front view in a locked state and FIG. 34B is a perspective view in a lock released state.

FIG. 35 is a perspective view illustrating the intermediate stationary member according to a ninth modified example.

FIG. 36 is a front view illustrating the engagement portion and the engaged portion according to the ninth modified example; FIG. 36A is a front view in a locked state and FIG. 36B is a perspective view in a lock released state.

FIG. 37 is a perspective view illustrating the intermediate stationary member according to a tenth modified example; FIG. 37A is a perspective view of the intermediate stationary member seen from an outer main surface side and FIG. 37B is a perspective view of the intermediate stationary member seen from an inner main surface side.

FIGS. 38A to 38C are perspective views illustrating variations of the intermediate stationary member according to an eleventh modified example.

DESCRIPTION OF EMBODIMENTS

In the following, one embodiment of the disclosure will be described based on the drawings.

Embodiment

With reference to FIG. 1 to FIG. 12, a rotary connector device 1 according to the present embodiment will be described.

Figure 1:
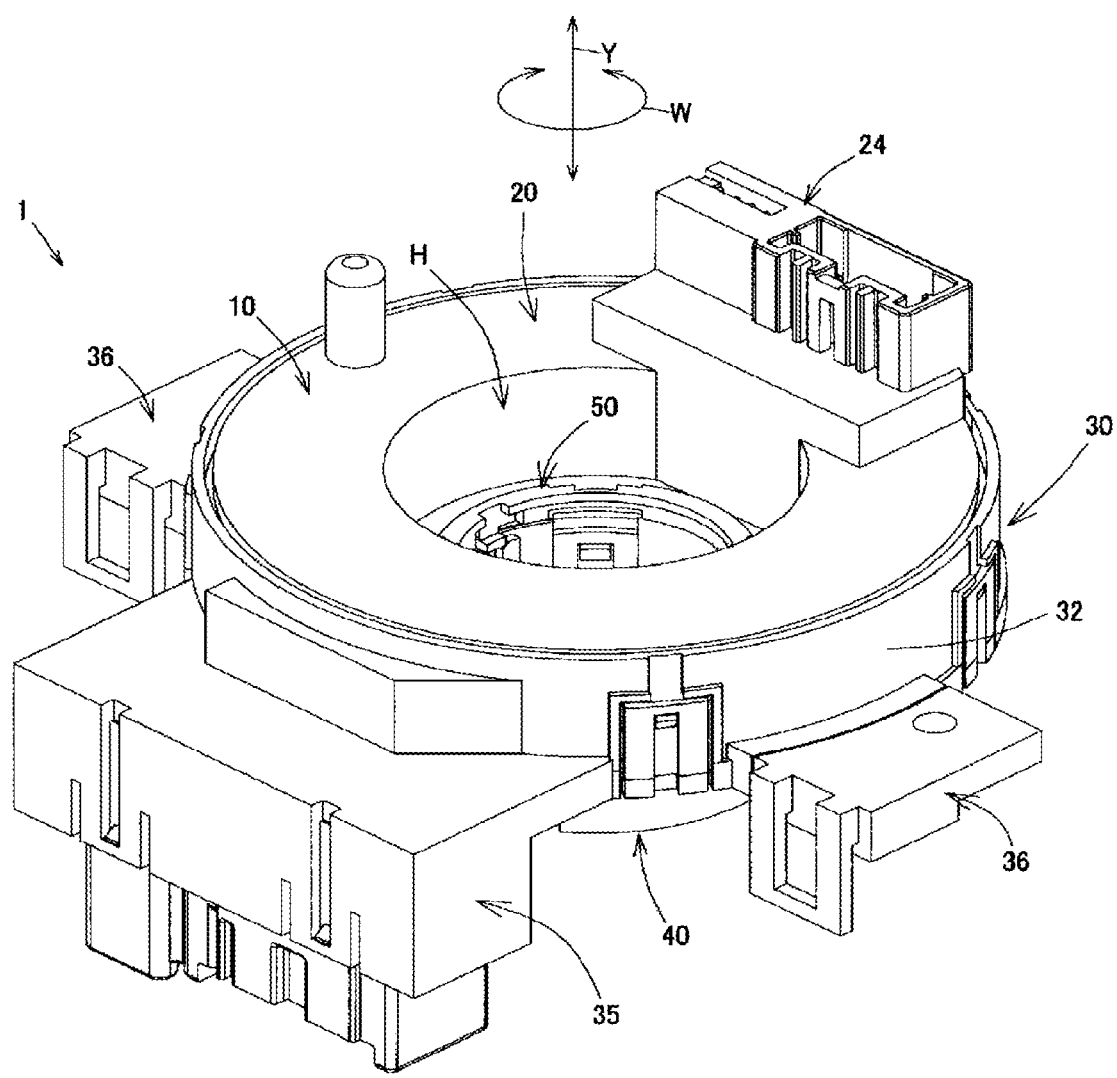
FIG. 1 is a perspective view illustrating a rotary connector device according to an embodiment of the disclosure.
Figure 2:
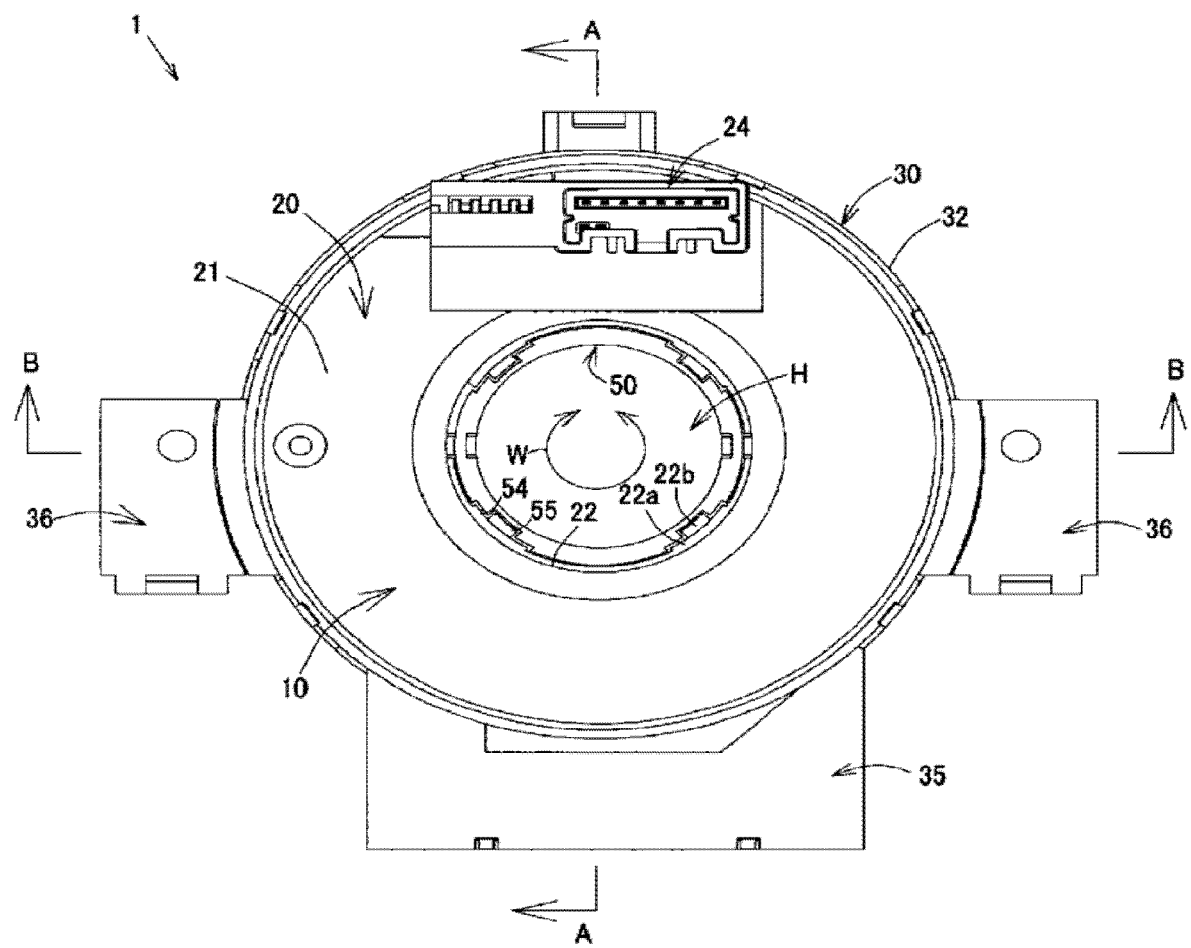
FIG. 2 is a plan view illustrating the rotary connector device according to the embodiment of the disclosure.
Figure 3:
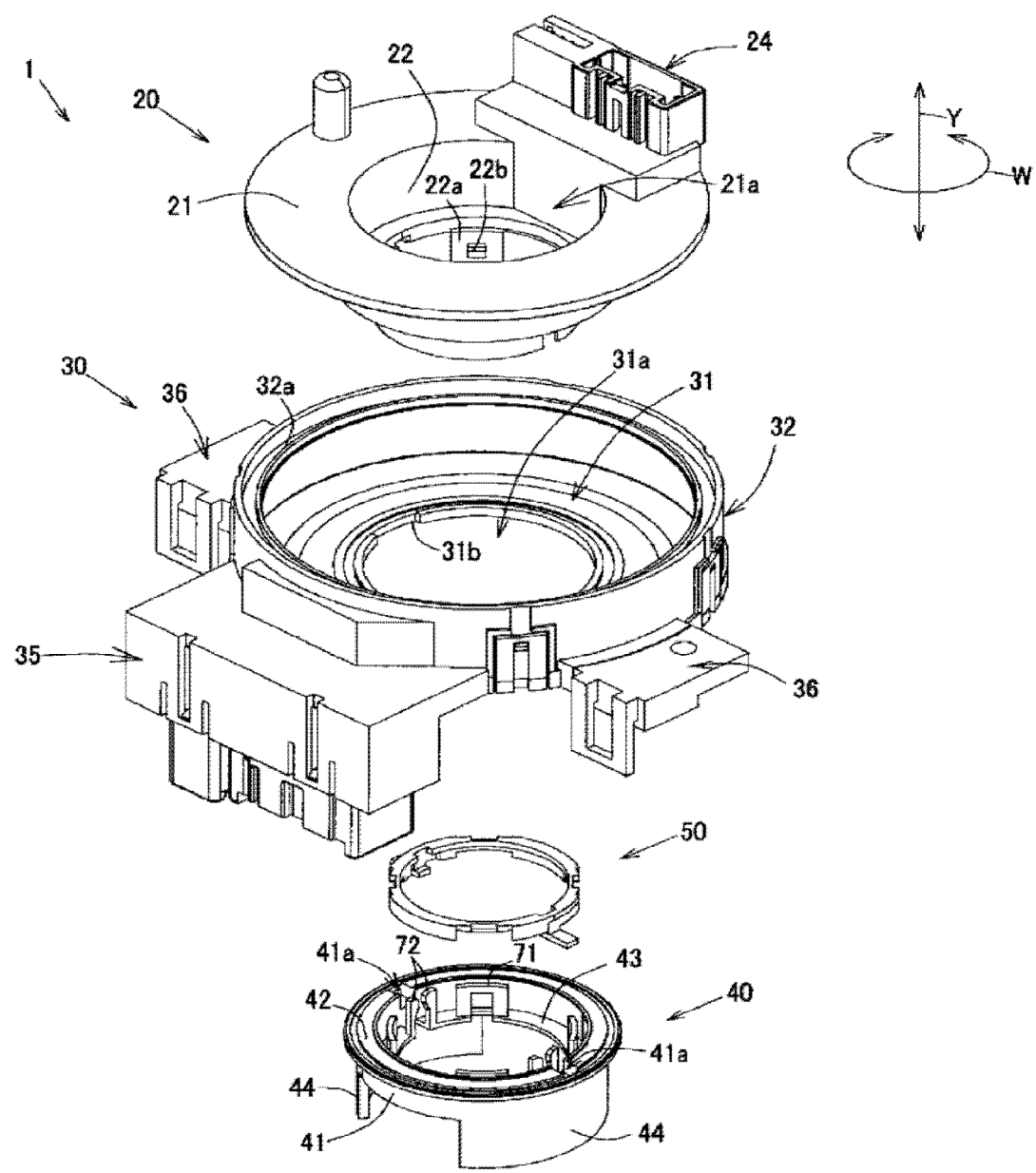
FIG. 3 is an exploded perspective view illustrating the rotary connector device according to the embodiment of the disclosure.

The rotary connector device 1 is a device that electrically connects wiring of a steering wheel and wiring of a vehicle body that are mounted in a vehicle (for example, an automobile). As illustrated in FIG. 1 to FIG. 3, the rotary connector device 1 includes a rotator 20 and a sleeve 40 that constitute a rotary member 10 to which a steering wheel (not illustrated) is to be attached, a stator serving as a stationary member 30 to be attached to a vehicle body, a flat cable (not illustrated) that electrically connects wiring of a steering wheel and wiring of a vehicle body, and an intermediate stationary member 50 that temporarily fixes relative rotation of the rotary member 10 with respect to the stationary member 30. The stationary member 30 is hereinafter also referred to as a stator 30. The rotator 20, the stator 30, the sleeve 40, and the intermediate stationary member 50 are formed of resin, for example.

The intermediate stationary member 50 is attached to the rotary member 10 in such a manner that the intermediate stationary member 50 is movable between a locked position and a lock released position. The locked position is a position for locking relative rotation of the rotary member 10 with respect to the stationary member 30. The lock released position is a position for releasing the lock. When an insertion convex portion 700 (FIG. 6) of a steering wheel is inserted into an insertion hole H (steering wheel insertion hole) of the rotary member 10, the intermediate stationary member 50 is moved from the locked position to the lock released position, and the lock of relative rotation of the rotary member 10 is released.

Note that the insertion hole H is constituted of an inner peripheral surface of an inner-circumferential cylindrical portion 22 (to be described later) of the rotator 20, and an inner peripheral surface of a cylindrical portion 41 (to be described later) of the sleeve 40. Note that reference sign Y of FIG. 1 etc. denotes an axial direction of the insertion hole H (namely, an axial direction of the rotary member 10 and the intermediate stationary member 50), and reference sign W denotes a circumferential direction of the insertion hole H (namely, a circumferential direction of the rotary member 10 and the intermediate stationary member 50).

Figure 4:
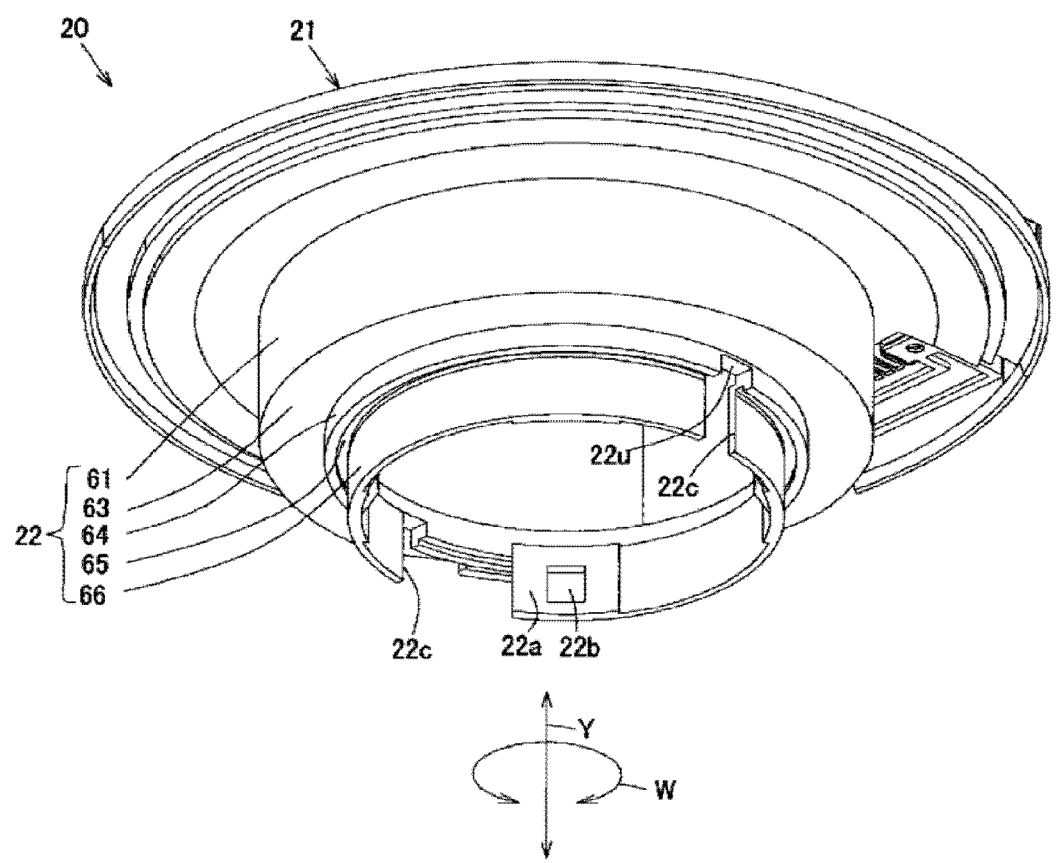
FIG. 4 is a perspective view of a sleeve seen from a lower side.

As illustrated in FIG. 3 and FIG. 4, the rotator 20 includes a rotating-side ring plate 21 having a substantially annular shape, and an inner-circumferential cylindrical portion 22 having a shape of a circular cylinder. The rotating-side ring plate 21 has a through hole 21a having a substantially circular shape (for example, substantially D-like shape in a planar view), at a center of the rotating-side ring plate 21. The inner-circumferential cylindrical portion 22 extends downward from an inner-circumferential edge portion of the rotating-side ring plate 21.

A rotating-side connector 24 is provided on an upper surface of the rotating-side ring plate 21. For example, the rotating-side connector 24 is an electrical connection connector to which an electrical connection connector connected to an electric circuit (for example, a horn switch and an air bag unit) provided in a steering wheel is to be connected.

For example, the inner-circumferential cylindrical portion 22 is formed to have a stepped cylindrical shape. The inner-circumferential cylindrical portion 22 includes a large diameter cylindrical portion 61 having a shape of a circular cylinder, an upper-side step portion 63 having an annular shape, a medium diameter cylindrical portion 64 having a shape of a circular cylinder, a lower-side step portion 65, and a small diameter cylindrical portion 66 having a shape of a circular cylinder. The large diameter cylindrical portion 61 extends downward from an inner-circumferential edge portion of the rotating-side ring plate 21. The upper-side step portion 63 is protruded from a lower end circumferential edge portion of the large diameter cylindrical portion 61 toward the inside in a radial direction. The medium diameter cylindrical portion 64 extends downward from an inner-circumferential edge portion of the upper-side step portion 63. The lower-side step portion 65 is protruded from a lower end circumferential edge portion of the medium diameter cylindrical portion 64 toward the inside in the radial direction. The small diameter cylindrical portion 66 extends downward from an inner-circumferential edge portion of the lower-side step portion 65. Therefore, a diameter of each of an outer peripheral surface and an inner peripheral surface of the inner-circumferential cylindrical portion 22 is reduced from an upper end toward a lower end at a position of the upper-side step portion 63 in a stepped manner, and is further reduced at a position of the lower-side step portion 65 in a stepped manner.

Note that an inner diameter of the large diameter cylindrical portion 61 is formed to have a dimension substantially the same as a dimension of a diameter of the insertion convex portion 700 of a steering wheel, such that the insertion convex portion 700 of a steering wheel can be fitted into the large diameter cylindrical portion 61. A diameter of the medium diameter cylindrical portion 64 is formed to be smaller than the diameter of the large diameter cylindrical portion 61. A diameter of the small diameter cylindrical portion 66 is formed to be smaller than the diameter of the medium diameter cylindrical portion 64. A length of the medium diameter cylindrical portion 64 in the axial direction Y is substantially equivalent to a thickness of a stationary-side ring plate 31 (to be described later) of the stator 30. A length of the small diameter cylindrical portion 66 in the axial direction Y is formed to be substantially equivalent to a length of a cylindrical portion 41 (to be described later) of the sleeve 40 in the axial direction Y.

In an outer peripheral surface of the inner-circumferential cylindrical portion 22, a concave corner portion formed by the upper-side step portion 63 and the medium diameter cylindrical portion 64 forms a stator engagement portion with which a stationary-side ring plate 31 (to be described later) of the stator 30 is to be engaged, and a concave corner portion formed by the lower-side step portion 65 and the small diameter cylindrical portion 66 constitutes a sleeve engagement portion with which a cylindrical portion 41 (to be described later) of the sleeve 40 is to be engaged.

The inner-circumferential cylindrical portion 22 is provided with a fitting convex portion 22a for position-determination of a position of the intermediate stationary member 50 in a circumferential direction W, an engagement portion 22b to be engaged with an engaged portion 71 (to be described later) of the sleeve 40, and a guiding cutout portion 22c for guiding movement of a regulating portion 53 (to be described later) of the intermediate stationary member 50.

For example, the fitting convex portion 22a is formed to have a substantially rectangular stepped shape in a front view. A plurality of (for example, four) fitting convex portions 22a are provided over the circumferential direction W of an inner peripheral surface of the inner-circumferential cylindrical portion 22 in such a manner that the plurality of fitting convex portions 22a are spaced apart from each other. For example, the engagement portion 22b is formed to have a protruding shape, and is provided at substantially a center of an inner main surface of the fitting convex portion 22a, for example.

A plurality of (for example, two at symmetrical positions) guiding cutout portions 22c are provided in the circumferential direction W of the inner-circumferential cylindrical portion 22 in such a manner that the plurality of guiding cutout portions 22c are spaced apart from each other. Each guiding cutout portion 22c extends in a thickness direction of the inner-circumferential cylindrical portion 22. For example, each guiding cutout portion 22c is formed to have a substantially band-like shape along the axial direction Y of the inner-circumferential cylindrical portion 22. Each guiding cutout portion 22c is formed to reach an upper end of the medium diameter cylindrical portion 64, and is opened at a lower end of the inner-circumferential cylindrical portion 22. An upper end 22u of each guiding cutout portion 22c defines an upper-limit position (namely, the locked position) of a movement range of the intermediate stationary member 50. Note that the movement range of the intermediate stationary member 50 extends along the axial direction Y.

Figure 6:
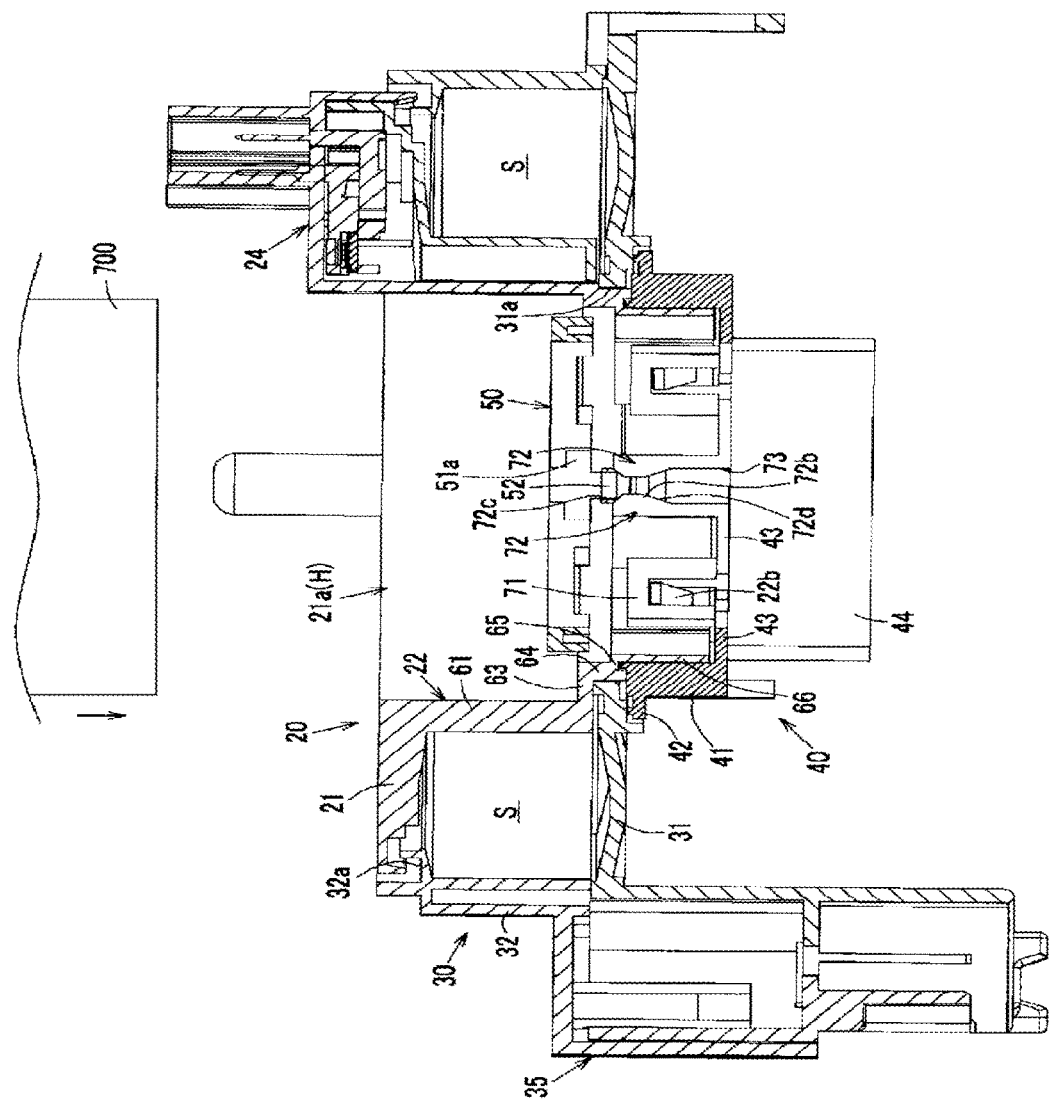
FIG. 6 is a cross-sectional view of the rotary member of FIG. 1 in a locked state, which is taken along the line A-A.

As illustrated in FIG. 3 and FIG. 6, the stator 30 includes a stationary-side ring plate 31 having a substantially annular shape, an outer-circumferential cylindrical portion 32 having a shape of a circular cylinder and extending upward from an outer-circumferential edge portion of the stationary-side ring plate 31, a stationary-side connector 35 provided on an outer peripheral surface of the outer-circumferential cylindrical portion 32, and a fixing portion 36 for fixing the stator 30 to a vehicle body.

A through hole 31a having a circular shape is provided at a center of the stationary-side ring plate 31. An outer periphery of the medium diameter cylindrical portion 64 of the rotator 20 is to be fitted and inserted into the through hole 31a. One or more (for example, two at symmetrical positions) engagement portions 31b are provided at an inner-circumferential edge portion of the stationary-side ring plate 31. A regulating portion 53 (to be described later) of the intermediate stationary member 50 is to be engaged with the engagement portion 31b. Each engagement portion 31b is formed to have such a shape that is concave toward the outside in the radial direction from an inner-circumferential edge portion of the stationary-side ring plate 31, and extends in a thickness direction of the stationary-side ring plate 31.

A diameter of the outer-circumferential cylindrical portion 32 is formed to be substantially equivalent to a diameter of the rotating-side ring plate 21 of the rotator 20. A length of the outer-circumferential cylindrical portion 32 in the axial direction Y is formed to be substantially equivalent to a length of the inner-circumferential cylindrical portion 22 of the rotator 20 in the axial direction Y. A flange portion 32a is provided on an inner peripheral surface of the outer-circumferential cylindrical portion 32. An outer-circumferential edge portion of the rotating-side ring plate 21 is to be engaged with the flange portion 32a. The flange portion 32a is provided at a position close to an upper end circumferential edge portion of an inner peripheral surface of the outer-circumferential cylindrical portion 32, and is provided to be protruded toward the inside in the radial direction of the outer-circumferential cylindrical portion 32 all over the circumferential direction W.

The stationary-side connector 35 is an electrical connection connector to which an electrical connection connector connected to an electric circuit provided in a vehicle body is to be connected. The fixing portion 36 is provided on an outer peripheral surface of the outer-circumferential cylindrical portion 32, and is provided to be protruded toward the outside in the radial direction.

As illustrated in FIG. 6, in a state where the rotator 20 is assembled to the stator 30, the rotator 20 is fitted into the inside of the outer-circumferential cylindrical portion 32 of the stator 30, and a lower surface of an outer-circumferential edge portion of the rotating-side ring plate 21 of the rotator 20 is engaged with an upper surface of the flange portion 32a of the stator 30. Further, in the state described above, the medium diameter cylindrical portion 64 of the rotator 20 is fitted into the through hole 31a at a center of the stationary-side ring plate 31 of the stator 30, and the upper-side step portion 63 of the rotator 20 is engaged with an inner-circumferential edge portion of an upper surface of the stationary-side ring plate 31 of the stator 30. In this manner, the rotator 20 is attached to the stator 30 so as to be capable of relative rotation with respect to the stator 30.

Between the stator 30 and the rotator 20 assembled as described above, an annular housing space S in which the above-mentioned flat cable is to be housed is formed. The housing space S is a space surrounded by the inner-circumferential cylindrical portion 22, the outer-circumferential cylindrical portion 32, the rotating-side ring plate 21, and the stationary-side ring plate 31.

The above-mentioned flat cable is housed in the housing space S in the following state. Specifically, a plurality of flat cables are stacked, the stacked flat cables are wound clockwise and counterclockwise along an outer peripheral surface of the inner-circumferential cylindrical portion 22 and an inner peripheral surface of the outer-circumferential cylindrical portion 32. The stacked flat cables are wound clockwise as many turns as the stacked flat cables are wound counterclockwise. A first end portion of the above-mentioned flat cable is electrically connected to the rotating-side connector 24. A second end of the above-mentioned flat cable is electrically connected to the stationary-side connector 35. Note that a rotation position of the rotary member 10, at which the number of clockwise turns of the flat cable is the same as the number of counterclockwise turns of the flat cable when the rotary member 10 is caused to make relative rotation with respect to the stationary member 30, is referred to as an intermediate position of the rotary member 10.

Figure 5:
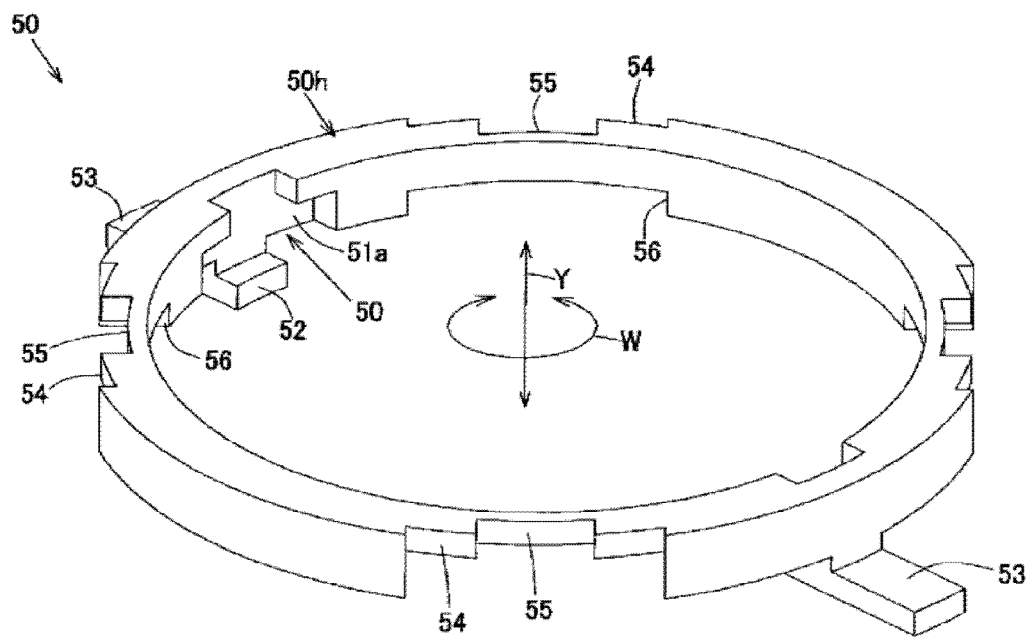
FIG. 5 is a perspective view illustrating an intermediate stationary member.

As illustrated in FIG. 5, the intermediate stationary member 50 is a member that temporarily fixes the rotator 20 at the intermediate position with respect to the stator 30, and includes, for example, an intermediate stationary member main body 50h having an annular shape. The intermediate stationary member main body 50h has an outer diameter substantially equivalent to an inner diameter of the small diameter cylindrical portion 66 of the rotator 20. The intermediate stationary member main body 50h is provided with an housing concave portion 51 in which an engaged portion 72 (to be described later) of the sleeve 40 is housed, an engagement portion 52 (first engagement portion) to be engaged with the engaged portion 72 (to be described later) of the sleeve 40, and a regulating portion 53 to be engaged with the engagement portion 31b of the stator 30 to regulate relative rotation of the rotary member 10 with respect to the stationary member 30.

One or more (for example, two at symmetrical positions) housing concave portions 51 are provided on an inner peripheral surface of the intermediate stationary member main body 50h along the circumferential direction W. A lower end of the housing concave portion 51 is opened at a lower end of the intermediate stationary member main body 50h. For example, the engagement portion 52 is formed to have a shape of a columnar rectangular parallelepiped. The engagement portion 52 is provided to project from a center of a lower end of each housing concave portion 51 in the circumferential direction W toward the inside in the radial direction of the intermediate stationary member main body 50h (namely, the radial direction of the rotary member 10). For example, the regulating portion 53 is formed to have a shape of a rod-like rectangular parallelepiped. The regulating portion 53 is provided to extend and project from an end portion of the outside in the radial direction of each engagement portion 52 toward the outside in the radial direction. Specifically, the engagement portion 52 and the regulating portion 53 are concentrated at one position, and are formed integrally with each other.

Further, the intermediate stationary member main body 50h is provided with a fitting concave groove portion 54 into which the fitting convex portion 22a of the rotator 20 is to be fitted, a passing concave groove portion 55 through which the engagement portion 22b of the rotator 20 is to pass, and a fitting concave portion 56 into which an upper portion of an engaged portion 71 (to be described later) of the sleeve 40 is to be fitted.

The fitting concave groove portion 54 is provided on an outer peripheral surface of the intermediate stationary member main body 50h. The fitting concave groove portion 54 is provided along the axial direction Y of the intermediate stationary member main body 50h, at a position corresponding to each fitting convex portion 22a of the rotator 20. The fitting concave groove portion 54 is opened at an upper end and a lower end of the intermediate stationary member main body 50*h*. The passing concave groove portion 55 is provided at a bottom portion of each fitting concave groove portion 54. The passing concave groove portion 55 is formed to have a horizontal width smaller than a horizontal width of the fitting concave groove portion 54, and is opened at an upper end and a lower end of the intermediate stationary member main body 50*h*. The fitting concave portion 56 is provided on a part of an inner peripheral surface of the intermediate stationary member main body 50*h* that corresponds to a back side of each fitting concave groove portion 54, and is opened at a lower end of the intermediate stationary member main body 50*h*. Note that, for example, a bottom portion (namely, a surface on the outside in the radial direction) of the fitting concave portion 56 communicates with a bottom portion of the fitting concave groove portion 54.

Figure 7:
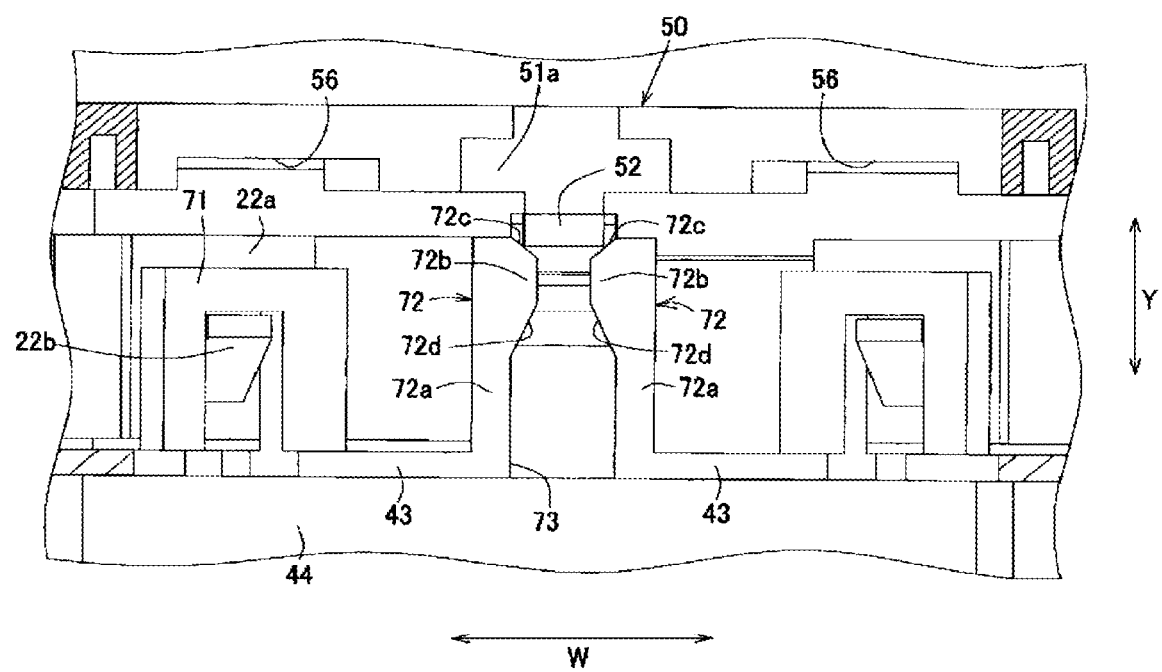
FIG. 7 is a partially enlarged view of FIG. 6.
Figure 8:
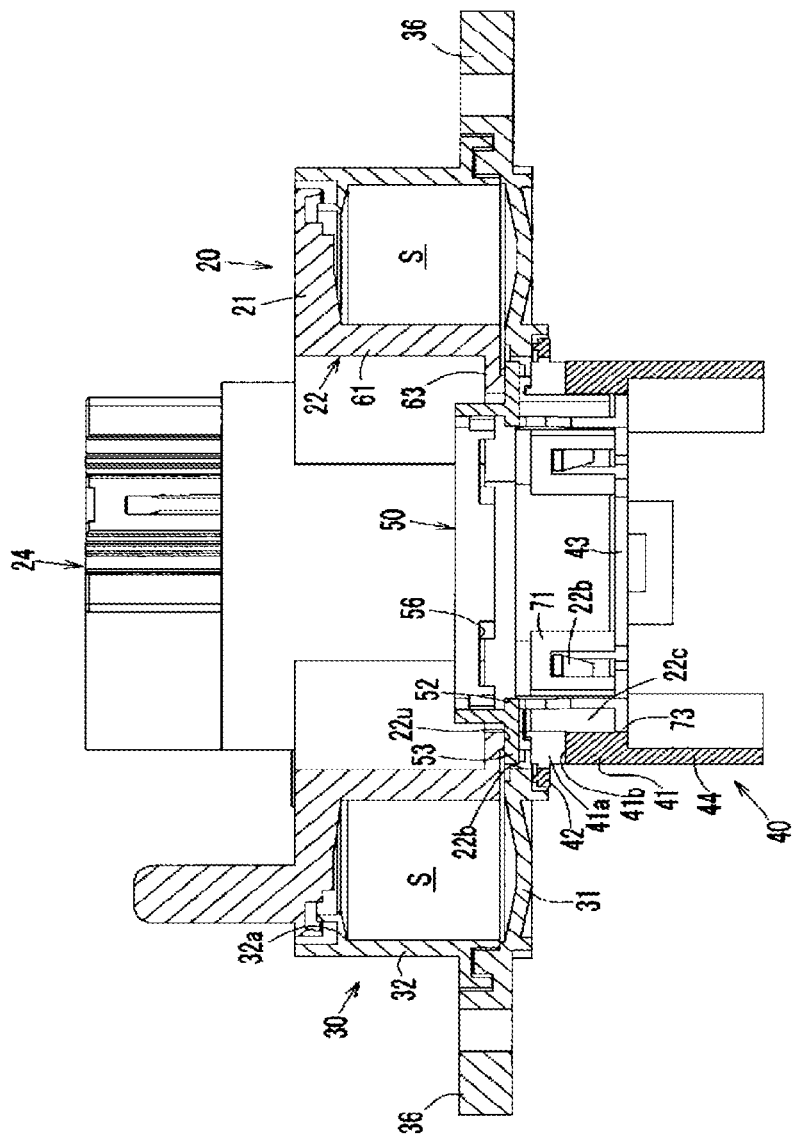
FIG. 8 is a cross-sectional view of the rotary member of FIG. 1 in a locked state, which is taken along the line B-B.

As illustrated in FIG. 6 to FIG. 8, the intermediate stationary member 50 is fitted and inserted into the inside of the inner-circumferential cylindrical portion 22 of the rotator 20. In this fitted and inserted state, each regulating portion 53 of the intermediate stationary member 50 projects toward the outside of the rotator 20, through each guiding cutout portion 22*c* of the rotator 20. Further, the fitting convex portion 22*a* and the engagement portion 22*b* of the rotator 20 pass through the fitting concave groove portion 54 and the passing concave groove portion 55 of the intermediate stationary member 50, respectively, and intermediate stationary member 50 is disposed at a position on an upper side of the fitting convex portion 22*a* and the engagement portion 22*b*.

As illustrated in FIG. 3 and FIG. 6 to FIG. 8, the sleeve 40 includes: a cylindrical portion 41 having a shape of a circular cylinder, for example; an upper end flange portion 42 having an annular shape; a lower end flange portion 43 having an annular shape; and an extending portion 44 having an arced shape. The cylindrical portion 41 is to be fitted to an outer periphery of the small diameter cylindrical portion 66 of the rotator 20. The upper end flange portion 42 is protruded from an upper end of an outer peripheral surface of the cylindrical portion 41 toward the outside in the radial direction. The lower end flange portion 43 is protruded from a lower end of an inner peripheral surface of the cylindrical portion 41 toward the inside in the radial direction. The extending portion 44 is provided to extend downward from a lower end of the cylindrical portion 41. For example, two extending portions 44 are provided at symmetrical positions in such a manner that the two extending portions 44 are spaced apart from each other in the circumferential direction W of the cylindrical portion 41.

An inner diameter of the cylindrical portion 41 is substantially equivalent to an outer diameter of the small diameter cylindrical portion 66 of the rotator 20. A length of the cylindrical portion 41 in the axial direction Y is substantially the same as the length of the small diameter cylindrical portion 66 in the axial direction Y. A guiding concave portion 41*a* is provided on an upper side of an inner peripheral surface of the cylindrical portion 41. The guiding concave portion 41*a* guides movement of each regulating portion 53 of the intermediate stationary member 50.

A plurality of guiding concave portions 41*a* are provided at symmetrical positions (namely, at positions corresponding to respective regulating portions 53) along the circumferential direction W of the cylindrical portion 41. The guiding concave portion 41*a* is formed along the axial direction Y of the cylindrical portion 41, and is opened at an upper end of the cylindrical portion 41. A lower end 41*b* (FIG. 8) of the guiding concave portion 41*a* defines a lower-limit position (namely, the lock released position) of a movement range of the intermediate stationary member 50.

As illustrated in FIG. 7, the lower end flange portion 43 is provided with an engaged portion 71 with which the engagement portion 22*b* of the rotator 20 is to be engaged, an engaged portion 72 (first engaged portion) with which the engagement portion 52 of the intermediate stationary member 50 is to be engaged, and an exposure window 73 for exposing an end portion of a lower side (namely, a lock released position side) of the engagement portion 52.

The engaged portion 71 is provided at an inner-circumferential edge portion of an upper surface of the lower end flange portion 43. The engaged portion 71 is vertically provided in the axial direction Y, at each of positions corresponding to respective engagement portions 22*b* of the rotator 20. For example, each engaged portion 71 is formed to have a rectangular plate-like shape in a front view. At a center of a horizontal width of each engaged portion 71, an engagement hole allowing the engagement portion 22*b* to be engaged is provided to extend in a thickness direction of the engaged portion 71. A lower end of the above-mentioned engagement hole is opened at the lower end flange portion 43.

The engaged portion 72 is provided at an inner-circumferential edge portion of an upper surface of the lower end flange portion 43. The engaged portion 72 is vertically provided in the axial direction Y, at each of positions corresponding to respective engagement portions 52 of the intermediate stationary member 50. Each engaged portion 72 includes a pair of elastic pieces 72*a*, and convex portions 72*b*. The convex portion 72*b* is provided in each of the pair of elastic pieces 72*a*, and is to be engaged with the engagement portion 52.

The pair of elastic pieces 72*a* are vertically provided in the axial direction Y on an upper surface of the lower end flange portion 43. Further, the pair of elastic pieces 72*a* are disposed to face each other to be spaced apart from each other along the circumferential direction W, so that the pair of elastic pieces 72*a* are disposed respectively on both sides of the engagement portion 52 of the intermediate stationary member 50 in the circumferential direction W.

Each convex portion 72*b* is provided on an end side of a facing surface of each of the elastic pieces 72*a*, and is provided to project in a facing direction. Chamfered portions 72*c* and 72*d*, each of which is chamfered to have a flat surface, for example, are provided at respective corner portions on an upper side (namely, a locked position side) and a lower side (namely, the lock released position side) of each convex portion 72*b*. Note that each of the chamfered portions 72*c* and 72*d* may have a curved surface that is curved in an arced shape, for example.

As described above, the pair of elastic pieces 72*a* are disposed on both sides of the engagement portion 52 in the circumferential direction W, and the convex portions 72*b* are provided on facing surfaces of the elastic pieces 72*a* to project in a facing direction. In this manner, the engaged portion 72 is engaged with the engagement portion 52 from both sides in the circumferential direction W (namely, a direction orthogonal to the axial direction Y).

The exposure window 73 is provided at a portion between the pair of elastic pieces 72*a* at the lower end flange portion 43 (namely, a portion blocking the front of an end portion of a lower side (namely, the lock released position side) of the engagement portion 52), and extends in a thickness direction of the lower end flange portion 43.

As illustrated in FIG. 6 to FIG. 8, the sleeve 40 is attached to the rotator 20, in a state where the small diameter cylindrical portion 66 of the rotator 20 is fitted and inserted into the inside of the cylindrical portion 41 to the extent that an upper end of the cylindrical portion 41 abuts on the lower-side step portion 65 of the rotator 20. In this attached state, the engagement portion 22b of the rotator 20 is engaged with the engaged portion 71 of the sleeve 40. In this manner, the sleeve 40 is fixed to the rotator 20 so as to be capable of integral rotation with the rotator 20.

Further, in the attached state described above, the upper end flange portion 42 of the sleeve 40 is disposed to face the upper-side step portion 63 of the rotator 20, with an inner-circumferential edge portion of the stationary-side ring plate 31 of the stator 30 interposed between the upper end flange portion 42 and the upper-side step portion 63. In other words, the upper-side step portion 63, the medium diameter cylindrical portion 64, and the upper end flange portion 42 constitute a groove portion having a concave shape in cross-section, and the inner-circumferential edge portion of the stationary-side ring plate 31 is fitted into the groove portion. In this manner, the upper end flange portion 42 inhibits the stator 30 from falling toward the sleeve 40 side.

Figure 9:
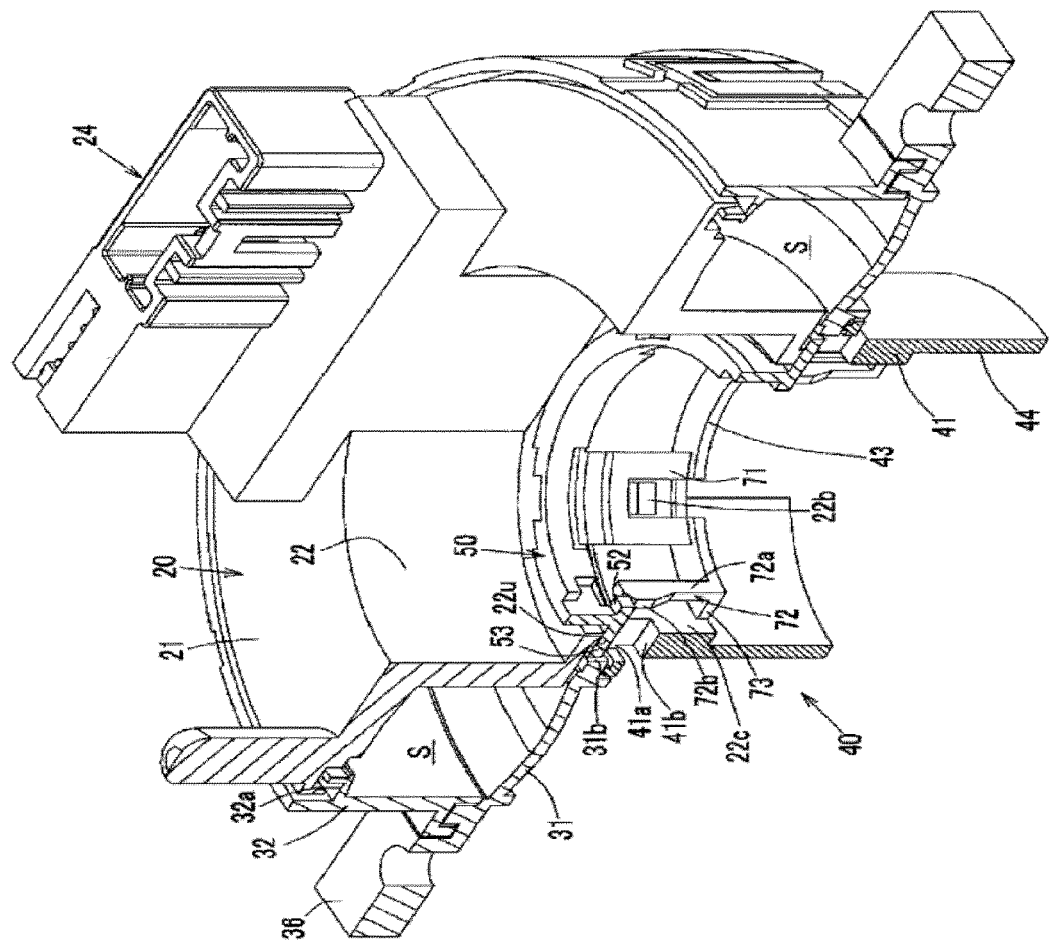
FIG. 9 is a perspective cross-sectional view of the rotary member of FIG. 1 in a locked state, which is taken along the line B-B.

Further, as illustrated in FIG. 8 and FIG. 9, in the attached state described above, the guiding concave portion 41a of the sleeve 40 is disposed to overlap the guiding cutout portion 22c of the rotator 20, on the outside of the guiding cutout portion 22c. In this manner, an upper side of the guiding cutout portion 22c and the guiding concave portion 41a form a guide portion that restricts a movement range of the regulating portion 53 of the intermediate stationary member 50 (namely, a movement range of the intermediate stationary member 50) to a range between the locked position and the lock released position. The movement range of the regulating portion 53 extends in the axial direction Y.

Further, as illustrated in FIG. 6 to FIG. 9, in the attached state described above, a lower portion of the engagement portion 52 is engaged with the chamfered portions 72c on an upper side of respective convex portions 72b of the engaged portion 72 (FIG. 6 and FIG. 7). In other words, a lower portion of the engagement portion 52 is sandwiched by the chamfered portions 72c on an upper side of respective convex portions 72b of the engaged portion 72 from both sides in the circumferential direction W. In this manner, the intermediate stationary member 50 is supported to be located at the locked position (namely, the upper end 22u of the guiding cutout portion 22c) by the engaged portion 72 (FIG. 8 and FIG. 9). In other words, the intermediate stationary member 50 is temporarily fixed at the locked position.

Note that, in a state where the intermediate stationary member 50 is temporarily fixed at the locked position, the intermediate stationary member 50 projects higher than the upper-side step portion 63 of the rotator 20. Further, as illustrated in FIG. 8, the regulating portion 53 of the intermediate stationary member 50 is engaged with the engagement portion 31b of the stator 30. In this manner, in a state where the rotation position of the rotary member 10 is located at the intermediate position, relative rotation of the rotary member 10 with respect to the stationary member 30 is locked.

Next, with reference to FIG. 10 to FIG. 12, operation of the intermediate stationary member 50 when the insertion convex portion 700 of a steering wheel is inserted into the inner-circumferential cylindrical portion 22 of the rotator 20 (namely, the insertion hole H of the rotary member 10) will be described.

In a state where the insertion convex portion 700 of a steering wheel is not inserted into the inner-circumferential cylindrical portion 22 of the rotator 20, the intermediate stationary member 50 is temporarily fixed at the locked position as described above. In this temporarily fixed state, relative rotation of the rotary member 10 with respect to the stationary member 30 is locked, in a state where the intermediate stationary member 50 projects higher than the upper-side step portion 63 of the rotator 20 and the rotation position of the rotary member 10 is located at the intermediate position.

Figure 10:
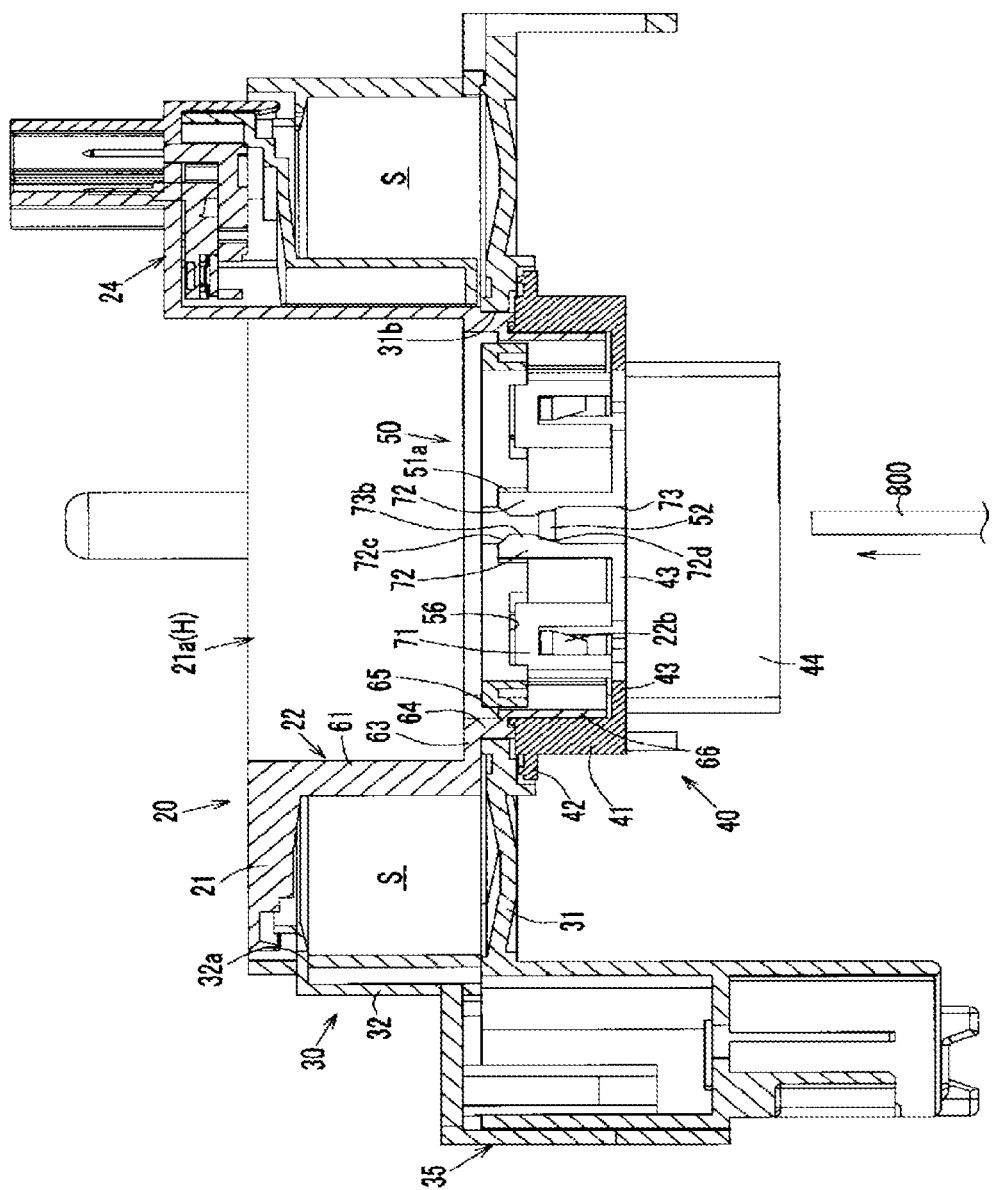
FIG. 10 is a cross-sectional view of the rotary member of FIG. 1 in a lock released state, which is taken along the line A-A.
Figure 11:
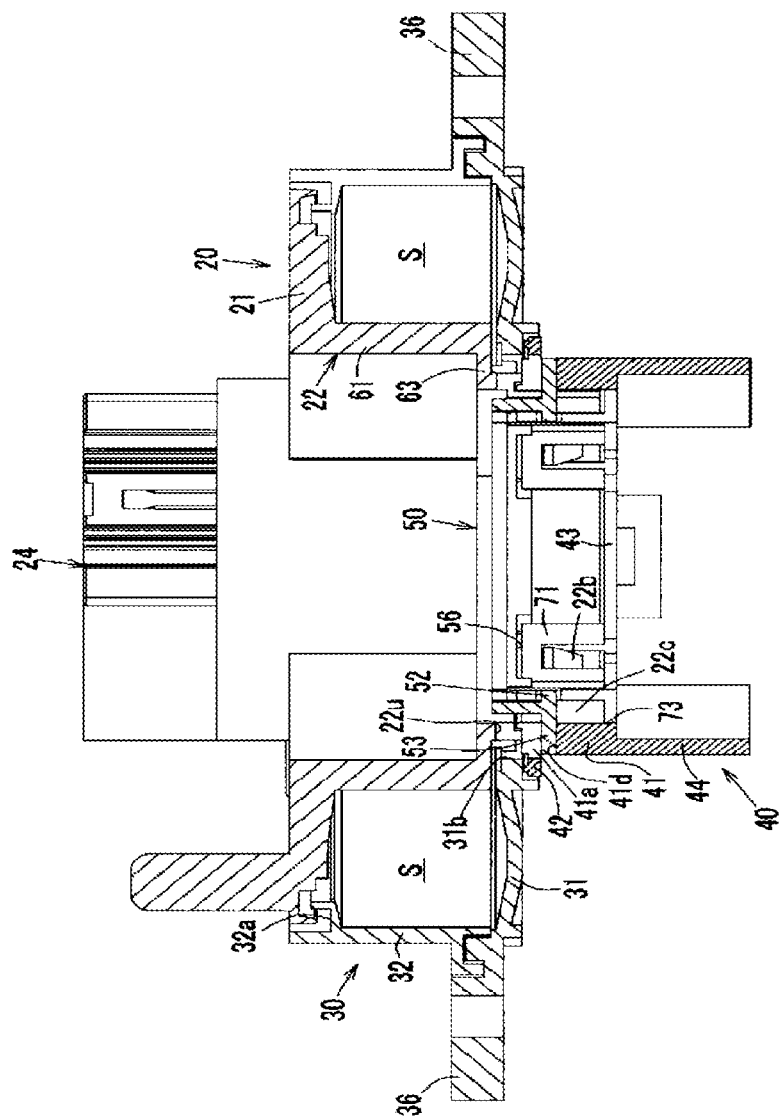
FIG. 11 is a cross-sectional view of the rotary member of FIG. 1 in a lock released state, which is taken along the line B-B.
Figure 12:
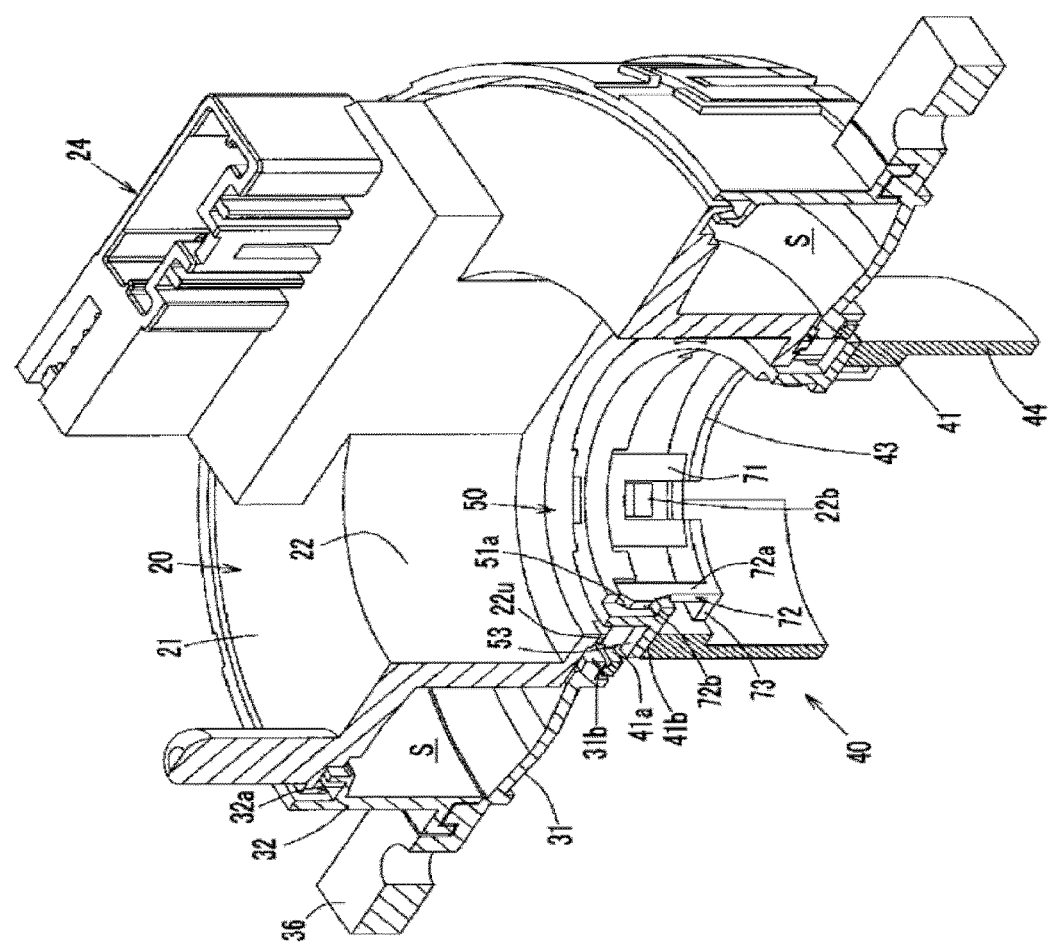
FIG. 12 is a perspective cross-sectional view of the rotary member of FIG. 1 in a lock released state, which is taken along the line B-B.

As illustrated in FIG. 10 to FIG. 12, in the lock state described above, when the insertion convex portion 700 (FIG. 6) of a steering wheel is inserted into the inner-circumferential cylindrical portion 22 of the rotator 20, the intermediate stationary member 50 is pushed down to the height of an upper surface of the upper-side step portion 63 by the insertion convex portion 700. As a result, the intermediate stationary member 50 is moved from the locked position to the lock released position.

Such movement causes the following transition of states. Specifically, a lower portion of the engagement portion 52 is initially in a state of being engaged with the chamfered portions 72c on an upper side of respective convex portions 72b of the engaged portion 72. Then, the engagement portion 52 elastically pushes down each elastic piece 72a of the engaged portion 72 at both sides thereof in the circumferential direction W, and thereby passes through a portion between the respective convex portions 72b of the engaged portion 72. An upper portion of the engagement portion 52 is finally brought to a state of being engaged with the chamfered portions 72d on a lower side of the respective convex portions 72b of the engaged portion 72 (namely, an upper portion of the engagement portion 52 is brought to a state of being sandwiched by the chamfered portions 72d on a lower side of the respective convex portions 72b of the engaged portion 72). As described above, an upper portion of the engagement portion 52 is engaged with the chamfered portions 72d on a lower side of respective convex portions 72b of the engaged portion 72. In this manner, the intermediate stationary member 50 is temporarily fixed at the lock released position.

In this temporarily fixed state, each of the convex portions 72b of the engaged portion 72 of the sleeve 40 is fitted between the engagement portion 52 and an upper wall portion 51a (wall portion) of the housing concave portion 51 of the intermediate stationary member 50. In this manner, a backlash of the intermediate stationary member 50 in the axial direction Y is reduced. Further, the fitting convex portion 22a of the rotator 20 is fitted into the fitting concave groove portion 54 of the intermediate stationary member 50, and an upper portion of the engaged portion 71 of the sleeve 40 is fitted into the fitting concave portion 56 of the intermediate stationary member 50. In this manner, a backlash of the intermediate stationary member 50 in the circumferential direction is reduced.

As illustrated in FIG. 10, when the intermediate stationary member 50 is to be returned from the lock released position to the locked position, first, a steering wheel is operated to be rotated such that the rotary member 10 is brought to the intermediate position. Subsequently, the insertion convex portion 700 of a steering wheel is removed from the inner-circumferential cylindrical portion 22 of the rotator 20. Then, in this removed state, a thin elongated rod 800 is inserted into the exposure window 73 from a lower end opening side (namely, the lock released position side) of the sleeve 40. Then, the engagement portion 52 is pressed toward an upper side (namely, the locked position side).

This causes the following transition in states. Specifically, an upper portion of the engagement portion 52 is initially in a state of being engaged with the chamfered portions 72d on a lower side of each of the convex portions 72b of the engaged portion 72. Then, the engagement portion 52 passes through a portion between the respective convex portions 72b of the engaged portion 72. A lower portion of the engagement portion 52 is finally brought to a state of being engaged with the chamfered portions 72c on an upper side of each of the convex portions 72b of the engaged portion 72 (FIG. 6). As a result, the intermediate stationary member 50 is returned from the lock released position to the locked position, and is temporarily fixed at the locked position.

As described above, the rotary connector device 1 according to the present embodiment includes the stationary member (namely, stator) 30, the rotary member 10 (namely, the rotator 20 and the sleeve 40), and the intermediate stationary member 50. The rotary member 10 is to be attached to the stationary member 30 so as to be capable of relative rotation with respect to the stationary member 30. The rotary member 10 includes the insertion hole H (steering wheel insertion hole) into which the insertion convex portion 700 of a steering wheel is to be inserted. The intermediate stationary member 50 is provided so as to be movable between the locked position and the lock released position with respect to the rotary member 10. At the locked position, the intermediate stationary member 50 is configured to regulate relative rotation of the rotary member 10 when the intermediate stationary member 50 is engaged with the stationary member 30. At the lock released position, the intermediate stationary member 50 is configured to release the regulation. When the intermediate stationary member 50 is pressed by the insertion convex portion 700 inserted into the insertion hole H, the intermediate stationary member 50 is moved from the locked position to the lock released position. The intermediate stationary member 50 is provided with the engagement portion 52. The rotary member 10 (for example, the sleeve 40) is provided with the engaged portion 72. When the engaged portion 72 is engaged with the engagement portion 52 from a direction (namely, the circumferential direction W) orthogonal to the axial direction Y, the intermediate stationary member 50 is temporarily fixed at the locked position.

According to this configuration, the intermediate stationary member 50 is provided with the engagement portion 52. The rotary member 10 is provided with the engaged portion 72. The engaged portion 72 is engaged with the engagement portion 52 from a direction orthogonal to the axial direction Y. In this manner, the intermediate stationary member 50 is temporarily fixed at the locked position. Therefore, a spiral spring for biasing the intermediate stationary member 50 toward the locked position side to temporarily fix the intermediate stationary member 50 at the locked position can be omitted. As a result, the number of components can be reduced, and assembly workability can be enhanced.

Particularly, the engaged portion 72 is engaged with the engagement portion 52 from a direction (namely, the circumferential direction W) orthogonal to the axial direction Y. Therefore, when the insertion convex portion 700 of a steering wheel is inserted into the insertion hole H of the rotary member 10, inhibition of movement of the intermediate stationary member 50 from the locked position to the lock released position due to obstruction of the engagement portion 52 and the engaged portion 72 can be prevented. Further, a backlash of the intermediate stationary member 50 in a direction orthogonal to the axial direction Y can be reduced.

Further, the intermediate stationary member 50 is formed to have an annular shape, and is fitted into the inside of the insertion hole H (steering wheel insertion hole) of the rotary member 10 so as to be movable in the axial direction Y. Therefore, with a simple structure, the intermediate stationary member 50 can be disposed inside the insertion hole of the rotary member 10 so as to be movable in the axial direction Y.

Further, as one aspect of the disclosure, the engagement portion 52 (first engagement portion) is provided in a state of projecting in the radial direction in the intermediate stationary member 50. Therefore, the engagement portion 52 can be provided with a simple structure.

Further, the engaged portion 72 includes the convex portions 72b that project in a direction of mutual facing. When the convex portions 72b are engaged with the engagement portion 52, the intermediate stationary member 50 is temporarily fixed at the locked position. Specifically, the engagement portion 52 and the engaged portion 72 are engaged with each other through the convex portions 72b. Therefore, a sufficient engaging force can be secured. The sufficient engaging force refers to such an engaging force that engagement is maintained with an external force that is less than an external force having a predetermined magnitude, and that engagement is released with an external force that is equal to or greater than the external force having a predetermined magnitude. As a result, engagement between the engagement portion 52 and the engaged portion 72 is released only when the insertion convex portion 700 inserted into the insertion hole H presses the intermediate stationary member 50. In other cases, engagement between the engagement portion 52 and the engaged portion 72 can be maintained.

Further, chamfered portions 72c are provided at corner portions on an upper side (namely, the locked position side) of the convex portions 72b. Therefore, when the insertion convex portion 700 of a steering wheel is inserted into the insertion hole H of the rotary member 10, the intermediate stationary member 50 can be smoothly moved from the locked position to the lock released position, without being caught on the corner portions on an upper side (namely, the locked position side) of the convex portions 72b. Further, the elastic pieces 72a are elastically pushed down in the circumferential direction W by the chamfered portions 72c. Therefore, also due to this configuration, the intermediate stationary member 50 can be smoothly moved from the locked position to the lock released position, without being caught on the corner portions on an upper side of the convex portions 72b.

Further, when the engagement portion 52 is engaged with the chamfered portions 72c on an upper side (namely, the locked position side) of the convex portions 72b, the intermediate stationary member 50 is temporarily fixed at the locked position. Therefore, an engaging force between the chamfered portions 72c and the engagement portion 52 not only has a component of a direction (namely, the circumferential direction W) orthogonal to the axial direction Y of the rotary member 10, but also has a component of the axial direction Y. As a result, in a state where the intermediate stationary member 50 is temporarily fixed at the locked position, not only a backlash of the intermediate stationary member 50 in a direction orthogonal to the axial direction Y but also a backlash of the intermediate stationary member 50 in the axial direction Y can be reduced.

Further, the chamfered portions 72*d* are provided at corner portions on a lower side (namely, the lock released position side) of the convex portions 72*b*. When the engagement portion 52 is engaged with the chamfered portions 72*d*, the intermediate stationary member 50 is temporarily fixed at the lock released position. Therefore, an engaging force between the chamfered portions 72*d* and the engagement portion 52 has a component of a direction (namely, the circumferential direction W) orthogonal to the axial direction Y, and a component of the axial direction Y. As a result, in a state where the intermediate stationary member 50 is temporarily fixed at the lock released position, a backlash of the intermediate stationary member 50 in a direction orthogonal to the axial direction Y and a backlash in the axial direction Y can be reduced.

Further, the chamfered portions 72*d* are provided at corner portions on a lower side (namely, the lock released position side) of the convex portions 72*b*. Therefore, when the intermediate stationary member 50 is pressed toward the locked position side with an external force having a predetermined magnitude, the intermediate stationary member 50 can be returned from the lock released position to the locked position.

Further, the intermediate stationary member 50 is provided with the upper wall portion Ma (wall portion) spaced apart from an upper side (namely, the locked position side) of the engagement portion 52 (first engagement portion). In a state where the intermediate stationary member 50 is located at the lock released position, the convex portions 72*b* of the engaged portion 72 (first engaged portion) are fitted into a portion between the engagement portion 52 and the upper wall portion 51*a*. Specifically, upper surfaces of the convex portions 72*b* abut on the upper wall portion Ma, and the chamfered portions 72*d* on a lower side of the convex portions 72*b* abut on an upper portion of the engagement portion 52. Therefore, in a state where the intermediate stationary member 50 is located at the lock released position, a backlash of the intermediate stationary member 50 in the axial direction Y can be reduced.

Further, the exposure window 73 is provided at a portion of the rotary member 10 blocking the front of an end portion on the lock released position side of the engagement portion 52 (for example, a portion between the pair of elastic pieces 72*a* at the lower end flange portion 43). Therefore, the intermediate stationary member 50 can be returned from the lock released position to the locked position in the following manner. Specifically, in a state where the intermediate stationary member 50 is temporarily fixed at the lock released position, the rod 800 is inserted into the exposure window 73 from the outside. Then, with the rod 800, the engagement portion 52 is pressed toward the locked position side.

Further, two or more sets of the engagement portion 52 and the engaged portion 72 are symmetrically disposed along the circumferential direction W of the intermediate stationary member 50. Therefore, the intermediate stationary member 50 can be temporarily fixed at the locked position and can be temporarily fixed at the lock released position in a well-balanced manner.

Further, the engaged portion 72 includes the elastic pieces 72*a* provided to extend from the sleeve 40 constituting the rotary member 10, and the convex portions 72*b* are provided in the elastic pieces 72*a*. Therefore, the engagement portion 52 and the engaged portion 72 can be elastically engaged with each other. As a result, a backlash of the intermediate stationary member 50 can be reduced even more.

Further, the engaged portion 72 is engaged from both sides of the engagement portion 52 (namely, a direction orthogonal to the axial direction Y, namely, the circumferential direction W). In other words, the engaged portion 72 sandwiches the engagement portion 52 from both sides. Therefore, a backlash of the intermediate stationary member 50 in a direction (namely, the circumferential direction W) orthogonal to the axial direction Y can be reduced even more.

Further, the lower end flange portion 43 (flange portion) protruded toward the inside in the radial direction is provided on an inner peripheral surface of the insertion hole H (steering wheel insertion hole) of the rotary member 10 (for example, an inner peripheral surface of the cylindrical portion 41). The engaged portion 72 (first engaged portion) is vertically provided in the axial direction Y at the lower end flange portion 43. Therefore, with a simple structure, the engaged portion 72 can be vertically provided toward the axial direction Y.

Note that, in the present embodiment, the intermediate stationary member 50 is provided with the engagement portion 52, and the rotary member 10 (for example, the sleeve 40) is provided with the engaged portion 72. However, the intermediate stationary member 50 may be provided with the engaged portion 72, and the rotary member 10 may be provided with the engagement portion 52. The same also applies to first to seventh modified examples described below.

Further, in the present embodiment, the rotary member 10 (for example, the rotator 20) is provided with the fitting convex portion 22*a* and the engagement portion 22*b*, and the intermediate stationary member 50 is provided with the fitting concave groove portion 54 and the passing concave groove portion 55. However, the rotary member 10 may be provided with the fitting concave groove portion and the passing concave groove portion, and the intermediate stationary member 50 may be provided with the fitting convex portion and the engagement portion. The same also applies to first to seventh modified examples described below.

Further, in the intermediate stationary member 50, the regulating portion 53 projecting from the engagement portion 52 toward the stationary member (namely, stator) 30 is provided to extend. Therefore, the regulating portion 53 and the engagement portion 52 can be concentrated to be disposed at one position, and thus the structure of the intermediate stationary member 50 can be simplified.

Further, the intermediate stationary member 50 is disposed inside the insertion hole H of the rotary member 10. The fitting convex portion 22*a* is provided on an inner peripheral surface of the insertion hole H. The fitting concave groove portion 54 extending in the axial direction Y is provided on an outer peripheral surface of the intermediate stationary member 50. In a state where the intermediate stationary member 50 is located at the lock released position, the fitting convex portion 22*a* is fitted into the fitting concave groove portion 54. Therefore, relative movement between the intermediate stationary member 50 and the rotary member 10 in the circumferential direction can be regulated. In this manner, a backlash of the intermediate stationary member 50 in the circumferential direction W (namely, a direction orthogonal to the axial direction Y) can be reduced.

First Modified Example

In the embodiment described above, the engagement portion 52 is formed such that side surfaces on both sides in the circumferential direction W are flat. However, for example, as illustrated in FIGS. 13A and 13B, the engagement portion 52 may be formed to have a shape of a substantially rectangular parallelepiped that is vertically oblong along the axial direction Y, for example. In addition, the side surfaces on both sides in the circumferential direction W may be provided with concave portions 52a into which respective convex portions 72b of the engaged portion 72 can be fitted.

In this case, when the intermediate stationary member 50 is located at the locked position, similarly to the embodiment described above, a lower portion of the engagement portion 52 is engaged with the chamfered portions 72c on an upper side of respective convex portions 72b of the engaged portion 72 (FIG. 13A). Further, when the intermediate stationary member 50 is located at the lock released position, respective convex portions 72b of the engaged portion 72 are fitted into the concave portions 52a on both sides of the engagement portion 52 (FIG. 13B).

According to the present modified example, in a state where the intermediate stationary member 50 is located at the lock released position, the convex portions 72b are fitted into the concave portions 52a. Therefore, not only a backlash of the intermediate stationary member 50 in the circumferential direction W (namely, a direction orthogonal to the axial direction Y) but also a backlash in the axial direction Y can be reduced.

Second Modified Example

Figure 14A:
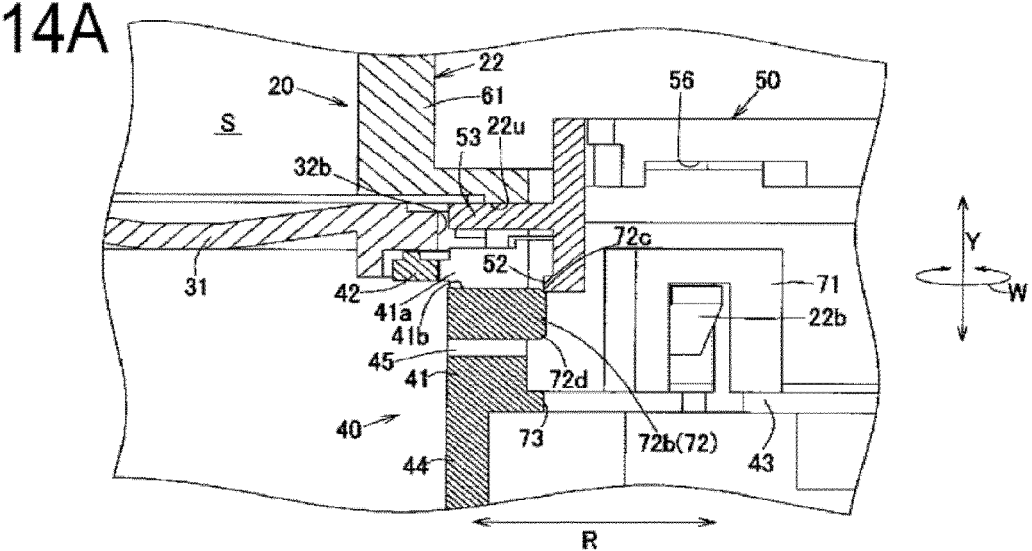
FIG. 14A and FIG. 14B are cross-sectional views illustrating the engagement portion of the intermediate stationary member and an engaged portion of a stationary member according to a second modified example.
Figure 14B:
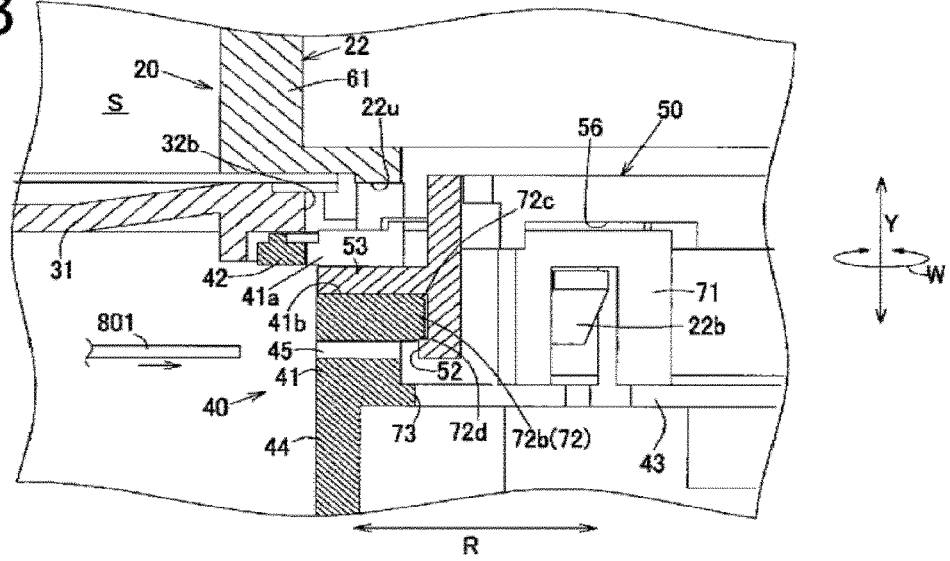

In the embodiment described above, the engagement portion 52 and the engaged portion 72 are disposed side by side in the circumferential direction W of the rotary member 10 in a state where the engagement portion 52 and the engaged portion 72 are engaged with each other. However, in the present modified example, for example, as illustrated in FIGS. 14A and 14B, the engagement portion 52 and the engaged portion 72 are disposed side by side in a radial direction R of the rotary member 10 in a state where the engagement portion 52 and the engaged portion 72 are engaged with each other. In the following, the present modified example will be described in detail. In the following description, components that are the same as the components of the embodiment described above are denoted by the same reference signs to omit description thereof, and difference from the embodiment described above will be mainly described.

As illustrated in FIG. 14A, in the present modified example, the engaged portion 72 includes the convex portion 72b that is provided to project from an inner peripheral surface of the cylindrical portion 41 of the sleeve 40. The convex portion 72b is adjacent to a lower side of the lower end 41b of the guiding concave portion 41a on the inner peripheral surface of the cylindrical portion 41, and is disposed to be flush with the lower end 41b of the guiding concave portion 41a. An exposure window 45 is provided on an inner peripheral surface of the cylindrical portion 41, at a position adjacent to a lower side of the convex portion 72b. The exposure window 45 extends in a thickness direction of the cylindrical portion 41 along the radial direction R, for example, in such a manner that the exposure window 45 connects to the outside. Note that the chamfered portions 72c and 72d are provided at corner portions on an upper side and a lower side of the convex portion 72b, for example.

In the present modified example, for example, the engagement portion 52 is formed to have a shape of a rectangular parallelepiped, and is provided on an outer peripheral surface of the intermediate stationary member main body 50h. The engagement portion 52 is provided to project toward the outside (namely, an opposite side in a projecting direction of the convex portion 72b) in the radial direction R. The regulating portion 53 is provided on an outer peripheral surface of the intermediate stationary member main body 50h in such a manner that the regulating portion 53 is spaced apart from an upper side of the engagement portion 52. The regulating portion 53 projects toward the outside (namely, the stator 30 side) in the radial direction. An interval between the engagement portion 52 and the regulating portion 53 has a dimension substantially the same as a dimension of a width of the convex portion 72b in the vertical direction. Specifically, the convex portion 72b can be fitted into a portion between the engagement portion 52 and the regulating portion 53.

In the present modified example, as illustrated in FIG. 14A, in a state where the intermediate stationary member 50 is located at the locked position, a lower portion of the engagement portion 52 is engaged with the chamfered portion 72c on an upper side of the convex portion 72b. In this manner, the intermediate stationary member 50 is temporarily fixed at the locked position.

Then, when the insertion convex portion 700 of a steering wheel (not illustrated) is inserted into the inside of the inner-circumferential cylindrical portion 22 of the rotator 20 (namely, the insertion hole H of the rotary member 10), as illustrated in FIG. 14B, the intermediate stationary member 50 is moved from the locked position to the lock released position. Such movement causes the engagement portion 52 to pass over the convex portion 72b, so that the convex portion 72b is fitted into a portion between the engagement portion 52 and the regulating portion 53. Through such fitting, the intermediate stationary member 50 is fixed at the lock released position.

Then, when the intermediate stationary member 50 is to be returned from the lock released position to the locked position, a thin elongated rod 801 is inserted into the exposure window 45 through a side of the sleeve 40. Then, the engagement portion 52 is pressed toward the inside in the radial direction, to the extent that a tip end of the engagement portion 52 is moved to further toward an inner side in the radial direction than a tip end of the convex portion 72b. In this state, the intermediate stationary member 50 is moved from the lock released position to the locked position. In this manner, the intermediate stationary member 50 is returned from the lock released position to the locked position.

According to the present modified example, the convex portion 72b (namely, the engaged portion 72) is provided on an inner peripheral surface of the rotary member 10 (for example, the sleeve 40). The engagement portion 52 (second engagement portion) projects toward an opposite side in a projecting direction of the convex portion 72b. Specifically, the engagement portion 52 and the convex portion 72b are disposed side by side in the radial direction R of the rotary member 10. Therefore, the engagement portion 52 and the convex portion 72b can be disposed compactly with regard to the circumferential direction W of the rotary member 10.

Further, the engagement portion 52 (second engagement portion) is disposed on a front surface side of an inner peripheral surface of the rotary member 10 through the convex portion 72b. Therefore, an engaging force from the engagement portion 52 toward the convex portion 72b can be received at the inner peripheral surface of the rotary member 10, and thus the engaging force can be securely caused to act on the convex portion 72b. As a result, the engagement portion 52 and the convex portion 72b can be securely engaged with each other.

Further, the intermediate stationary member 50 is provided with the regulating portion 53 projecting toward the stator (stationary member) 30 side and spaced apart from an upper side (namely, the locked position side) of the engagement portion 52 (second engagement portion). When the convex portion 72b is fitted into a portion between the engagement portion 52 and the regulating portion 53 in a state where the intermediate stationary member 50 is located at the lock released position, the intermediate stationary member 50 is fixed at the lock released position. Therefore, with a simple structure of causing the convex portion 72b to be fitted into a portion between the engagement portion 52 and the regulating portion 53, the intermediate stationary member 50 can be fixed at the lock released position.

Further, the regulating portion 53 is provided to be spaced apart from an upper side (namely, the locked position side) of the engagement portion 52. Specifically, the regulating portion 53 and the engagement portion 52 are disposed side by side in the axial direction Y of the rotary member 10. Therefore, in a state where the intermediate stationary member 50 is fixed at the lock released position, a backlash of the intermediate stationary member 50 in the axial direction Y can be reduced.

Further, the rotary member 10 (for example, the sleeve 40) is provided with the exposure window 45 connecting to the outside, at a position adjacent to a lower side (namely, the lock released position side) of the convex portion 72b. Therefore, engagement between the engagement portion 52 and the convex portion 72b can be released in the following manner. Specifically, the rod 801 is inserted into the exposure window 45 from the outside. Then, with the rod 801, the engagement portion 52 engaged with the convex portion 72b is pressed toward the inside in the radial direction so that the engagement portion 52 is moved further toward an inner side in the radial direction than the convex portion 72b. In this released state, the intermediate stationary member 50 is moved from the lock released position to the locked position. In this manner, the intermediate stationary member 50 can be returned to the locked position.

Third Modified Example

Figure 15A:
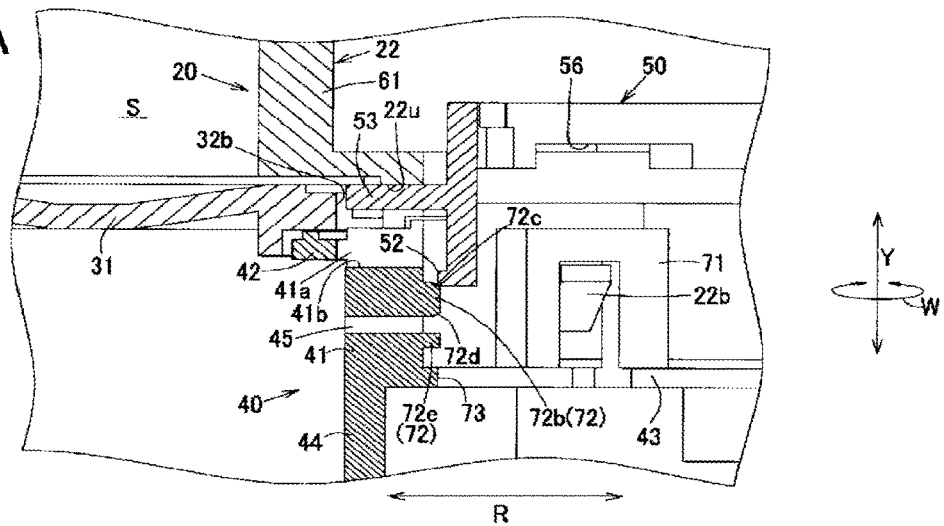
FIG. 15A and FIG. 15B are cross-sectional views illustrating the engagement portion of the intermediate stationary member and the engaged portion of the stationary member according to a third modified example.

In the second modified example described above, when the convex portion 72b (namely, the engaged portion 72) is fitted into a portion between the engagement portion 52 and the regulating portion 53, the intermediate stationary member 50 is fixed at the lock released position. However, in the present modified example, as illustrated in FIG. 15A, the engaged portion 72 further includes a secondary convex portion 72e. The secondary convex portion 72e is provided on an outer peripheral surface of the cylindrical portion 41 of the sleeve 40 in such a manner that the secondary convex portion 72e is spaced apart from a lower side of the convex portion 72b (namely, the lock released position side).

Figure 15B:
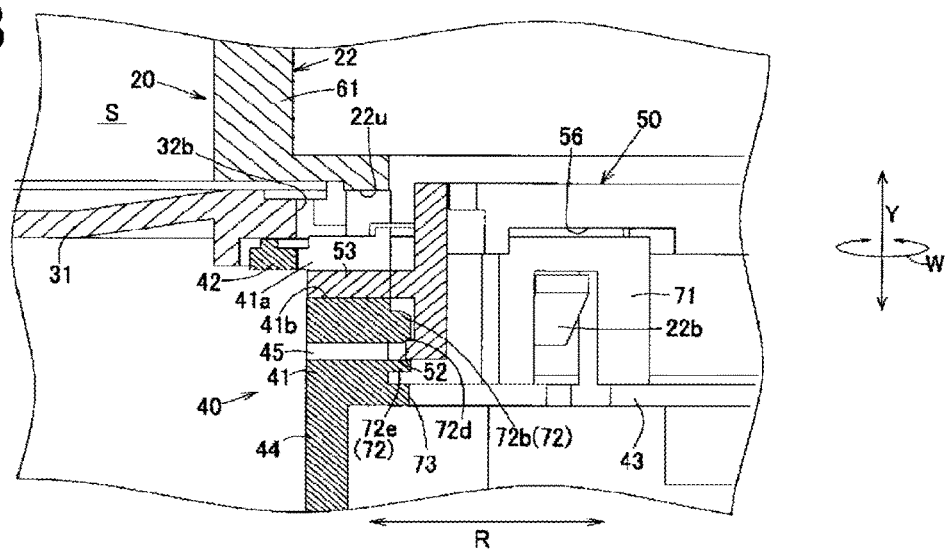

Then, as illustrated in FIG. 15B, when the engagement portion 52 is fitted into a portion between the convex portion 72b and the secondary convex portion 72e, the intermediate stationary member 50 is fixed at the lock released position. In this case, an interval between the convex portion 72b and the secondary convex portion 72e has a dimension substantially the same as a dimension of a width of the engagement portion 52 in the axial direction Y. An interval between the engagement portion 52 and the regulating portion 53 may be larger than a width of the convex portion 72b in the axial direction Y.

According to the present modified example, with a simple structure of causing the engagement portion 52 (second engagement portion) to be fitted into a portion between the convex portion 72b and the secondary convex portion 72e (namely, sandwiching the engagement portion 52 from both sides in the axial direction Y by the convex portion 72b and the secondary convex portion 72e), the intermediate stationary member 50 can be fixed at the lock released position. Further, the secondary convex portion 72e is provided to be spaced apart from a lower side (namely, the lock released position side) of the convex portion 72b. Specifically, the convex portion 72b and the secondary convex portion 72e are disposed side by side in the axial direction Y of the rotary member 10. Therefore, in a state where the intermediate stationary member 50 is fixed at the lock released position, a backlash of the intermediate stationary member 50 in the axial direction Y can be reduced.

Fourth Modified Example

The present modified example is the same as the embodiment described above except that, in the present modified example, the intermediate stationary member 50 is provided with an insertion portion 58 (FIG. 16), and the rotary member 10 is provided with an attachment portion 46, such that the intermediate stationary member 50 is attached to the rotary member 10 so as to be capable of relative movement in the axial direction Y with respect to the rotary member 10. The attachment portion 46 includes an insertion hole 46a (intermediate stationary member insertion hole) (FIG. 17) into which the above-mentioned insertion portion 58 is to be inserted. In the following, with reference to FIG. 16 to FIG. 18, the present modified example will be described in detail. In the following description, components that are the same as the components of the embodiment described above are denoted by the same reference signs to omit description thereof, and difference from the embodiment described above will be mainly described.

Figure 16:
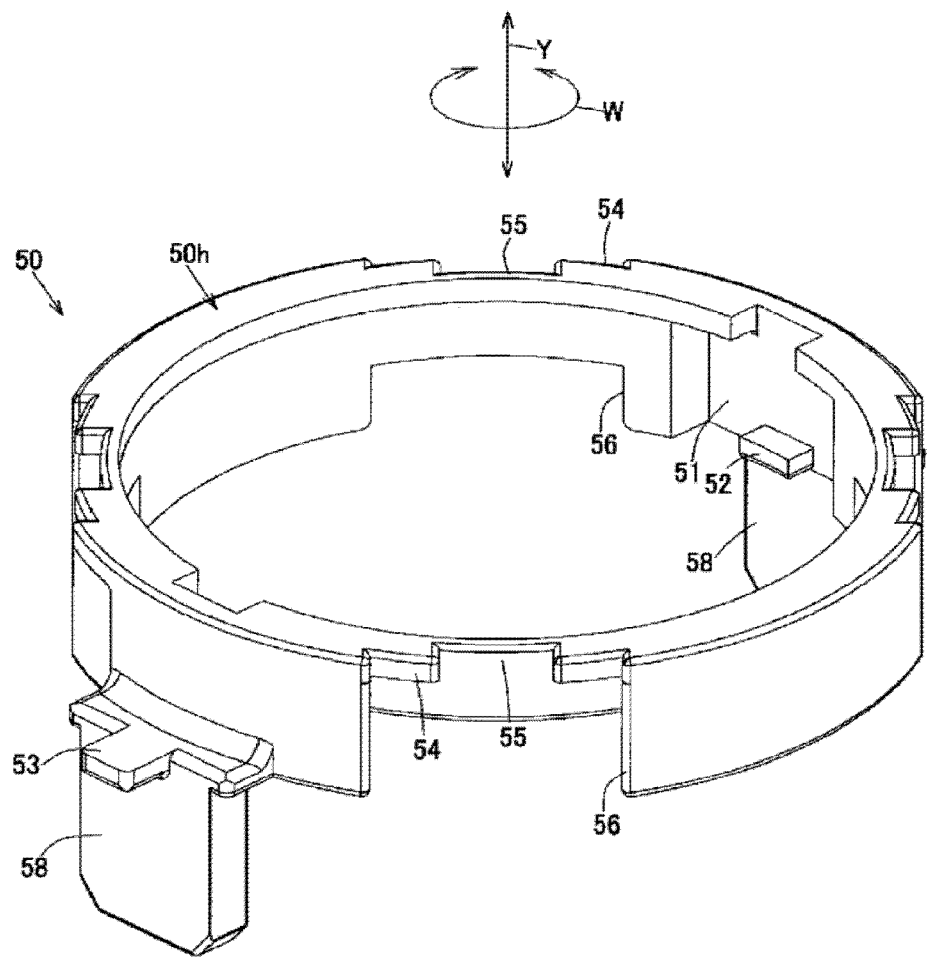
FIG. 16 is a perspective view illustrating the intermediate stationary member according to a fourth modified example.

As illustrated in FIG. 16, the intermediate stationary member 50 of the present modified example is formed to have a cylindrical shape (for example, a shape of a circular cylinder). Further, the intermediate stationary member 50 of the present modified example is different from the intermediate stationary member 50 of the embodiment described above in that the intermediate stationary member 50 of the present modified example is provided with the insertion portion 58.

For example, the insertion portion 58 is formed to have a rectangular plate-like shape in a front view. A plurality of (for example, two) insertion portions 58 are provided at a lower side circumferential end portion of the intermediate stationary member main body 50h, at symmetrical positions along the circumferential direction W. Note that only one insertion portion 58 may be provided. In the present embodiment, each insertion portion 58 is provided on a lower side of each engagement portion 52, for example, at a lower side circumferential end portion of the intermediate stationary member main body 50h.

Each insertion portion 58 is provided at a lower side circumferential end portion of the intermediate stationary member main body 50h, in a state that a horizontal width direction of each insertion portion 58 extends along the circumferential direction W, projects downward in the axial direction Y, and is deviated toward the outside in the radial direction of the intermediate stationary member main body 50h.

In the present modified example, the engagement portion 52 is provided in the intermediate stationary member main body 50h, in a state that the engagement portion 52 projects from a base end portion (namely, an upper end portion) of the insertion portion 58 toward the inside in the radial direction through a lower end center of a bottom surface of the housing concave portion 51. Further, the regulating portion 53 is provided in a state of projecting from a center of a base end portion of the insertion portion 58 toward the outside in the radial direction.

Figure 17:
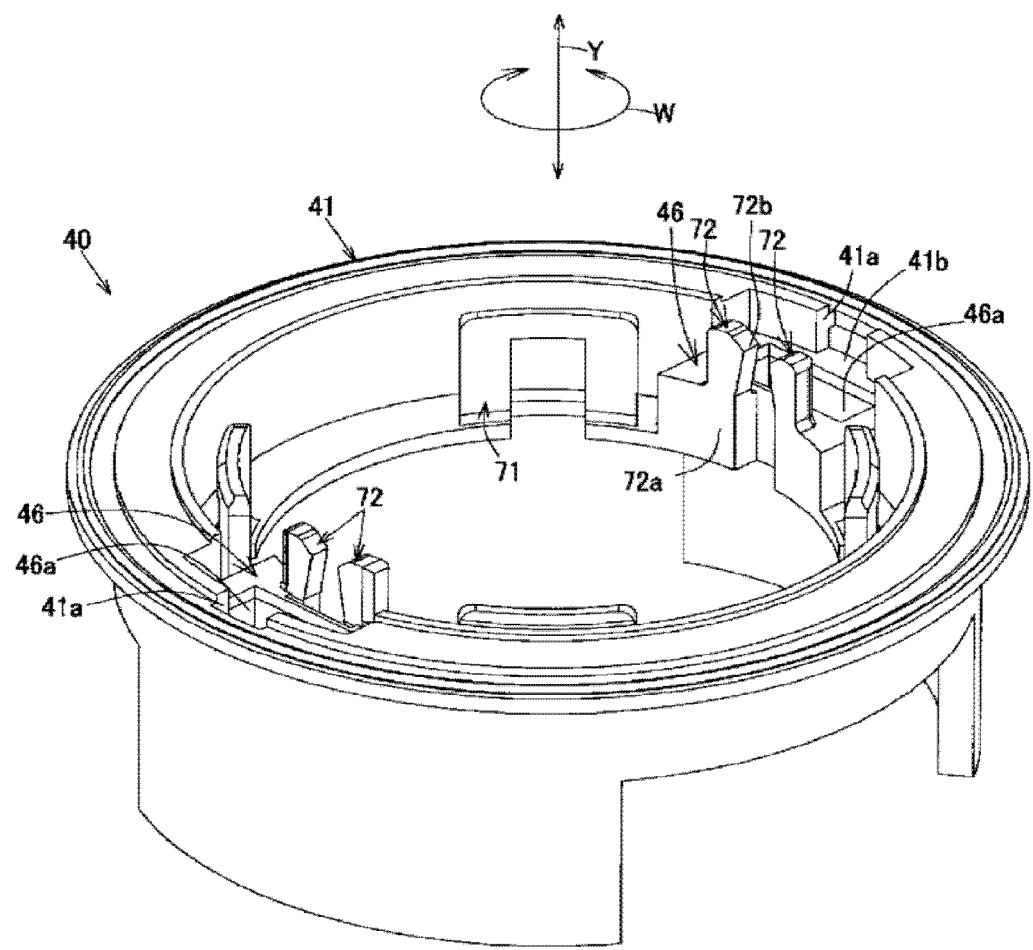
FIG. 17 is a perspective view illustrating a sleeve according to the fourth modified example.
Figure 18:
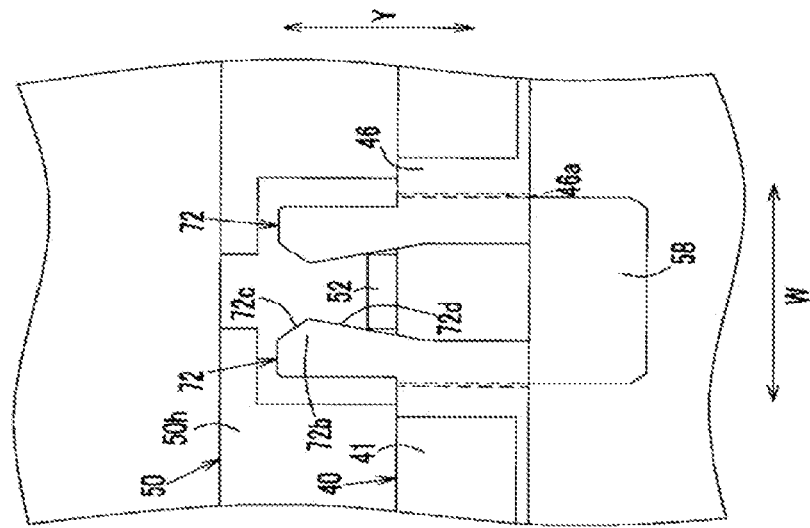
FIG. 18A is a partially enlarged view of the rotary connector device in a locked state and FIG. 18B is a partially enlarged view of the rotary connector device in a lock released state.

As illustrated in FIG. 17, the sleeve 40 of the present embodiment is the same as the sleeve 40 of the embodiment described above except that the sleeve 40 of the present embodiment is provided with the attachment portion 46 including the insertion hole 46a into which the insertion portion 58 of the intermediate stationary member 50 is to be inserted.

The attachment portions 46 are provided on an inner peripheral surface of the cylindrical portion 41 of the sleeve 40, and are provided in a state of being protruded toward the inside of the sleeve 40, at respective positions corresponding to respective insertion portions 58 of the intermediate stationary member 50. Each attachment portion 46 is provided on an inner peripheral surface of the cylindrical portion 41 of the sleeve 40, and is provided on a lower side of the guiding concave portion 41a. An upper surface of the attachment portion 46 is flush with the lower end 41b of the guiding concave portion 41a.

An upper surface of each attachment portion 46 is provided with the insertion hole 46a into which the insertion portion 58 of the intermediate stationary member 50 is to be inserted. The insertion hole 46a is formed to have a shape allowing the insertion portion 58 to be fitted and inserted into the insertion hole 46a, and has an opening that is horizontally oblong along the circumferential direction W. The insertion hole 46a extends along the axial direction Y, from an upper surface of the attachment portion 46 down to a lower surface of the lower end flange portion 43.

The insertion portion 58 of the intermediate stationary member 50 is inserted into the insertion hole 46a from an upper side of the insertion hole 46a of the sleeve 40 so as to be movable in an insertion direction (namely, the axial direction Y). In this manner, the intermediate stationary member 50 is attached to the sleeve 40 (namely, the rotary member 10) so as to be capable of relative movement along the axial direction Y with respect to the sleeve 40.

Operation of the intermediate stationary member 50 in the present embodiment is as follows. Specifically, as illustrated in FIG. 18A, in a state where the intermediate stationary member 50 is located at the locked position, the engagement portion 52 is engaged with the chamfered portions 72c on an upper side (namely, the locked position side) of respective convex portions 72b of the engaged portion 72. In this manner, the intermediate stationary member 50 is temporarily fixed at the locked position. Then, as illustrated in FIG. 18B, when the intermediate stationary member 50 is moved from the locked position to the lock released position, the engagement portion 52 passes downward through a portion between the respective convex portions 72b of the engaged portion 72 to be engaged with the chamfered portions 72d on a lower side of the convex portions 72b of the engaged portion 72. In this manner, the intermediate stationary member 50 is temporarily fixed at the lock released position.

As described above, according to the present modified example, the intermediate stationary member 50 is provided with the insertion portion 58 in a state of projecting in the axial direction Y. The attachment portion 46 is provided on the inner peripheral surface of the insertion hole H of the rotary member 10. The attachment portion 46 is provided with the insertion hole 46a (intermediate stationary member insertion hole), extending along the axial direction Y. The insertion portion 58 is inserted into the insertion hole 46a so as to be movable in an insertion direction (namely, the axial direction Y). Therefore, when the insertion portion 58 is inserted into the insertion hole 46a, the intermediate stationary member 50 can be attached to the rotary member 10 so as to be capable of relative movement in the axial direction Y with respect to the rotary member 10. Thus, the intermediate stationary member 50 can be attached to the rotary member 10 with a reduced backlash.

In the following, with reference to FIG. 19 to FIG. 22, modified examples of the insertion portion 58 of the fourth modified example will be described.

Fifth Modified Example

Figure 19:
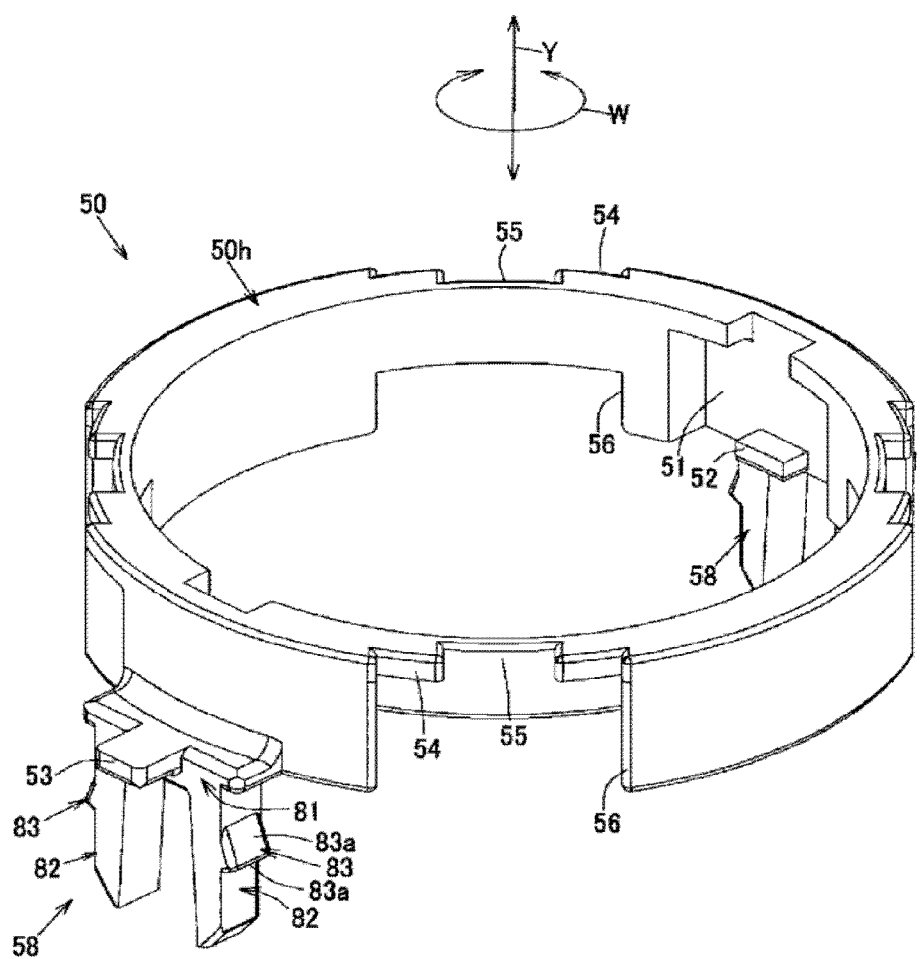
FIG. 19 is a perspective view illustrating the intermediate stationary member according to a fifth modified example.

In a modified example illustrated in FIG. 19, the insertion portion 58 is formed to have an inverted U-like shape. Specifically, the insertion portion 58 includes a coupling portion 81 having a shape of a horizontally oblong rectangular parallelepiped, for example, and a pair of elastic pieces 82. The coupling portion 81 is provided at a lower side circumferential end portion of the intermediate stationary member main body 50h, in a state of being extending along the circumferential direction W and deviating in the radial direction. The pair of elastic pieces 82 are provided to extend downward in the axial direction Y from both ends of the coupling portion 81 in a longitudinal direction, and are disposed to face each other and to be spaced apart from each other along the circumferential direction W. Secondary engagement portions 83 each having a convex shape (for example, a triangular shape in a front view) are provided on respective outer surfaces of the pair of elastic pieces 82 in a direction of mutual facing, at positions close to a center of the elastic pieces 82 in a longitudinal direction, for example.

A secondary engaged portion 47 having a convex shape (for example, a triangular shape in a front view) with which the secondary engagement portion 83 is to be engaged is provided on an inner peripheral surface of the insertion hole 46a of the attachment portion 46 of the present modified example, on an upper end side of both side surfaces in the circumferential direction W. The insertion portion 58 is inserted into the insertion hole 46a in such a manner that the pair of elastic pieces 82 are disposed side by side in the circumferential direction W inside the insertion hole 46a.

In the present modified example, similarly to the embodiment described above, due to engagement between the engagement portion 52 and the engaged portion 72, the intermediate stationary member 50 is temporarily fixed at the locked position and the lock released position. In addition, as will be described later, also due to engagement between the secondary engagement portion 83 of the insertion portion 58 and the secondary engaged portion 47 of the insertion hole 46a, the intermediate stationary member 50 is temporarily fixed at the locked position and the lock released position.

Specifically, as illustrated in FIG. 20A, in a state where the intermediate stationary member 50 is located at the locked position, the pair of elastic pieces 82 of the insertion portion 58 is sandwiched between the secondary engaged portions 47 on both sides of the insertion hole 46a, and slopes 83b on a lower side of the secondary engagement portions 83 are engaged with slopes 47b on an upper side of the secondary engaged portions 47. Also due to this engagement, the intermediate stationary member 50 is temporarily fixed at the locked position. Then, when the intermediate stationary member 50 is moved from the locked position to the lock released position, the pair of elastic pieces 82 is elastically pushed down in an inclined manner in a facing direction of the pair of elastic pieces 82 by respective secondary engaged portions 47, and as illustrated in FIG. 20B, slopes 83a on an upper side of the secondary engagement portions 83 are engaged with slopes 47c on a lower side of the secondary engaged portions 47. Also due to this engagement, the intermediate stationary member 50 is temporarily fixed at the lock released position.

As described above, according to the present modified example, the secondary engagement portions 83 (third engagement portion) and the secondary engaged portions 47 (third engaged portion) are disposed by utilizing a gap between the insertion portion 58 and the insertion hole 46a (insertion hole for intermediate stationary member). Therefore, there is no longer a necessity of separately securing a position for disposing the secondary engagement portions 83 and the secondary engaged portions 47.

Further, the secondary engagement portions 83 (third engagement portion) are provided on respective outer surfaces of the pair of elastic pieces 82 of the insertion portion 58 in the direction of mutual facing. Therefore, the secondary engagement portions 83 and the secondary engaged portions 47 (third engaged portion) can be elastically engaged with each other, and a backlash between the intermediate stationary member 50 and the rotary member 10 (in particular, a backlash of the pair of elastic pieces 82 in the facing direction (namely, the circumferential direction W)) can be reduced.

Sixth Modified Example

Figure 21:
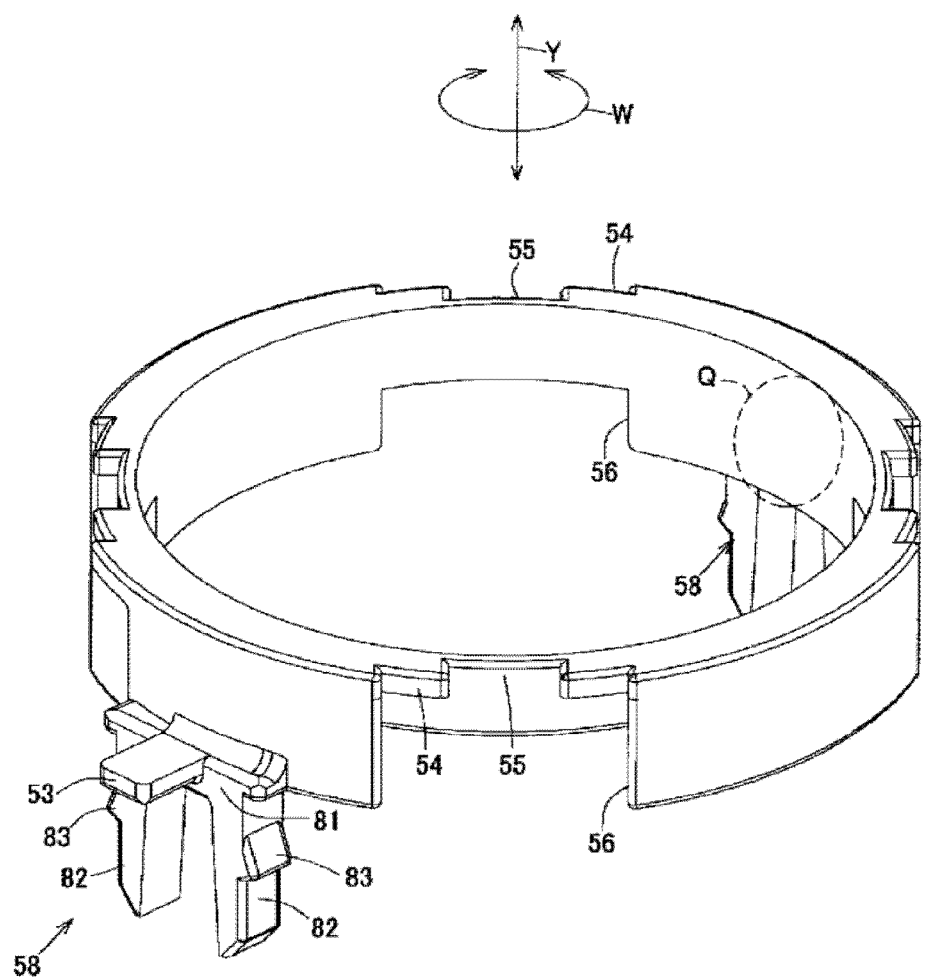
FIG. 21 is a perspective view illustrating a sleeve according to a sixth modified example.

A modified example illustrated in FIG. 21 is the same as the fifth modified example except that, in the modified example illustrated in FIG. 21, the engagement portion 52 and the housing concave portion 51 are omitted from the intermediate stationary member 50 (a part enclosed in the dotted circle Q of FIG. 21), and the engaged portion 72 is omitted from the sleeve 40. Also according to the present modified example, an effect similar to the effect of the fifth modified example can be achieved.

Seventh Modified Example

Figure 22:
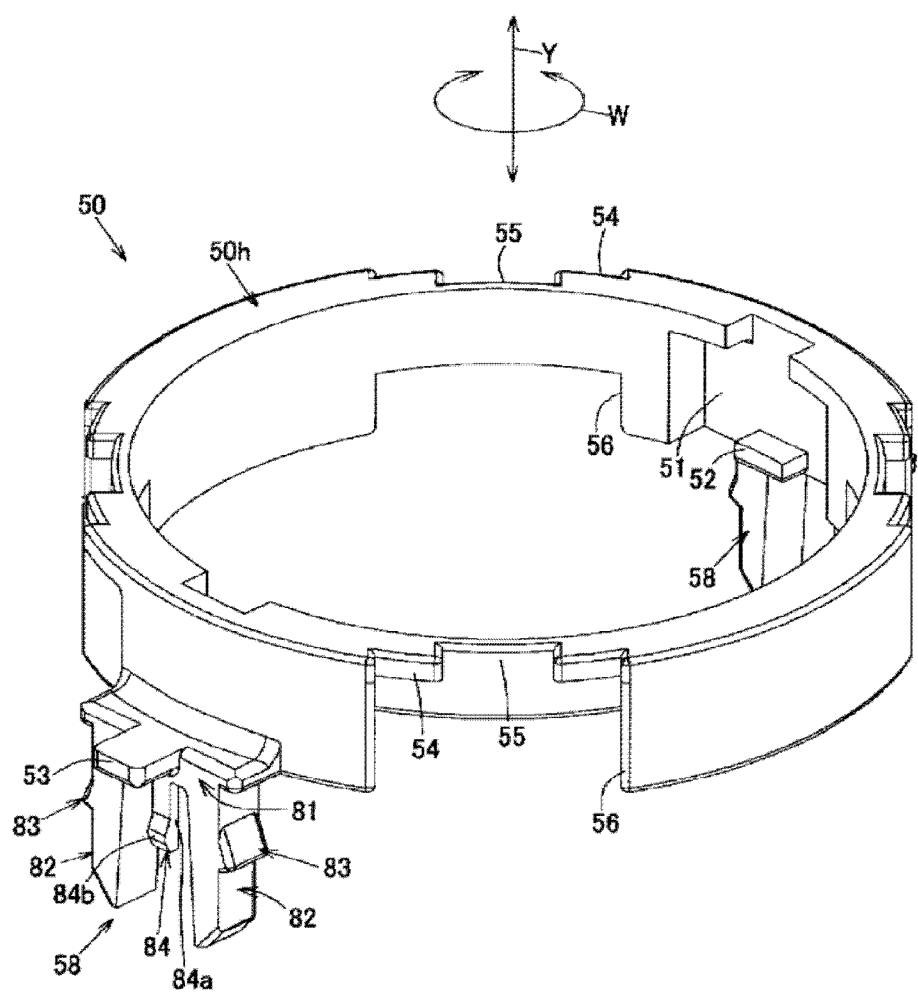
FIG. 22 is a perspective view illustrating a sleeve according to a seventh modified example.

A modified example illustrated in FIG. 22 is the same as the fifth modified example except that, in the modified example illustrated in FIG. 22, a pressing portion 84 is provided in the insertion portion 58, at a position between the engagement portions 83 (third engaged portion) on both sides. The pressing portion 84 is provided between the pair of elastic pieces 82 in the coupling portion 81 of the insertion portion 58, for example, and is vertically provided toward a lower side in the axial direction Y. The pressing portion 84 includes an elastic piece 84a vertically provided in the coupling portion 81, and a convex portion 84b provided on one side (namely, a side the same as a side of a side surface 46b) in the radial direction in a tip end of the elastic piece 84a.

In the present modified example, in a state where the insertion portion 58 is inserted into the insertion hole 46a, the convex portion 84b of the pressing portion 84 presses a part of an inner peripheral surface of the insertion hole 46a that faces a front surface of the pressing portion 84. In this manner, a backlash of the pressing portion 84 of the intermediate stationary member 50 in a front direction (namely, a backlash of the intermediate stationary member 50 in the radial direction) can be reduced.

In the following, other embodiments of the disclosure will be described based on the drawings.

Other Embodiments

With reference to FIG. 23 to FIG. 31, a rotary connector device 100 according to the present embodiment will be described.

Figure 23:
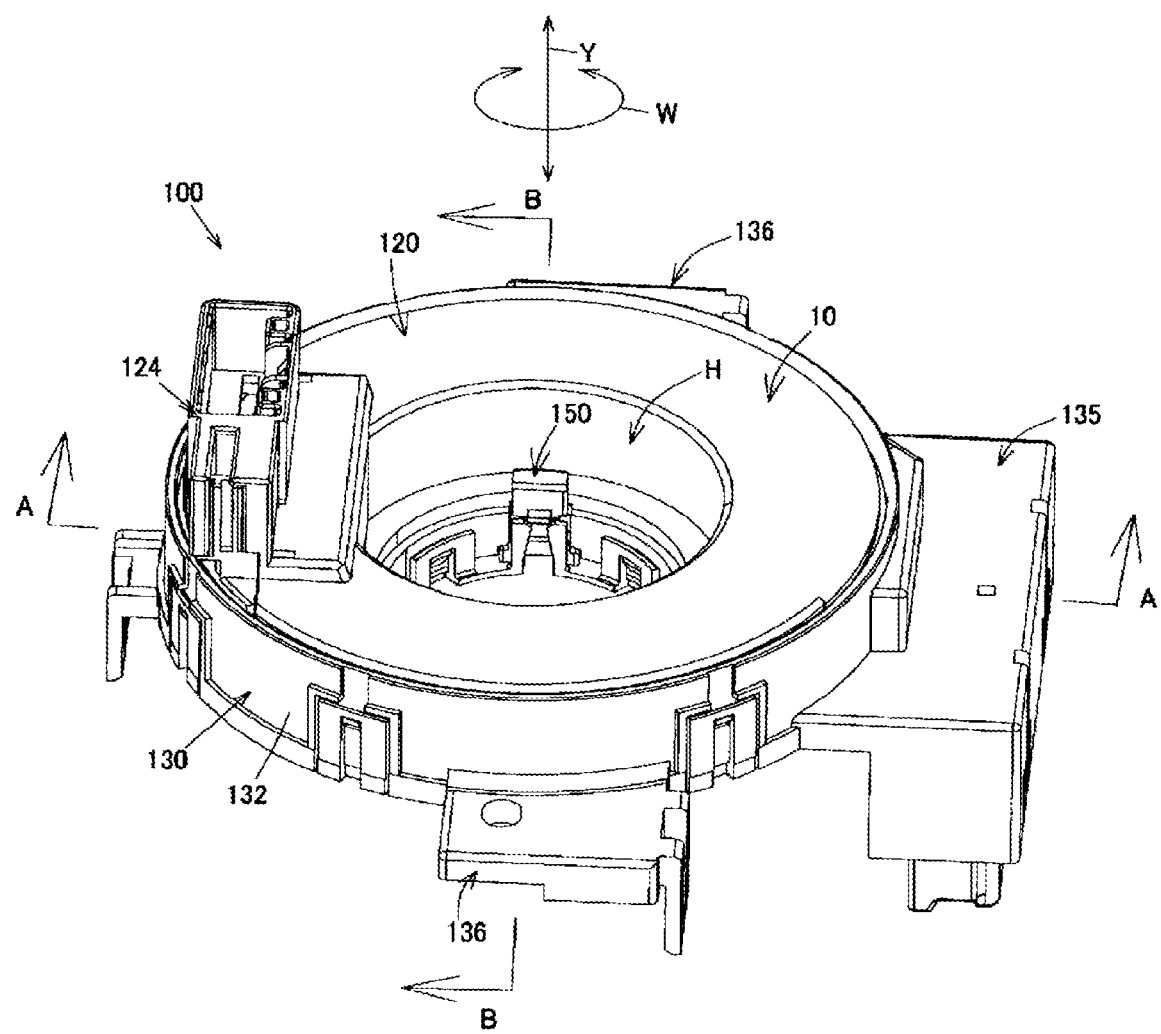
FIG. 23 is a perspective view illustrating a rotary connector device according to another embodiment.
Figure 24:
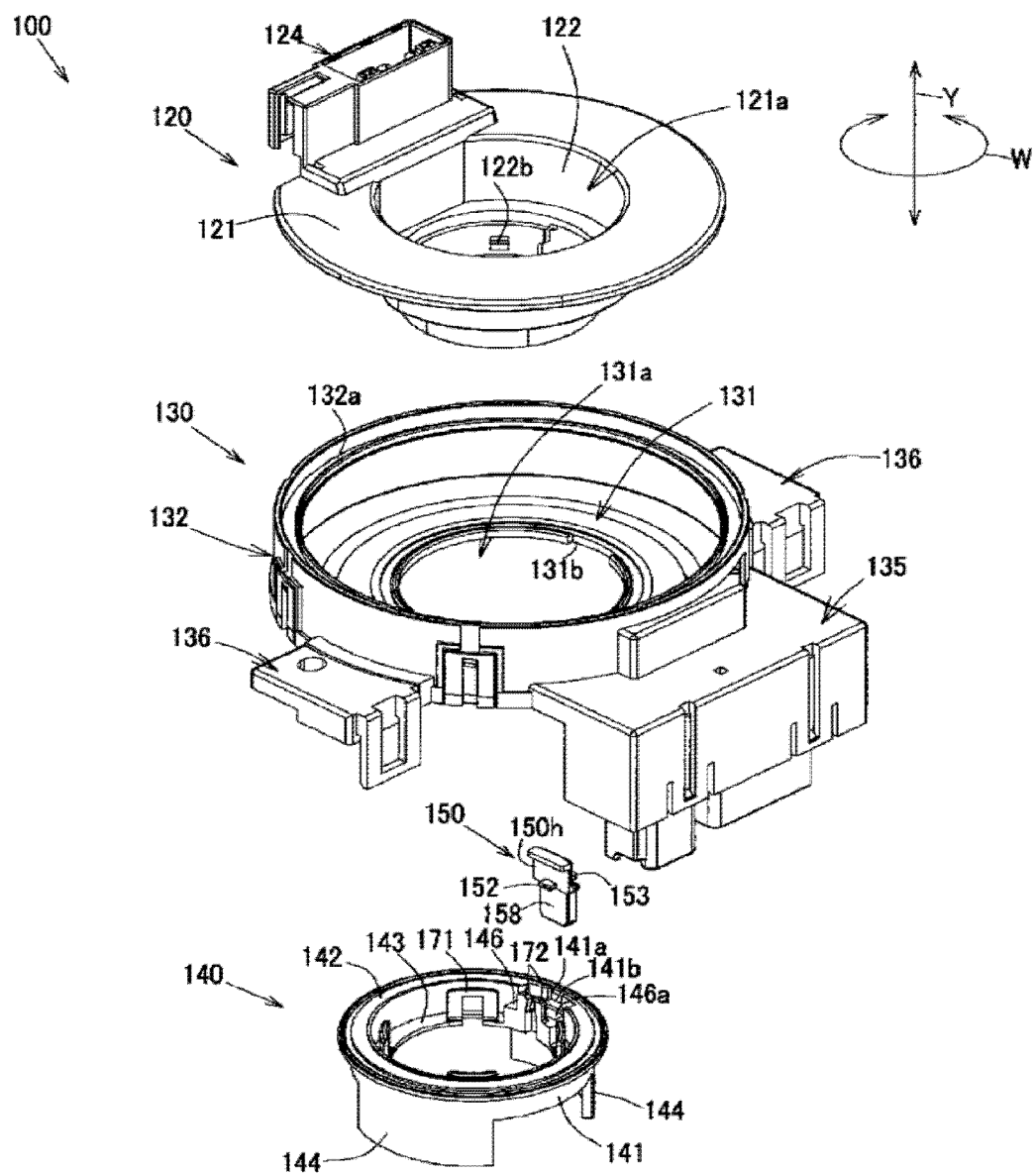
FIG. 24 is an exploded perspective view illustrating a rotary connector device according to another embodiment.

The rotary connector device 100 is a device that electrically connects wiring of a steering wheel and wiring of a vehicle body that are mounted in a vehicle (for example, an automobile). As illustrated in FIG. 23 and FIG. 24, the rotary connector device 100 includes a rotator 120 and a sleeve 140 that constitute a rotary member 110 to which a steering wheel (not illustrated) is to be attached, a stator serving as a stationary member 130 to be attached to a vehicle body, a flat cable (not illustrated) that electrically connects wiring of a steering wheel and wiring of a vehicle body, and an intermediate stationary member 150 that temporarily fixes relative rotation of the rotary member 110 with respect to the stationary member 130. The stationary member 130 is hereinafter also referred to as a stator 130. The rotator 120, the stator 130, the sleeve 140, and the intermediate stationary member 150 are formed of resin, for example.

The intermediate stationary member 150 is attached to the rotary member 110 in such a manner that the intermediate stationary member 150 is movable between a locked position and a lock released position. The locked position is a position for locking relative rotation of the rotary member 110 with respect to the stationary member 130. The lock released position is a position for releasing the lock. When an insertion convex portion 710 (FIG. 28) of a steering wheel is inserted into an insertion hole H (steering wheel insertion hole) of the rotary member 110, the intermediate stationary member 150 is moved from the locked position to the lock released position, and the lock of relative rotation of the rotary member 110 is released.

Note that the insertion hole H is constituted of an inner peripheral surface of an inner-circumferential cylindrical portion 122 (to be described later) of the rotator 120, and an inner peripheral surface of a cylindrical portion 141 (to be described later) of the sleeve 140. Note that the reference sign Y of FIG. 23 etc. denotes an axial direction of the insertion hole H (namely, an axial direction of the rotary member 110), and the reference sign W denotes a circumferential direction of the insertion hole H (namely, a circumferential direction of the rotary member 110).

Figure 25:
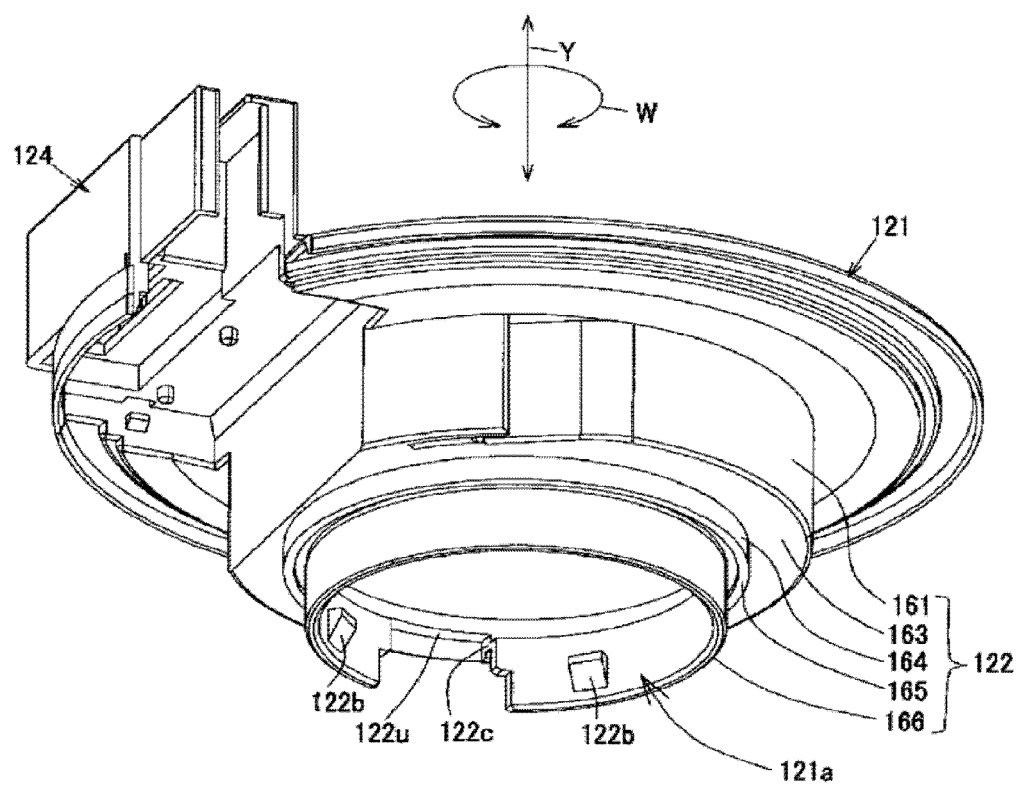
FIG. 25 is a perspective view of a sleeve seen from a lower side.

As illustrated in FIG. 24 and FIG. 25, the rotator 120 includes a rotating-side ring plate 121 having a substantially annular shape, and an inner-circumferential cylindrical portion 122 having a shape of a circular cylinder. The rotating-side ring plate 121 has a through hole 121a having a substantially circular shape (for example, substantially D-like shape in a planar view), at a center of the rotating-side ring plate 121. The inner-circumferential cylindrical portion 122 extends downward from an inner-circumferential edge portion of the rotating-side ring plate 121.

A rotating-side connector 124 is provided on an upper surface of the rotating-side ring plate 121. For example, the rotating-side connector 124 is an electrical connection connector to which an electrical connection connector connected to an electric circuit (for example, a horn switch and an air bag unit) provided in a steering wheel is to be connected.

For example, the inner-circumferential cylindrical portion 122 is formed to have a stepped cylindrical shape. The inner-circumferential cylindrical portion 122 includes a large diameter cylindrical portion 161 having a shape of a circular cylinder, an upper-side step portion 163 having an annular shape, a medium diameter cylindrical portion 164 having a shape of a circular cylinder, a lower-side step portion 165, and a small diameter cylindrical portion 166 having a shape of a circular cylinder. The large diameter cylindrical portion 161 extends downward from an inner-circumferential edge portion of the rotating-side ring plate 121. The upper-side step portion 163 is protruded from a lower end circumferential edge portion of the large diameter cylindrical portion 161 toward the inside in a radial direction. The medium diameter cylindrical portion 164 extends downward from an inner-circumferential edge portion of the upper-side step portion 163. The lower-side step portion 165 is protruded from a lower end circumferential edge portion of the medium diameter cylindrical portion 164 toward the inside in the radial direction. The small diameter cylindrical portion 166 extends downward from an inner-circumferential edge portion of the lower-side step portion 165. Therefore, a diameter of each of an outer peripheral surface and an inner peripheral surface of the inner-circumferential cylindrical portion 122 is reduced from an upper end toward a lower end at a position of the upper-side step portion 163 in a stepped manner, and is further reduced at a position of the lower-side step portion 165 in a stepped manner.

Note that an inner diameter of the large diameter cylindrical portion 161 is formed to be substantially equivalent to a diameter of the insertion convex portion 710 of a steering wheel, such that the insertion convex portion 710 of a steering wheel can be fitted into the large diameter cylindrical portion 161. A diameter of the medium diameter cylindrical portion 164 is formed to be smaller than the diameter of the large diameter cylindrical portion 161. A diameter of the small diameter cylindrical portion 166 is formed to be smaller than the diameter of the medium diameter cylindrical portion 164. A length of the medium diameter cylindrical portion 164 in the axial direction Y is formed to be substantially equivalent to a thickness of a stationary-side ring plate 131 (to be described later) of the stator 130. A length of the small diameter cylindrical portion 166 in the axial direction Y is formed to be substantially equivalent to a length of a cylindrical portion 141 (to be described later) of the sleeve 140 in the axial direction Y.

In an outer peripheral surface of the inner-circumferential cylindrical portion 122, a concave corner portion formed by the upper-side step portion 163 and the medium diameter cylindrical portion 164 forms a stator engagement portion with which a stationary-side ring plate 131 (to be described later) of the stator 130 is to be engaged, and a concave corner portion formed by the lower-side step portion 165 and the small diameter cylindrical portion 166 constitutes a sleeve engagement portion with which a cylindrical portion 141 (to be described later) of the sleeve 140 is to be engaged.

The inner-circumferential cylindrical portion 122 is provided with an engagement portion 122b to be engaged with an engaged portion 171 (to be described later) of the sleeve 140, and a guiding cutout portion 122c for guiding movement of a regulating portion 153 (to be described later) of the intermediate stationary member 150.

The guiding cutout portion 122c extends in a thickness direction of the inner-circumferential cylindrical portion 122. For example, the guiding cutout portion 122c is formed to have a substantially band-like shape along the axial direction Y of the inner-circumferential cylindrical portion 122. The guiding cutout portion 122c is formed reach an upper end of the medium diameter cylindrical portion 164, and is opened at a lower end of the inner-circumferential cylindrical portion 122. An upper end 122u of each guiding cutout portion 122c defines an upper-limit position (namely, the locked position) of a movement range of the intermediate stationary member 150. Note that the movement range of the intermediate stationary member 150 extends along the axial direction Y.

As illustrated in FIG. 24, the stator 130 includes a stationary-side ring plate 131 having a substantially annular shape, an outer-circumferential cylindrical portion 132 having a shape of a circular cylinder and extending upward from an outer-circumferential edge portion of the stationary-side ring plate 131, a stationary-side connector 135 provided on an outer peripheral surface of the outer-circumferential cylindrical portion 132, and a fixing portion 136 for fixing the stator 130 to a vehicle body.

A through hole 131a having a circular shape is provided at a center of the stationary-side ring plate 131. An outer periphery of the medium diameter cylindrical portion 164 of the rotator 120 is to be fitted and inserted into the through hole 131a. One or more (for example, one) engagement portions 131b are provided at an inner-circumferential edge portion of the stationary-side ring plate 131. A regulating portion 153 (to be described later) of the intermediate stationary member 150 is to be engaged with the engagement portion 131b. The engagement portion 131b is formed to have such a shape that is concave toward the outside in the radial direction from an inner-circumferential edge portion of the stationary-side ring plate 131, and extends in a thickness direction of the stationary-side ring plate 131.

A diameter of the outer-circumferential cylindrical portion 132 is formed to be substantially equivalent to a diameter of the rotating-side ring plate 121 of the rotator 120. A length of the outer-circumferential cylindrical portion 132 in the axial direction Y is formed to be substantially equivalent to a length of the inner-circumferential cylindrical portion 122 of the rotator 120 in the axial direction Y. A flange portion 132a is provided on an inner peripheral surface of the outer-circumferential cylindrical portion 132. An outer-circumferential edge portion of the rotating-side ring plate 121 is to be engaged with the flange portion 132a. The flange portion 132a is provided at a position close to an upper end circumferential edge portion of an inner peripheral surface of the outer-circumferential cylindrical portion 132, and is provided to be protruded toward the inside in the radial direction of the outer-circumferential cylindrical portion 132 all over the circumferential direction W.

The stationary-side connector 135 is an electrical connection connector to which an electrical connection connector connected to an electric circuit provided in a vehicle body is to be connected. The fixing portion 136 is provided on an outer peripheral surface of the outer-circumferential cylindrical portion 132, and is provided to be protruded toward the outside in the radial direction.

Figure 28:
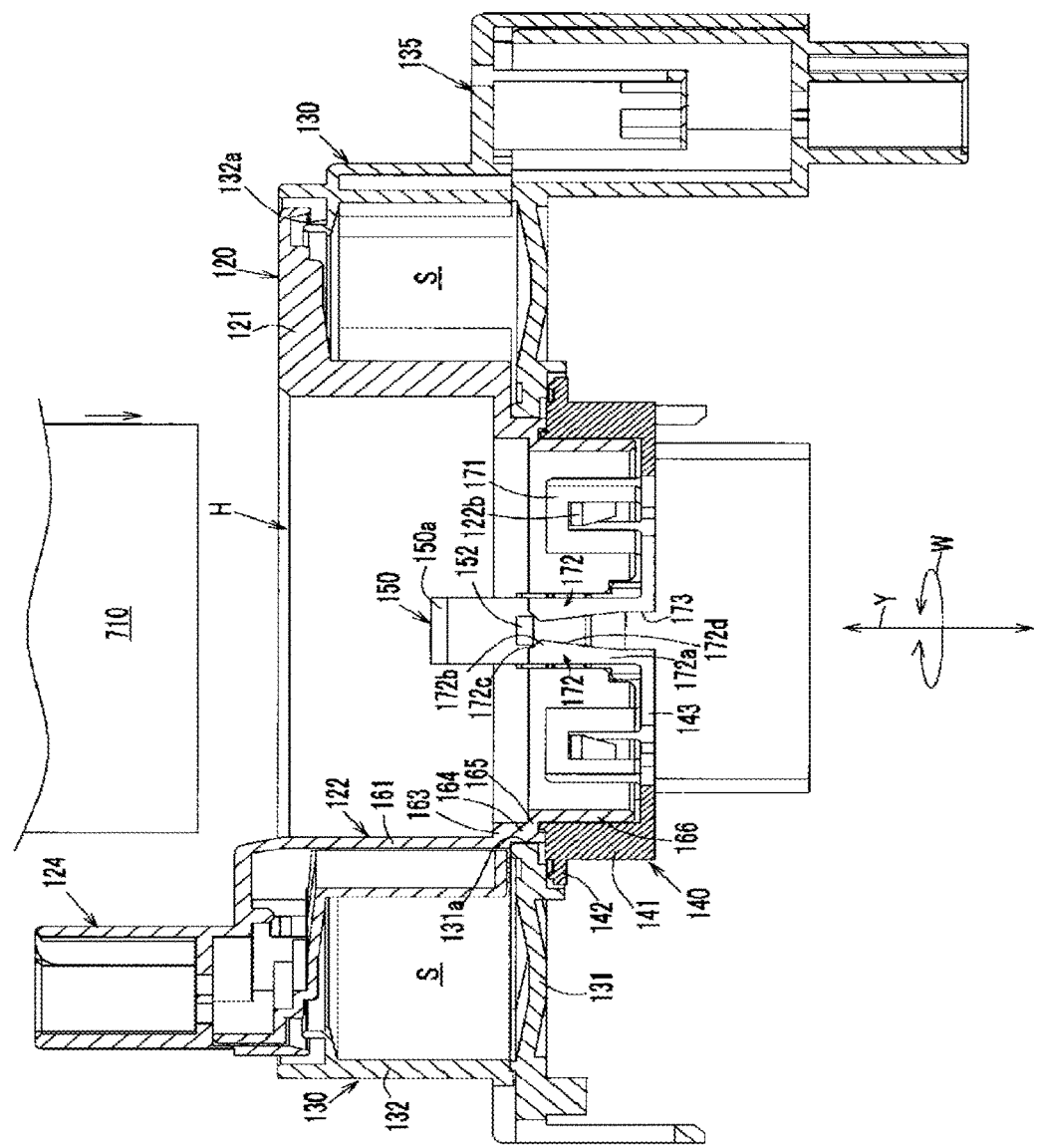
FIG. 28 is a cross-sectional view of FIG. 23, which is taken along the line A-A.

As illustrated in FIG. 28, in a state where the rotator 120 is assembled to the stator 130, the rotator 120 is fitted into the inside of the outer-circumferential cylindrical portion 132 of the stator 130, and a lower surface of an outer-circumferential edge portion of the rotating-side ring plate 121 of the rotator 120 is engaged with an upper surface of the flange portion 132a of the stator 130. Further, in the state described above, the medium diameter cylindrical portion 164 of the rotator 120 is fitted into the through hole 131a at a center of the stationary-side ring plate 131 of the stator 130, and the upper-side step portion 163 of the rotator 120 is engaged with an inner-circumferential edge portion of an upper surface of the stationary-side ring plate 131 of the stator 130. In this manner, the rotator 120 is attached to the stator 130 so as to be capable of relative rotation with respect to the stator 130.

Between the stator 130 and the rotator 120 assembled as described above, an annular housing space S in which the above-mentioned flat cable is to be housed is formed. The housing space S is a space surrounded by the inner-circumferential cylindrical portion 122, the outer-circumferential cylindrical portion 132, the rotating-side ring plate 121, and the stationary-side ring plate 131.

The above-mentioned flat cable is housed in the housing space S in the following state. Specifically, a plurality of flat cables are stacked, the stacked flat cables are wound clockwise and counterclockwise along an outer peripheral surface of the inner-circumferential cylindrical portion 122 and an inner peripheral surface of the outer-circumferential cylindrical portion 132. The stacked flat cables are wound clockwise as many turns as the stacked flat cables are wound counterclockwise. A first end portion of the above-mentioned flat cable is electrically connected to the rotating-side connector 124. A second end of the above-mentioned flat cable is electrically connected to the stationary-side connector 135. Note that a rotation position of the rotary member 110, at which the number of clockwise turns of the flat cable is the same as the number of counterclockwise turns of the flat cable when the rotary member 110 is caused to make relative rotation with respect to the stationary member 130, is referred to as an intermediate position of the rotary member 110.

Figure 26A:
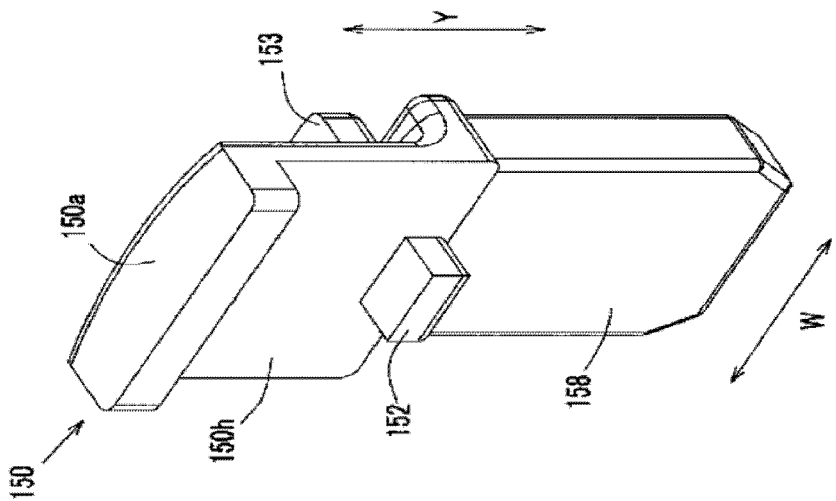
FIG. 26A is a perspective view of the intermediate stationary member seen from a side of an outer main surface and FIG. 26B is a perspective view of the intermediate stationary member seen from an inner main surface side.
Figure 26B:
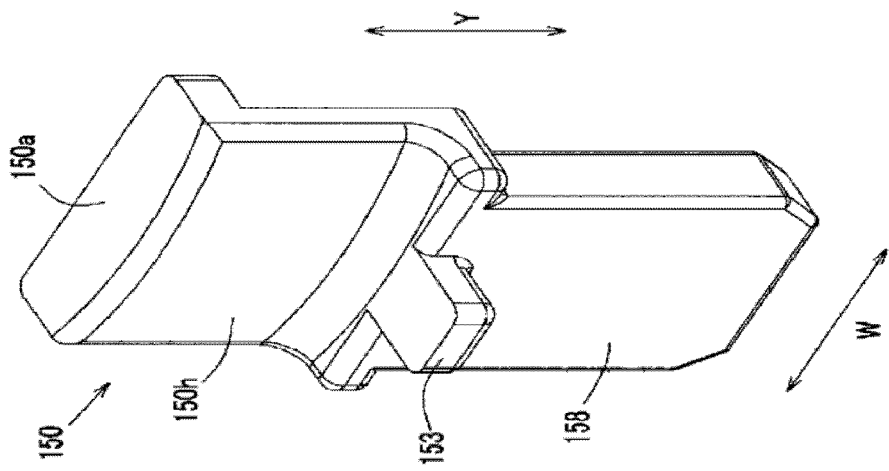

As illustrated in FIG. 23 and FIG. 26, the intermediate stationary member 150 is a member that temporarily fixes the rotator 120 at the intermediate position with respect to the stator 130. One or more (for example, one) intermediate stationary members 150 are disposed on an inner peripheral surface of the insertion hole H. For example, the intermediate stationary member 150 is formed to have a vertically oblong shape along the axial direction Y. The intermediate stationary member 150 includes: an intermediate stationary member 150*h* constituting an upper portion of the intermediate stationary member 150; an insertion portion 158 that constitutes a lower portion of the intermediate stationary member 150 and that is to be inserted into an insertion hole 146*a* (to be described later) of the sleeve 140; an engagement portion 152 (fourth engagement portion) to be engaged with an engaged portion 172 (to be described later) of the sleeve 140; and a regulating portion 153 to be engaged with the engagement portion 131*b* of the stator 130 to regulate relative rotation of the rotary member 110 with respect to the stationary member 130.

For example, the intermediate stationary member 150*h* is formed to have a substantially rectangular plate-like shape in a front view. An upper end portion of the intermediate stationary member 150*h* is bent toward an inner main surface side to constitute an abutment portion 150*a* on which the insertion convex portion 710 of a steering wheel is to abut. An outer main surface of the intermediate stationary member 150*h* is curved toward the outside along the circumferential direction, whereas the inner main surface is formed to be flat.

The insertion portion 158 is provided at a lower end portion of the intermediate stationary member 150*h*, in a state where a horizontal width direction of the insertion portion 158 extends along the circumferential direction W, projects toward a lower portion of the intermediate stationary member 150*h* along the axial direction Y, and deviates toward a side of an outer main surface of the intermediate stationary member 150*h*.

For example, the engagement portion 152 is formed to have a shape of a columnar rectangular parallelepiped. The engagement portion 152 is provided to project from a center of a lower end of the intermediate stationary member 150*h* in the horizontal width direction (namely, the circumferential direction W) toward a direction orthogonal to an inner main surface of the intermediate stationary member 150*h* (namely, toward the inside in the radial direction of the rotary member 110).

For example, the regulating portion 153 is formed to have a shape of a rod-like rectangular parallelepiped. The regulating portion 153 is provided to project from a center of an upper end portion of the insertion portion 158 in a width direction toward a direction orthogonal to an outer main surface of the intermediate stationary member 150. Base end portions of the engagement portion 152 and the regulating portion 153 are coupled together so that the engagement portion 152 and the regulating portion 153 are formed integrally with each other.

Figure 27:
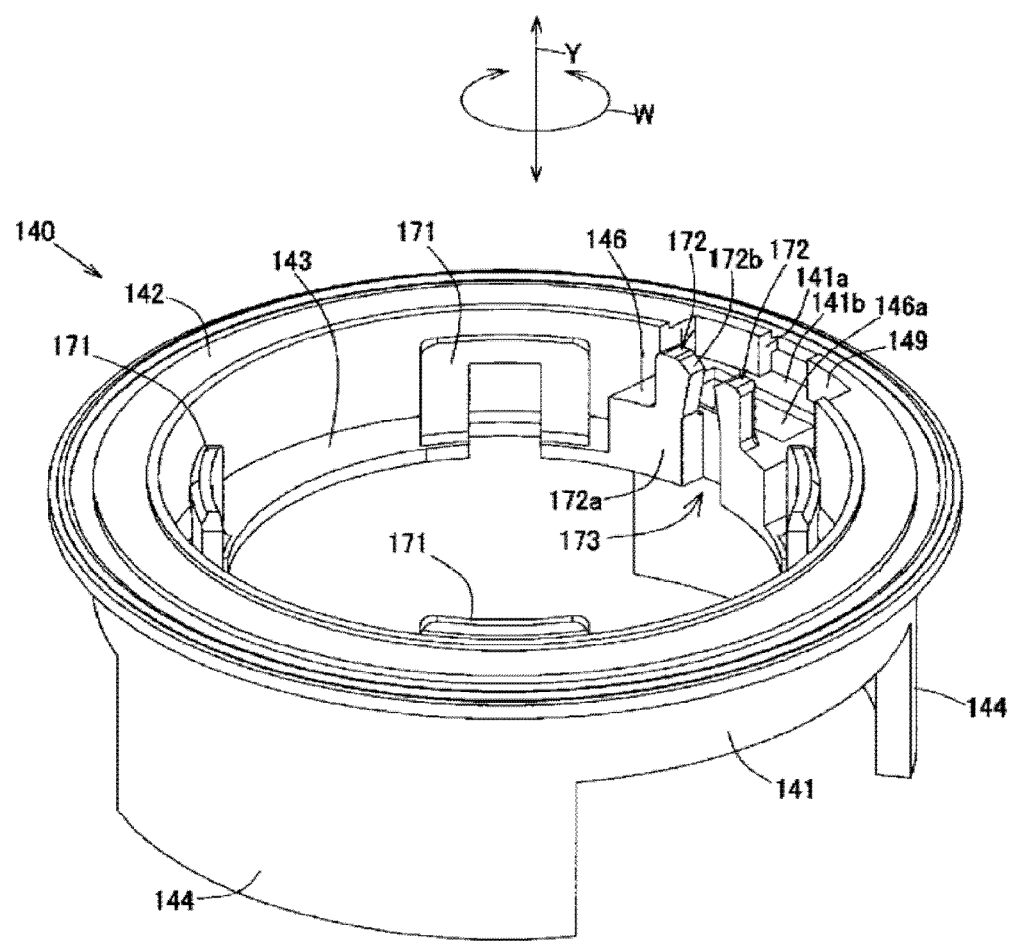
FIG. 27 is a perspective view illustrating a sleeve.

As illustrated in FIG. 27, the sleeve 140 includes a cylindrical portion 141 having a shape of a circular cylinder, for example, an upper end flange portion 142 having an annular shape, a lower end flange portion 143 having an annular shape, and an extending portion 144 having an arced shape. The cylindrical portion 141 is to be fitted to an outer periphery of the small diameter cylindrical portion 166 of the rotator 120. The upper end flange portion 142 is protruded from an upper end of an outer peripheral surface of the cylindrical portion 141 toward the outside in the radial direction. The lower end flange portion 143 is protruded from a lower end of an inner peripheral surface of the cylindrical portion 141 toward the inside in the radial direction. The extending portion 144 is provided to extend downward from a lower end of the cylindrical portion 141. For example, two extending portions 144 are provided at symmetrical positions in such a manner that the two extending portions 144 are spaced apart from each other in the circumferential direction W of the cylindrical portion 141.

An inner diameter of the cylindrical portion 141 has a dimension substantially the same as a dimension of an outer diameter of the small diameter cylindrical portion 166 of the rotator 120. A length of the cylindrical portion 141 in the axial direction Y is substantially the same as the length of the small diameter cylindrical portion 166 in the axial direction Y. A guiding concave portion 141*a* is provided on an upper side of an inner peripheral surface of the cylindrical portion 141. The guiding concave portion 141*a* guides movement of the regulating portion 153 of the intermediate stationary member 150.

The guiding concave portion 141*a* is provided at a position corresponding to the regulating portion 153 of the intermediate stationary member 150. The guiding concave portion 141*a* is formed along the axial direction Y of the cylindrical portion 141, and is opened at an upper end of the cylindrical portion 141. A lower end 141*b* of the guiding concave portion 141*a* defines a lower-limit position (namely, the lock released position) of a movement range of the intermediate stationary member 150.

The lower end flange portion 143 is provided with an engaged portion 171 with which the engagement portion 122*b* of the rotator 120 is to be engaged, an engaged portion 172 (fourth engaged portion) with which the engagement portion 152 of the intermediate stationary member 150 is to be engaged, and an exposure window 173 for exposing an end portion of a lower side (namely, a lock released position side) of the engagement portion 152.

The engaged portion 171 is provided at an inner-circumferential edge portion of an upper surface of the lower end flange portion 143. The engaged portion 171 is vertically provided in the axial direction Y, at a position corresponding to the engagement portion 122b of the rotator 120. For example, the engaged portion 171 is formed to have a rectangular plate-like shape in a front view. At a center of a horizontal width of the engaged portion 171, an engagement hole allowing the engagement portion 122b to be engaged is provided to extend in a thickness direction of the engaged portion 171. A lower end of the above-mentioned engagement hole is opened at a lower surface of the lower end flange portion 143.

The engaged portion 172 is provided at an inner-circumferential edge portion of an upper surface of the lower end flange portion 143. The engaged portion 172 is vertically provided in the axial direction Y, at a position corresponding to the engagement portion 152 of the intermediate stationary member 150. The engaged portion 172 includes a pair of elastic pieces 172a, and convex portions 172b. The convex portion 172b is provided in each of the pair of elastic pieces 172a, and is to be engaged with the engagement portion 152.

The pair of elastic pieces 172a are vertically provided in the axial direction Y on an upper surface of the lower end flange portion 143. Further, the pair of elastic pieces 172a are disposed to face each other and to be spaced apart from each other along the circumferential direction (namely, a direction orthogonal to the axial direction Y) W, so that the pair of elastic pieces 172a are disposed respectively on both sides of the engagement portion 152 of the intermediate stationary member 150 in the circumferential direction W.

Each convex portion 172b is provided on an end side of a facing surface of each of the elastic pieces 172a, and is provided to project in a direction of mutual facing. Chamfered portions 172c and 173d, which are chamfered to have a flat surface, for example, are provided at respective corner portions of an upper side (namely, a locked position side) and a lower side (namely, the lock released position side) of each convex portion 172b. Note that each of the chamfered portions 172c and 173d may have a curved surface that is curved in an arced shape, for example.

As described above, the pair of elastic pieces 172a are disposed respectably on both sides of the engagement portion 152 in the circumferential direction W, and the convex portions 172b are provided on mutually facing surfaces of the elastic pieces 172a to project in a facing direction. In this manner, the engaged portion 172 is engaged with the engagement portion 152 from both sides in the circumferential direction W (namely, a direction orthogonal to the axial direction Y).

The exposure window 173 is provided at a portion between the pair of elastic pieces 172a at the lower end flange portion 143 (namely, a portion blocking the front of an end portion of a lower side (namely, the lock released position side) of the engagement portion 152), and extends in a thickness direction of the lower end flange portion 143.

Further, an attachment portion 146 (intermediate stationary member insertion hole) including an insertion hole 146a into which the insertion portion 158 of the intermediate stationary member 150 is to be inserted is provided on an inner peripheral surface of the sleeve (e.g., an inner peripheral surface of the cylindrical portion 141).

The attachment portion 146 is provided on an inner peripheral surface of the cylindrical portion 141, and is provided in a state of being protruded toward the inside of the cylindrical portion 141, at a position corresponding to the insertion portion 158 of the intermediate stationary member 150. Each attachment portion 146 is provided on an inner peripheral surface of the cylindrical portion 141, and is provided on a lower side of the guiding concave portion 141a. An upper surface of the attachment portion 146 is flush with the lower end 141b of the guiding concave portion 141a.

A concave portion 149 is provided on an inner peripheral surface of the cylindrical portion 141 in such a manner that the concave portion 149 overlaps each guiding concave portion 141a. The concave portion 149 is provided on an inner peripheral surface of the cylindrical portion 141, and is provided to extend from a position as high as an upper surface of the attachment portion 146 down to an upper end of the cylindrical portion 141 along the axial direction Y. The concave portion 149 has a horizontal width the same as a horizontal width of the attachment portion 146. The guiding concave portion 141a is provided on a bottom surface of the concave portion 149. Owing to the concave portion 149, a width of an upper surface of the attachment portion 146 is expanded toward the outside in the radial direction of the cylindrical portion 141.

An upper surface of the attachment portion 146 is provided with the insertion hole 146a into which the insertion portion 158 of the intermediate stationary member 150 is to be inserted. The insertion hole 146a is formed to have a shape allowing the insertion portion 158 to be fitted and inserted into the insertion hole 146a, and has an opening that is horizontally oblong along the circumferential direction W. The insertion hole 146a extends along the axial direction Y, from an upper surface of the attachment portion 146 down to a lower surface of the lower end flange portion 143.

The insertion portion 158 of the intermediate stationary member 150 is inserted into the insertion hole 146a from an upper side of the insertion hole 146a of the sleeve 140 so as to be movable in an insertion direction (namely, the axial direction Y). In this manner, the intermediate stationary member 150 is attached to the sleeve 140 (namely, the rotary member 110) so as to be capable of relative movement along the axial direction Y with respect to the sleeve 140.

Figure 29:
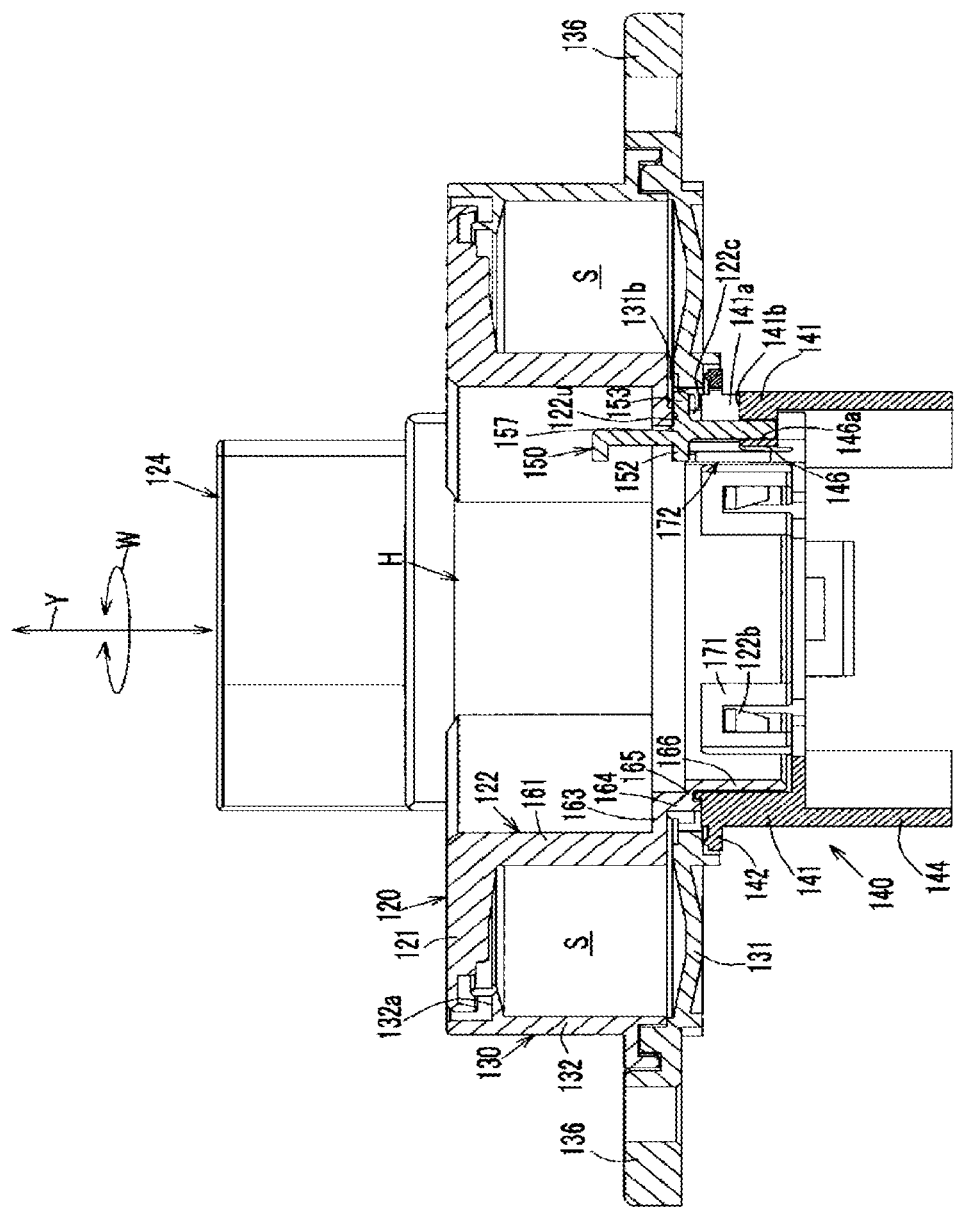
FIG. 29 is a cross-sectional view of FIG. 23, which is taken along the line B-B.

As illustrated in FIG. 28 and FIG. 29, the sleeve 140 is attached to the rotator 120, in a state where the small diameter cylindrical portion 166 of the rotator 120 is fitted and inserted into the inside of the cylindrical portion 141 to the extent that an upper end of the cylindrical portion 141 abuts on the lower-side step portion 165 of the rotator 120. In this attached state, the engagement portion 122b of the rotator 120 is engaged with the engaged portion 171 of the sleeve 140. In this manner, the sleeve 140 is fixed to the rotator 120 so as to be capable of integral rotation with the rotator 120.

Further, in the attached state described above, the upper end flange portion 142 of the sleeve 140 is disposed to face the upper-side step portion 163 of the rotator 120, with an inner-circumferential edge portion of the stationary-side ring plate 131 of the stator 130 interposed between the upper end flange portion 142 and the upper-side step portion 163. In other words, the upper-side step portion 163, the medium diameter cylindrical portion 164, and the upper end flange portion 142 constitute a groove portion having a concave shape in cross-section, and the inner-circumferential edge portion of the stationary-side ring plate 131 is fitted into the groove portion. In this manner, the upper end flange portion 142 inhibits the stator 130 from falling toward the sleeve 140 side.

Figure 31A:
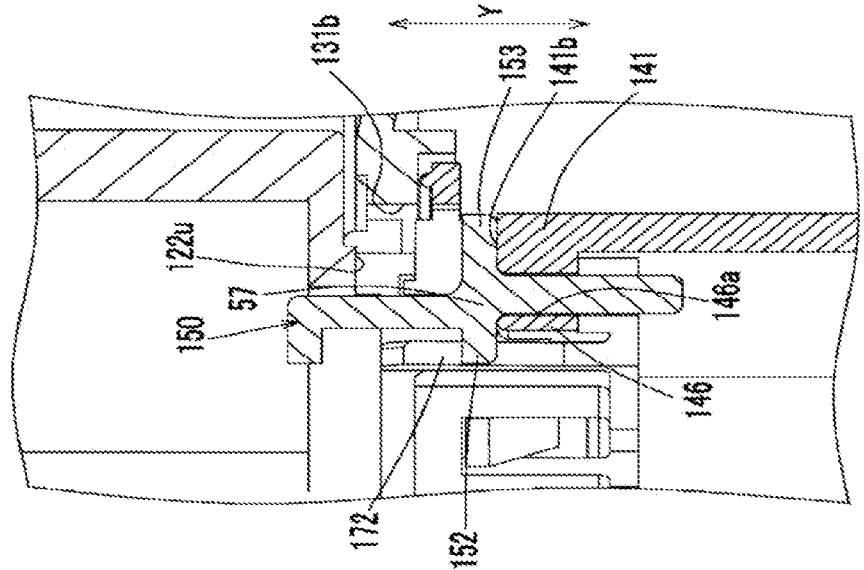
FIG. 31A is a partially enlarged view of FIG. 29 in a locked state and FIG. 31B is a partially enlarged view of FIG. 29 in a lock released state.

Further, as illustrated in FIG. 29 and FIG. 31A, in the attached state described above, the guiding concave portion 141a of the sleeve 140 is disposed to overlap the guiding cutout portion 122c of the rotator 120. In this manner, an upper side of the guiding cutout portion 122c and the guiding concave portion 141a form a guide portion that restricts a movement range of the regulating portion 153 of the intermediate stationary member 150 (namely, a movement range of the intermediate stationary member 150) to a range between the locked position and the lock released position. The movement range of the regulating portion 153 extends in the axial direction Y.

Figure 30A:
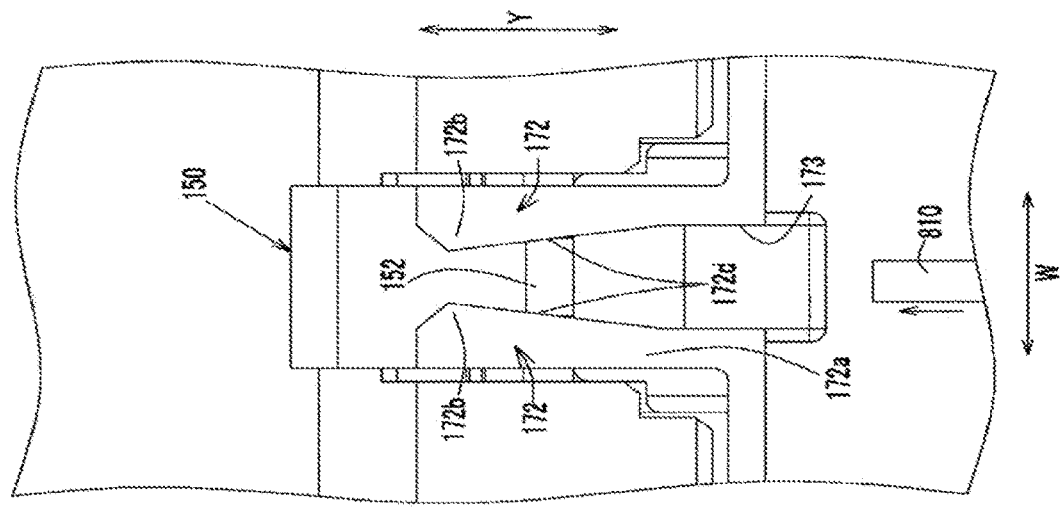
FIG. 30A is a partially enlarged view of FIG. 28 in a locked state and FIG. 30B is a partially enlarged view of FIG. 28 in a lock released state.

Further, as illustrated in FIG. 30A and FIG. 31A, in the attached state described above, a lower portion of the engagement portion 152 is engaged with the chamfered portions 172c on an upper side of respective convex portions 172b of the engaged portion 172. In other words, a lower portion of the engagement portion 152 is sandwiched by the chamfered portions 172c on an upper side of respective convex portions 172b of the engaged portion 172 from both sides in the circumferential direction W. In this manner, the intermediate stationary member 150 is supported to be located at the locked position (namely, the upper end 122u of the guiding cutout portion 122c) by the engaged portion 172. In other words, the intermediate stationary member 150 is temporarily fixed at the locked position.

Note that, in a state where the intermediate stationary member 150 is temporarily fixed at the locked position, the abutment portion 150a of the intermediate stationary member 150 projects higher than the upper-side step portion 163 of the rotator 120 (FIG. 28). Further, the regulating portion 153 of the intermediate stationary member 150 is engaged with the engagement portion 131b of the stator 130 (FIG. 31A). In this manner, in a state where the rotation position of the rotary member 110 is located at the intermediate position, relative rotation of the rotary member 110 with respect to the stationary member 130 is locked.

Next, with reference to FIG. 28, FIG. 29, FIG. 30B, and FIG. 31B, operation of the intermediate stationary member 150 when the insertion convex portion 710 of a steering wheel is inserted into the inner-circumferential cylindrical portion 122 of the rotator 120 (namely, the insertion hole H of the rotary member 110) will be described.

In a state where the insertion convex portion 710 of a steering wheel is not inserted into the inner-circumferential cylindrical portion 122 of the rotator 120, the intermediate stationary member 150 is temporarily fixed at the locked position as described above. In this temporarily fixed state, relative rotation of the rotary member 110 with respect to the stationary member 130 is locked, in a state where the abutment portion 150a of the intermediate stationary member 150 projects higher than the upper-side step portion 163 of the rotator 120 and the rotation position of the rotary member 110 is located at the intermediate position.

In the lock state described above, when the insertion convex portion 710 (FIG. 28) of a steering wheel is inserted into the inner-circumferential cylindrical portion 122 of the rotator 120, the abutment portion 150a of the intermediate stationary member 150 is pushed down to the height of an upper surface of the upper-side step portion 163 by the insertion convex portion 710. As a result, the insertion portion 158 is moved downward along an insertion direction inside the insertion hole 146a. In this manner, the intermediate stationary member 150 is moved from the locked position to the lock released position.

Figure 30B:
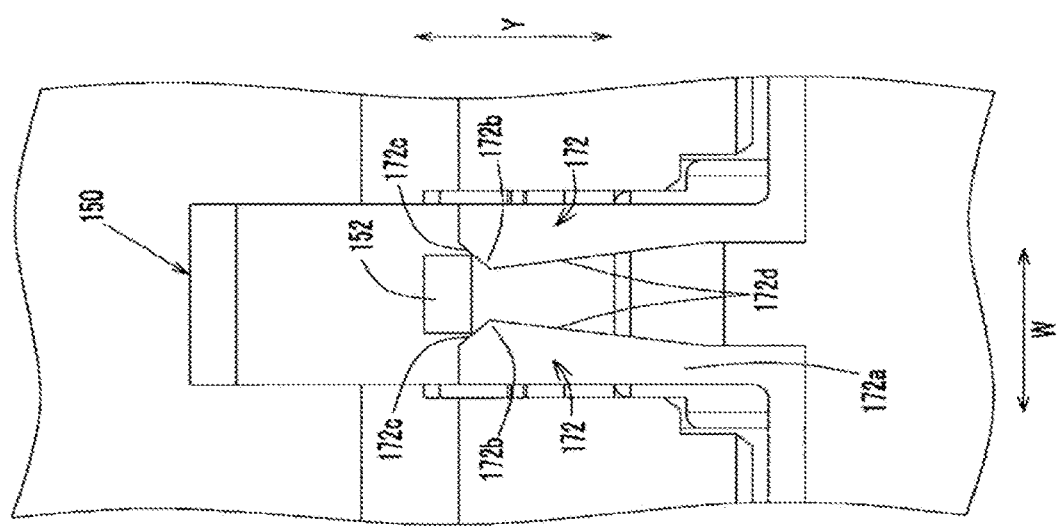
Figure 31B:
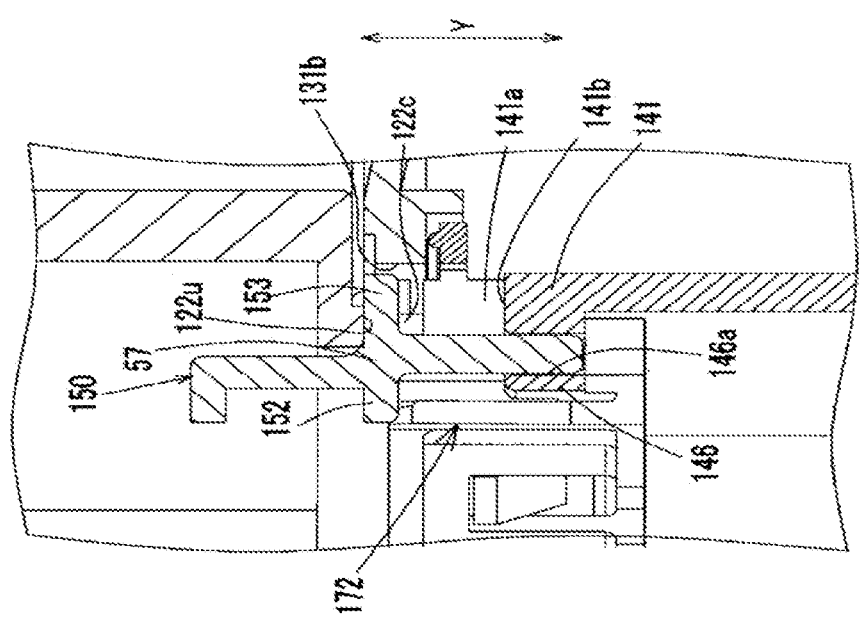

As illustrated in FIG. 30B and FIG. 31B, such movement causes the following transition of states. Specifically, a lower portion of the engagement portion 152 is initially in a state of being engaged with the chamfered portions 172c on an upper side of respective convex portions 172b of the engaged portion 172. Then, the engagement portion 152 elastically pushes down each elastic piece 172a of the engaged portion 172 toward both sides in the circumferential direction W, and thereby passes through a portion between the respective convex portions 172b of the engaged portion 172. An upper portion of the engagement portion 152 is finally brought to a state of being engaged with the chamfered portions 172d on a lower side of the respective convex portions 172b of the engaged portion 172 (namely, an upper portion of the engagement portion 152 is brought to a state of being sandwiched by the chamfered portions 172d on a lower side of the respective convex portions 172b of the engaged portion 172). As described above, an upper portion of the engagement portion 152 is engaged with the chamfered portions 172d on a lower side of respective convex portions 172b of the engaged portion 172. In this manner, the intermediate stationary member 150 is temporarily fixed at the lock released position.

When the intermediate stationary member 150 is to be returned from the lock released position to the locked position, first, a steering wheel is operated to be rotated such that the rotary member 110 is brought to the intermediate position. Subsequently, the insertion convex portion 710 of a steering wheel is removed from the inner-circumferential cylindrical portion 122 of the rotator 120. Then, in this removed state, as illustrated in FIG. 31B, a thin elongated rod 810 is inserted into the exposure window 173 through a lower end opening side (namely, the lock released position side) of the sleeve 140. Then, the engagement portion 152 is pressed toward an upper side (namely, the locked position side).

This causes the following transition of states. Specifically, an upper portion of the engagement portion 152 is initially in a state of being engaged with the chamfered portions 172d on a lower side of respective convex portions 172b of the engaged portions 172. Then, the engagement portion 152 passes through a portion between the respective convex portions 172b of the engaged portions 172. A lower portion of the engagement portion 152 is finally brought to a state of being engaged with the chamfered portions 172c on an upper side of the respective convex portions 172b of the engaged portion 172 (FIG. 30A). As a result, the intermediate stationary member 150 is returned from the lock released position to the locked position, and is temporarily fixed at the locked position.

As described above, the rotary connector device 100 according to the present embodiment includes the stationary member (namely, stator) 130, the rotary member 110 (namely, the rotator 120 and the sleeve 140), and the intermediate stationary member 150. The rotary member 110 is to be attached to the stationary member 130 so as to be capable of relative rotation with respect to the stationary member 130. The rotary member 110 includes the insertion hole H (steering wheel insertion hole) into which the insertion convex portion 710 of a steering wheel is to be inserted. The intermediate stationary member 150 is provided so as to be movable between the locked position and the lock released position with respect to the rotary member 110. At the locked position, the intermediate stationary member 150 is configured to regulate relative rotation of the rotary member 110 when the intermediate stationary member 150 is engaged with the stationary member 130. At the lock released position, the intermediate stationary member 150 is configured to release the regulation. When the intermediate stationary member 150 is pressed by the insertion convex portion 710 inserted into the insertion hole H, the intermediate stationary member 150 is moved from the locked position to the lock released position. The intermediate stationary member 150 is formed to have a vertically oblong shape extending in the axial direction of the rotary member. A lower portion of the intermediate stationary member 150 constitutes the insertion portion 158. The rotary member 110 is provided with the insertion hole 146a (intermediate stationary member insertion hole), extending in the axial direction Y. The insertion portion 158 is inserted into the insertion hole 146a so as to be movable in the axial direction Y. The intermediate stationary member 150 is provided with the engagement portion 152. The rotary member 110 (for example, the sleeve 140) is provided with the engaged portion 172. When the engaged portion 172 is engaged with the engagement portion 152 from both sides in a direction (namely, the circumferential direction W) orthogonal to the axial direction Y, the intermediate stationary member 150 is temporarily fixed at the locked position.

According to this configuration, the intermediate stationary member 150 is provided with the engagement portion 152. The rotary member 110 is provided with the engaged portion 172. The engaged portion 172 is engaged with the engagement portion 152 from both sides in a direction orthogonal to the axial direction Y. In this manner, the intermediate stationary member 150 is temporarily fixed at the locked position. Therefore, a spiral spring for biasing the intermediate stationary member 150 toward the locked position side to temporarily fix the intermediate stationary member 150 at the locked position can be omitted. As a result, the number of components can be reduced, and assembly workability can be enhanced.

Particularly, the engaged portion 172 is engaged with the engagement portion 152 from both sides in a direction (namely, the circumferential direction W) orthogonal to the axial direction Y. Therefore, when the insertion convex portion 710 of a steering wheel is inserted into the insertion hole H of the rotary member 110, inhibition of movement of the intermediate stationary member 150 from the locked position to the lock released position due to obstruction of the engagement portion 152 and the engaged portion 172 can be prevented. Further, a backlash of the intermediate stationary member 150 in a direction orthogonal to the axial direction Y can be reduced.

Further, the engagement portion 152 (fourth engagement portion) is provided in a state of projecting in the radial direction in the intermediate stationary member 150. Therefore, the engagement portion 152 can be provided with a simple structure.

Further, the lower end flange portion 143 (flange portion) protruded toward the inside in the radial direction is provided on an inner peripheral surface of the insertion hole H (steering wheel insertion hole) of the rotary member 110 (for example, an inner peripheral surface of the cylindrical portion 141). The engaged portion 172 (fourth engaged portion) is vertically provided in the axial direction Y at the lower end flange portion 143. Therefore, with a simple structure, the engaged portion 172 can be vertically provided toward the axial direction Y.

Further, in the intermediate stationary member 150, the regulating portion 153 projecting from the engagement portion 152 toward the stationary member (namely, stator) 130 side is provided to extend. Therefore, the regulating portion 153 and the engagement portion 152 can be concentrated to be disposed at one position, and thus the structure of the intermediate stationary member 150 can be simplified.

Note that, in the present embodiment, the intermediate stationary member 150 is provided with the engagement portion 152, and the rotary member 110 (for example, the sleeve 140) is provided with the engaged portion 172. However, the intermediate stationary member 150 may be provided with the engaged portion 172, and the rotary member 110 may be provided with the engagement portion 152. The same also applies to seventh to eleventh modified examples described below.

Seventh Modified Example

Figure 32A:
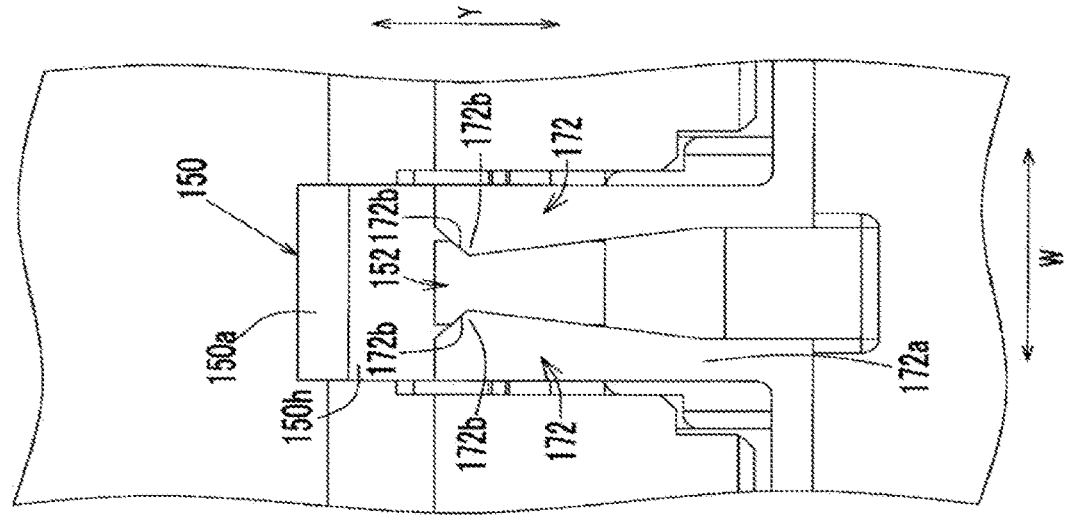
FIG. 32A is a front view in a locked state.
Figure 32B:
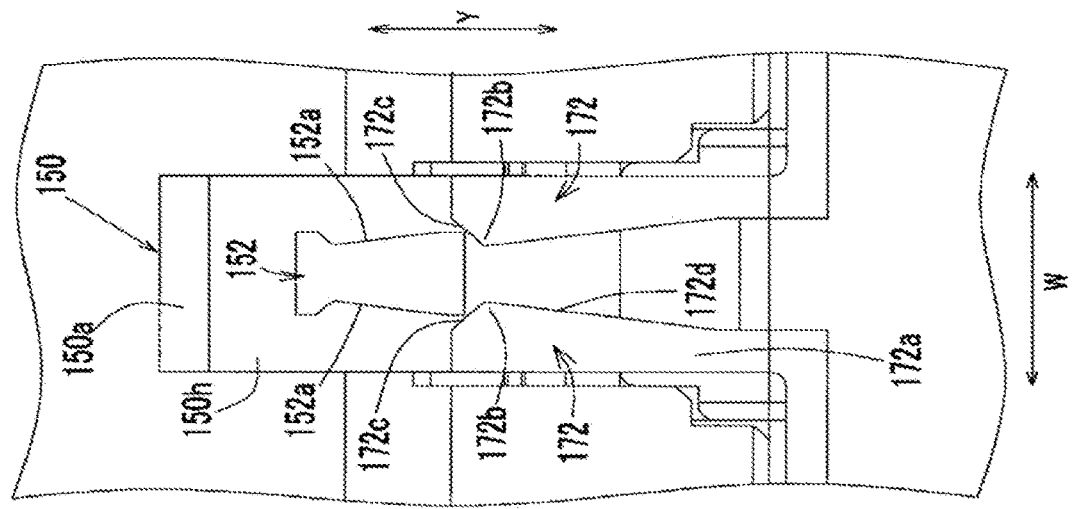
FIG. 32B is a front view in a lock released state.

In the embodiment described above, the engagement portion 152 is formed such that side surfaces on both sides in the circumferential direction W are flat. However, for example, as illustrated in FIGS. 32A and 32B, the engagement portion 152 may be formed to have a shape of a substantially rectangular parallelepiped that is vertically oblong along the axial direction Y, for example. In addition, concave portions 152a into which respective convex portions 172b of the engaged portion 172 can be fitted may be provided on the side surfaces on both sides in the circumferential direction W.

In this case, when the intermediate stationary member 150 is located at the locked position, similarly to the embodiment described above, a lower portion of the engagement portion 152 is engaged with the chamfered portions 172c on an upper side of respective convex portions 172b of the engaged portions 172 (FIG. 32A). Further, when the intermediate stationary member 150 is located at the lock released position, respective convex portions 172b of the engaged portions 172 are fitted into the concave portions 152a on both sides of the engagement portion 152 (FIG. 32B).

According to the present modified example, in a state where the intermediate stationary member 150 is located at the lock released position, the convex portions 172b are fitted into the concave portions 152a. Therefore, not only a backlash of the intermediate stationary member 150 in the circumferential direction W (namely, a direction orthogonal to the axial direction Y) but also a backlash in the axial direction Y can be reduced.

In the following, with reference to FIG. 33 to FIG. 38, modified examples of the insertion portion 158 of the embodiment described above will be described.

Eighth Modified Example

Figure 33A:
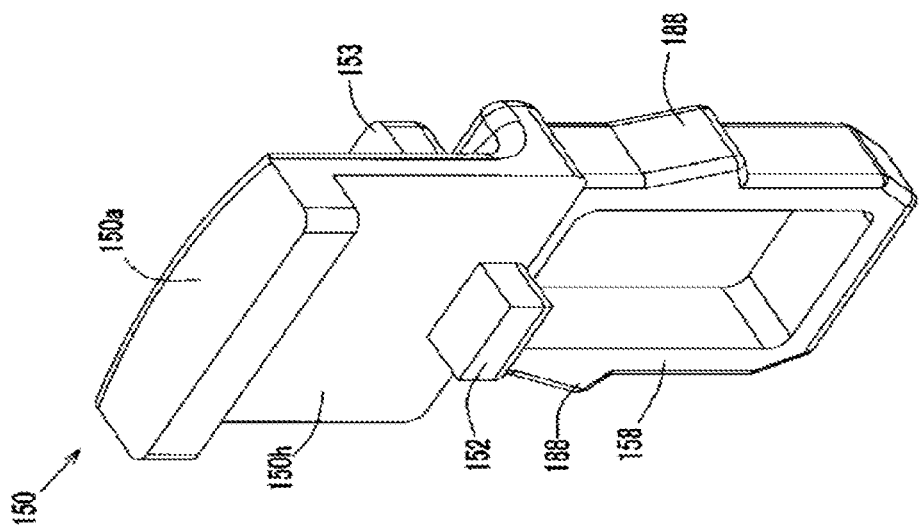
FIG. 33A is a perspective view of the intermediate stationary member seen from an outer main surface side and FIG. 33B is a perspective view of the intermediate stationary member seen from an inner main surface side.
Figure 33B:
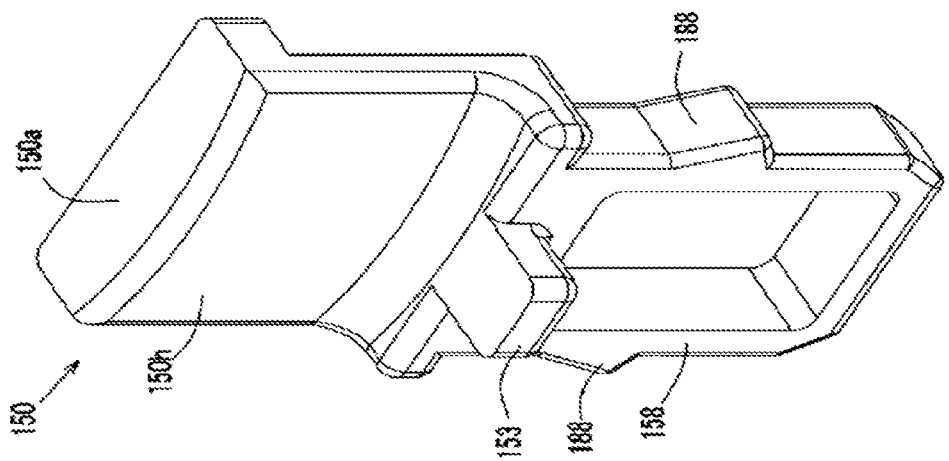

In a modified example illustrated in FIGS. 33A and 33B, the insertion portion 158 is formed to have an annular shape in a front view (for example, a rectangular annular shape). The insertion portion 158 is provided with secondary engagement portions 188 (fifth engagement portion), on respective outer surfaces in a front view of parts on both sides in a front view. Each secondary engagement portion 188 is formed to have a convex shape (for example, a triangular shape in a front view).

As illustrated in FIG. 34A, a secondary engaged portion 147 (fifth engaged portion) having a convex shape (for example, a triangular shape in a front view) with which the secondary engagement portion 188 is to be engaged is provided on an inner peripheral surface of the insertion hole 146a of the attachment portion 146 of the present modified example, on an upper end side of both side surfaces in the circumferential direction W. The insertion portion 158 is inserted into the insertion hole 146*a* in such a manner that the secondary engagement portions 188 on both sides are disposed side by side in the circumferential direction W inside the insertion hole 146*a*.

In the present modified example, similarly to the embodiment described above, due to engagement between the engagement portion 152 and the engaged portion 172, the intermediate stationary member 150 is temporarily fixed at the locked position and the lock released position. In addition, as will be described later, also due to engagement between the secondary engagement portion 188 of the insertion portion 158 and the secondary engaged portion 147 of the insertion hole 146*a*, the intermediate stationary member 150 is temporarily fixed at the locked position and the lock released position.

Specifically, as illustrated in FIG. 34A, in a state where the intermediate stationary member 150 is located at the locked position, the insertion portion 158 is sandwiched between the secondary engaged portions 147 on both sides of the insertion hole 146*a*, and slopes 188*b* on a lower side of the secondary engagement portions 188 are engaged with slopes 147*b* on an upper side of the secondary engaged portions 147. Also due to this engagement, the intermediate stationary member 150 is temporarily fixed at the locked position. Then, when the intermediate stationary member 150 is moved from the locked position to the lock released position, the annular insertion portion 158 elastically changes its shape toward the inside in the horizontal width direction by respective secondary engaged portions 147, and as illustrated in FIG. 34B, slopes 188*a* on an upper side of the secondary engagement portions 188 are engaged with slopes 147*c* on a lower side of the secondary engaged portions 147. Also due to this engagement, the intermediate stationary member 150 is temporarily fixed at the lock released position.

As described above, according to the modified example of FIG. 33, the secondary engagement portions 188 (fifth engagement portion) and the secondary engaged portions 147 (fifth engaged portion) are disposed by utilizing a gap between the insertion portion 158 and the insertion hole 146*a* (intermediate stationary member insertion hole). Therefore, there is no longer a necessity of separately securing a position for disposing the secondary engagement portions 188 and the secondary engaged portions 147.

Further, the insertion portion 158 is formed to have an annular shape. Therefore, the insertion portion 158 can elastically change its shape in a diameter direction. The secondary engagement portions 188 (sixth engagement portion) are provided on respective outer sides in a front view of parts on both sides of the annular insertion portion 158 in a front view. Therefore, the secondary engagement portions 188 and the secondary engaged portions 147 can be elastically engaged with each other, and a backlash of the intermediate stationary member 150 (in particular, a backlash of the insertion portion 158 in a width direction in a front view (namely, the circumferential direction W)) can be reduced.

Ninth Modified Example

Figure 35A:
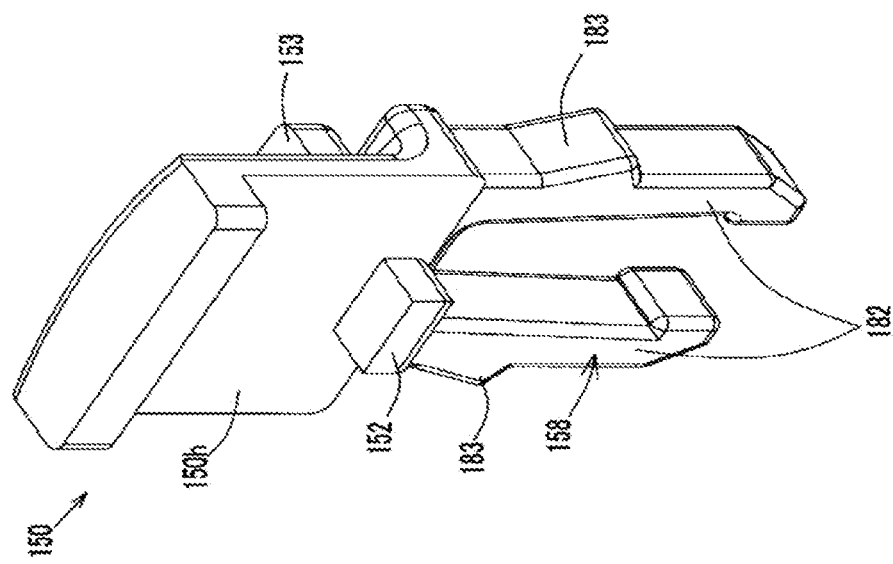
FIG. 35A is a perspective view of the intermediate stationary member seen from an outer main surface side and FIG. 35B is a perspective view of the intermediate stationary member seen from an inner main surface side.
Figure 35B:
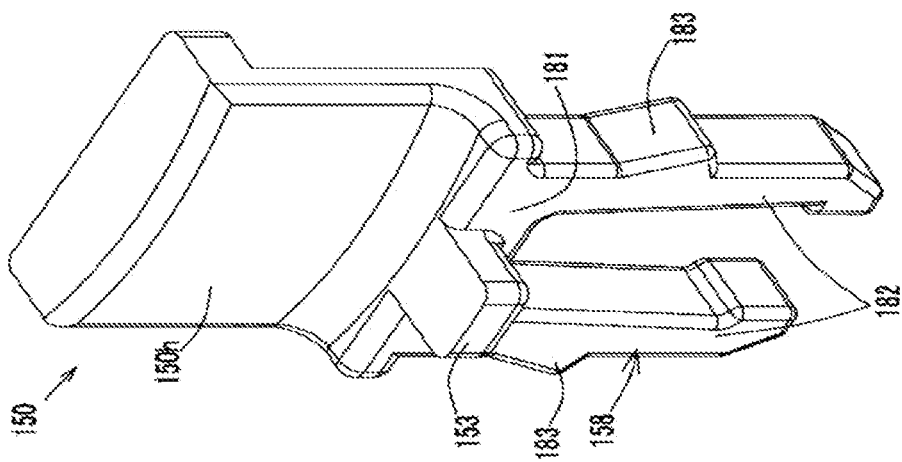

In a modified example illustrated in FIGS. 35A and 35B, the insertion portion 158 is formed to have an inverted U-like shape. Specifically, the insertion portion 158 includes a coupling portion 181 having a shape of a horizontally oblong rectangular parallelepiped, for example, and a pair of elastic pieces 182. The coupling portion 181 is provided at a lower side end portion of the intermediate stationary member 150*h*, in a state of being extending along the horizontal width direction (namely, the circumferential direction W) and deviating toward an outer main surface side (namely, toward the outside in the radial direction of the rotary member 110). The pair of elastic pieces 182 are provided to extend downward in the axial direction Y from both ends of the coupling portion 181 in a longitudinal direction (namely, the circumferential direction W), and are disposed to face each other and to be spaced apart from each other along the longitudinal direction of the coupling portion 181. Secondary engagement portions 183 (sixth engagement portion) each having a convex shape (for example, a triangular shape in a front view) are provided on respective outer surfaces of the pair of elastic pieces 182 in a facing direction, at positions close to a center of the elastic pieces 182 in a longitudinal direction, for example.

As illustrated in FIG. 36A, also in the present modified example, similarly to the eighth modified example, a secondary engaged portion 147 (sixth engaged portion) having a convex shape (for example, a triangular shape in a front view) with which the secondary engagement portion 183 is to be engaged is provided on an inner peripheral surface of the insertion hole 146*a* of the attachment portion 146, on an upper end side of both side surfaces in the circumferential direction W. The insertion portion 158 is inserted into the insertion hole 146*a* in such a manner that the pair of elastic pieces 182 are disposed side by side in the circumferential direction W inside the insertion hole 146*a*.

Further, also in the present modified example, similarly to the eighth modified example, in a state where the intermediate stationary member 150 is located at the locked position, the pair of elastic pieces 182 of the insertion portion 158 is sandwiched between the secondary engaged portions 147 on both sides of the insertion hole 146*a*, and slopes 183*b* on a lower side of the secondary engagement portions 183 are engaged with slopes 147*b* on an upper side of the secondary engaged portions 147. Also due to this engagement, the intermediate stationary member 150 is temporarily fixed at the locked position. Then, when the intermediate stationary member 150 is moved from the locked position to the lock released position, as illustrated in FIG. 36B, slopes 183*a* on an upper side of the secondary engagement portions 183 are engaged with slopes 147*c* on a lower side of the secondary engaged portions 147. Also due to this engagement, the intermediate stationary member 150 is temporarily fixed at the lock released position.

As described above, also according to the present modified example, an effect similar to the effect of the eighth modified example can be achieved.

Tenth Modified Example

A modified example illustrated in FIGS. 37A and 37B is the same as the ninth modified example except that, in the modified example illustrated in FIGS. 37A and 37B, the engagement portion 152 is omitted from the intermediate stationary member 150 (a part enclosed in the dotted circle Q of FIG. 37B), and the engaged portion 172 is omitted from the sleeve 140. Also according to the present modified example, an effect similar to the effect of the ninth modified example can be achieved. Note that the present modified example may be applied to the eighth modified example.

Eleventh Modified Example

A modified example illustrated in FIG. 38A is the same as the ninth modified example except that, in the modified example illustrated in FIG. 38A, a pressing portion 184 is provided in the insertion portion 158, at a position between the engagement portions 183 on both sides. The pressing portion 184 is provided between the pair of elastic pieces 182 in the coupling portion 181 of the insertion portion 158, for example, and is vertically provided toward a lower side in the axial direction Y. The pressing portion 184 includes an elastic piece 184a vertically provided in the coupling portion 181, and a convex portion 184b provided on a side of an outer main surface of the intermediate stationary member 150h in a tip end of the elastic piece 184a.

In the present modified example, in a state where the insertion portion 158 is inserted into the insertion hole 146a, the convex portion 184b presses a part of an inner peripheral surface of the insertion hole 146a that faces a front surface of the pressing portion 184. In this manner, a backlash of the pressing portion 184 of the intermediate stationary member 150 in a front direction (namely, a backlash of the rotary member 110 in the radial direction) can be reduced.

Note that the pressing portion 184 may be applied to the insertion portion 158 of the eighth modified example. FIGS. 38B and 38C are perspective views illustrating variations of a case where the pressing portion 184 is provided in the insertion portion 158 of the eighth modified example. In FIG. 38B, the pressing portion 184 is vertically provided on a bottom surface of an inner peripheral surface of the annular insertion portion 158, such that the pressing portion 184 is disposed between the secondary engagement portions 188 on both sides. In FIG. 38C, the elastic piece 184a of the pressing portion 184 is provided to extend across a bottom surface and a top surface of an inner peripheral surface of the annular insertion portion 158, and the convex portion 184b is provided at a center of the elastic piece 184a in a longitudinal direction. Also in the modified examples of FIGS. 38B and 38C, an effect similar to the effect of the eleventh modified example can be achieved.

The disclosure is not limited to the configurations of the embodiments and the modified examples described above. The disclosure can encompass combinations of the embodiments and the modified examples described above, and can achieve numerous embodiments.

REFERENCE SIGNS LIST 1, 100 Rotary connector device
20, 120 Rotator (rotary member)
22a Fitting convex portion
30, 130 Stator (stationary member)
40, 140 Sleeve
45, 73, 173 Exposure window
46, 146 Attachment portion
46a, 146a Insertion hole (insertion hole for intermediate stationary member)
47, 147 Secondary engaged portion (engaged portion)
50, 150 Intermediate stationary member
51a Upper wall portion (wall portion)
52, 152 Engagement portion
52a, 152a Concave portion
53, 153 Regulating portion
54, 154 Fitting concave groove portion
58, 158 Insertion portion
72, 172 Engaged portion
72a, 172a Elastic piece
72b, 172b Convex portion
72c, 72d, 172c, 172d Chamfered portion
72e, 172e Secondary convex portion
82, 182 Elastic piece
83, 183 Secondary engagement portion (engagement portion)
84, 184 Pressing portion

The invention claimed is:

1. A rotary connector device, comprising:
a stationary member;
a rotary member attached to the stationary member and configured to rotate relative to the stationary member such that the rotary member has a steering wheel insertion hole into which an insertion convex portion of a steering wheel is to be inserted; and
an intermediate stationary member configured to move between a locked position and a lock released position with respect to the rotary member,
wherein the intermediate stationary member has a regulating portion configured to regulate relative rotation of the rotary member when the regulating portion is engaged with the stationary member at the locked position and release regulation between the rotary member and the stationary member at the lock released position, the intermediate stationary member is configured to be moved from the locked position to the lock released position when the intermediate stationary member is pressed by the insertion convex portion inserted into the steering wheel insertion hole, and one of the intermediate stationary member and the rotary member has an engagement portion, and the other one of the intermediate stationary member and the rotary member has an engaged portion configured to engage with the engagement portion such that when one of the engagement portion and the engaged portion is engaged with the other one of the engagement portion and the engaged portion, the intermediate stationary member is temporarily fixed at the locked position, the rotary member has a cylindrically shaped inner peripheral surface, the engaged portion comprises a convex portion formed on an inner peripheral surface of the rotary member, the engagement portion comprises an engagement portion projecting opposite a projecting direction of the convex portion in the intermediate stationary member, the regulating portion is positioned in the intermediate stationary member and configured to project toward the stationary member side such that the regulating portion is spaced apart from a locked position side of the engagement portion, that in a state where the intermediate stationary member is located at the locked position, relative rotation of the rotary member is regulated when the regulating portion is engaged with the stationary member, and that in a state where the intermediate stationary member is located at the lock released position, the intermediate stationary member is fixed at the lock released position when the convex portion is fitted between the engagement portion and the regulating portion, the intermediate stationary member is temporarily fixed at the lock released position, and the rotary member includes an exposure window connecting to an outside at a position adjacent to a lock released position side of the convex portion.

2. The rotary connector device according to claim 1, wherein the intermediate stationary member has an annular shape and is fitted into an inside of the steering wheel insertion hole of the rotary member such that the intermediate stationary member is configured to move in the axial direction of the rotary member.

3. The rotary connector device according to claim 1, wherein the engaged portion is configured to be engaged from both sides of the engagement portion.

4. The rotary connector device according to claim 1, wherein the engaged portion comprises another convex portion spaced apart from a lock released position side of the convex portion such that when the engagement portion is fitted between the convex portion and the other convex portion, the intermediate stationary member is temporarily fixed at the lock released position.

5. The rotary connector device according to claim 1, wherein the regulating portion of the intermediate stationary member is configured to project from the engagement portion toward the stationary member side such that in a state where the intermediate stationary member is temporarily fixed at the locked position, relative rotation of the rotary member is regulated when the regulating portion is engaged with the stationary member.

6. The rotary connector device according to claim 1, wherein the intermediate stationary member is disposed inside the steering wheel insertion hole of the rotary member, the rotary member has one of a fitting convex portion and a fitting concave groove portion extending in the axial direction on an inner peripheral surface of the steering wheel insertion hole, and the intermediate stationary member has the other one of the fitting convex portion and the fitting concave groove portion on an outer peripheral surface of the intermediate stationary member such that in a state where the intermediate stationary member is located at the lock released position, the fitting convex portion is fitted into the fitting concave groove portion.

7. The rotary connector device according to claim 1, wherein the intermediate stationary member has an insertion portion projecting in the axial direction, the rotary member has an attachment portion on an inner peripheral surface of the steering wheel insertion hole such that the attachment portion has an intermediate stationary member insertion hole extending along the axial direction, and the insertion portion of the intermediate stationary member is inserted into the intermediate stationary member insertion hole and configured to move in an insertion direction.

8. A rotary connector device, comprising:
a stationary member;
a rotary member attached to the stationary member and configured to rotate relative to the stationary member such that the rotary member has a steering wheel insertion hole into which an insertion convex portion of a steering wheel is to be inserted; and
an intermediate stationary member configured to move between a locked position and a lock released position with respect to the rotary member,
wherein the intermediate stationary member has a regulating portion configured to regulate relative rotation of the rotary member when the regulating portion is engaged with the stationary member at the locked position and release regulation between the rotary member and the stationary member at the lock released position, the intermediate stationary member is configured to be moved from the locked position to the lock released position when the intermediate stationary member is pressed by the insertion convex portion inserted into the steering wheel insertion hole, one of the intermediate stationary member and the rotary member has an engagement portion, and the other one of the intermediate stationary member and the rotary member has an engaged portion configured to engage with the engagement portion such that when one of the engagement portion and the engaged portion is engaged with the other one of the engagement portion and the engaged portion, the intermediate stationary member is temporarily fixed at the locked position, the intermediate stationary member has an insertion portion projecting in the axial direction, the rotary member has an attachment portion on an inner peripheral surface of the steering wheel insertion hole such that the attachment portion has an intermediate stationary member insertion hole extending along the axial direction, and the insertion portion of the intermediate stationary member is inserted into the intermediate stationary member insertion hole and configured to move in an insertion direction.

9. The rotary connector device according to claim 8, wherein the insertion portion includes a pair of elastic pieces disposed to face each other and spaced apart from each other in a front view, the engagement portion comprises a plurality of engagement portions positioned on respective outer surfaces of the pair of elastic pieces in a direction of mutual facing, and the engaged portion comprises a plurality of engaged portions positioned on an inner peripheral surface of the intermediate stationary member insertion hole.

10. The rotary connector device according to claim 9, wherein the insertion portion has a pressing portion between the engagement portions on both sides such that the pressing portion presses a part of an inner peripheral surface of the intermediate stationary member insertion hole facing a front surface of the pressing portion.

11. The rotary connector device according to claim 8, wherein the engagement portion comprises an engagement portion projecting in a radial direction of the rotary member, and the engaged portion comprises a first engaged portion configured to be engaged with the engagement portion.

12. The rotary connector device according to claim 11, wherein the rotary member has a flange portion positioned on an inner peripheral surface of the steering wheel insertion hole and protruded toward an inside in a radial direction, and the engaged portion is positioned upright at the flange portion in the axial direction of the rotary member.

13. The rotary connector device according to claim 11, wherein the one of the intermediate stationary member and the rotary member has a wall portion spaced apart from a locked position side of the engagement portion, and when the intermediate stationary member is located at the lock released position, the engaged portion is fitted between the engagement portion and the wall portion.

14. The rotary connector device according to claim 8, wherein the regulating portion of the intermediate stationary member is configured to project from the engagement portion toward the stationary member side such that in a state where the intermediate stationary member is temporarily fixed at the locked position, relative rotation of the rotary member is regulated when the regulating portion is engaged with the stationary member.

15. A rotary connector device, comprising:
a stationary member;
a rotary member attached to the stationary member and configured to rotate relative to the stationary member such that the rotary member has a steering wheel insertion hole into which an insertion convex portion of a steering wheel is to be inserted; and
an intermediate stationary member configured to move between a locked position and a lock released position with respect to the rotary member,
wherein the intermediate stationary member has a regulating portion configured to regulate relative rotation of the rotary member when the regulating portion is engaged with the stationary member at the locked position and release regulation between the rotary member and the stationary member at the lock released position, the intermediate stationary member is configured to be moved from the locked position to the lock released position when the intermediate stationary member is pressed by the insertion convex portion inserted into the steering wheel insertion hole, one of the intermediate stationary member and the rotary member has an engagement portion, and the other one of the intermediate stationary member and the rotary member has an engaged portion configured to engage with the engagement portion such that when one of the engagement portion and the engaged portion is engaged with the other one of the engagement portion and the engaged portion, the intermediate stationary member is temporarily fixed at the locked position, the intermediate stationary member has a vertically oblong shape extending in the axial direction of the rotary member, and a lower portion forming an insertion portion, and the rotary member has an intermediate stationary member insertion hole extending in the axial direction of the rotary member such that the insertion portion is inserted into the intermediate stationary member insertion hole and configured to move in the axial direction.

16. The rotary connector device according to claim 15, wherein the engagement portion comprises an engagement portion projecting in a radial direction of the rotary member, and the engaged portion comprises an engaged portion configured to be engaged with the engagement portion.

17. The rotary connector device according to claim 16, wherein the rotary member has a flange portion protruded toward an inside in a radial direction on an inner peripheral surface of the steering wheel insertion hole of the rotary member such that the fourth engaged portion is positioned upright at the flange portion in the axial direction of the rotary member.

18. The rotary connector device according to claim 16, wherein the one of the intermediate stationary member and the rotary member has a wall portion spaced apart from a locked position side of the engagement portion, and when the intermediate stationary member is located at the lock released position, the engaged portion is fitted between the engagement portion and the wall portion.

19. The rotary connector device according to claim 15, wherein the insertion portion has an annular shape in a front view, the engagement portion comprises a plurality of engagement portions positioned on respective outer surfaces in a front view of parts on both sides of the insertion portion in a front view, and the engaged portion comprises a plurality of engaged portions configured to be engaged with the engagement portions and positioned on an inner peripheral surface of the intermediate stationary member insertion hole.

20. The rotary connector device according to claim 19, wherein the insertion portion has a pressing portion between the engagement portions on both sides such that the pressing portion presses a part of an inner peripheral surface of the intermediate stationary member insertion hole facing a front surface of the pressing portion.

21. The rotary connector device according to claim 15, wherein the insertion portion includes a pair of elastic pieces facing each other and spaced apart from each other in a front view, the engagement portion comprises a plurality of engagement portions positioned on respective outer surfaces of the pair of elastic pieces in a direction of mutual facing, and the engaged portion comprises a plurality of engaged portions configured to be engaged with the engagement portions and positioned on an inner peripheral surface of the intermediate stationary member insertion hole.

22. The rotary connector device according to claim 15, wherein the regulating portion of the intermediate stationary member is configured to project from the engagement portion toward the stationary member side such that in a state where the intermediate stationary member is temporarily fixed at the locked position, relative rotation of the rotary member is regulated when the regulating portion is engaged with the stationary member.

* * * * *